(12) United States Patent
Nakazawa et al.

(10) Patent No.: US 10,924,621 B2
(45) Date of Patent: Feb. 16, 2021

(54) READING DEVICE TO READ AND OUTPUT AN INVISIBLE IMAGE INCLUDED IN A DOCUMENT

(71) Applicants: Masamoto Nakazawa, Kanagawa (JP); Ayumu Hashimoto, Kanagawa (JP); Masashi Watanabe, Tokyo (JP)

(72) Inventors: Masamoto Nakazawa, Kanagawa (JP); Ayumu Hashimoto, Kanagawa (JP); Masashi Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/536,575

(22) Filed: Aug. 9, 2019

(65) Prior Publication Data

US 2020/0053230 A1    Feb. 13, 2020

(30) Foreign Application Priority Data

Aug. 10, 2018 (JP) .............................. JP2018-152123
Dec. 11, 2018 (JP) .............................. JP2018-231974

(51) Int. Cl.
  *G06K 15/02* (2006.01)
  *H04N 1/00* (2006.01)
  *H04N 1/393* (2006.01)
  *H04N 1/60* (2006.01)

(52) U.S. Cl.
  CPC ....... *H04N 1/0087* (2013.01); *H04N 1/00846* (2013.01); *H04N 1/393* (2013.01); *H04N 1/6027* (2013.01); *H04N 2201/0094* (2013.01)

(58) Field of Classification Search
  None
  See application file for complete search history.

(56) References Cited

U.S. PATENT DOCUMENTS

| 6,970,259 B1 | 11/2005 | Lunt et al. | |
| 7,782,339 B1* | 8/2010 | Hobbs | H04N 19/20 345/626 |
| 10,701,244 B2* | 6/2020 | Bourret | H04N 5/332 |

(Continued)

FOREIGN PATENT DOCUMENTS

| ES | 2 296 727 T3 | 5/2008 |
| JP | 2005-341307 | 12/2005 |

(Continued)

OTHER PUBLICATIONS

Extended European Search Report dated Nov. 28, 2019 in European Patent Application No. 19189797.4, 12 pages.

(Continued)

*Primary Examiner* — Henok Shiferaw
(74) *Attorney, Agent, or Firm* — Oblon, McClelland, Maier & Neustadt, L.L.P.

(57) ABSTRACT

A reading device includes a light source, an imaging element, a controller, a correcting unit, and a notifying unit. The light source is configured to irradiate an object with light. The imaging element is configured to receive and read the light from the object. The controller is configured to control a second reading operation of reading the object with an invisible image. The correcting unit is configured to perform correction with respect to the invisible image. The notifying unit is configured to notify an outside of at least the invisible image corrected.

39 Claims, 41 Drawing Sheets

(56) References Cited

U.S. PATENT DOCUMENTS

| | | | |
|---|---|---|---|
| 2002/0168116 A1* | 11/2002 | Takayama | H04N 1/4097 382/275 |
| 2007/0188638 A1 | 8/2007 | Nakazawa et al. | |
| 2008/0130943 A1 | 6/2008 | Goda | |
| 2008/0252787 A1 | 10/2008 | Nakazawa et al. | |
| 2009/0316950 A1* | 12/2009 | Alasia | G06K 9/00577 382/100 |
| 2010/0027061 A1 | 2/2010 | Nakazawa | |
| 2010/0171998 A1 | 7/2010 | Nakazawa | |
| 2011/0026083 A1 | 2/2011 | Nakazawa | |
| 2011/0051201 A1 | 3/2011 | Hashimoto et al. | |
| 2011/0063488 A1 | 3/2011 | Nakazawa | |
| 2012/0224205 A1* | 9/2012 | Nakazawa | H04N 1/00896 358/1.13 |
| 2013/0063792 A1 | 3/2013 | Nakazawa | |
| 2014/0029065 A1 | 1/2014 | Nakazawa | |
| 2014/0204427 A1 | 7/2014 | Nakazawa | |
| 2014/0204432 A1 | 7/2014 | Hashimoto et al. | |
| 2014/0211273 A1 | 7/2014 | Konno et al. | |
| 2014/0368893 A1 | 12/2014 | Nakazawa et al. | |
| 2014/0376808 A1 | 12/2014 | Hashimoto | |
| 2015/0098117 A1 | 4/2015 | Marumoto et al. | |
| 2015/0116794 A1 | 4/2015 | Nakazawa | |
| 2015/0163378 A1 | 6/2015 | Konno et al. | |
| 2015/0222790 A1 | 8/2015 | Asaba et al. | |
| 2015/0304517 A1 | 10/2015 | Nakazawa et al. | |
| 2016/0003673 A1 | 1/2016 | Hashimoto et al. | |
| 2016/0006961 A1 | 1/2016 | Asaba et al. | |
| 2016/0028920 A1 | 1/2016 | Hashimoto | |
| 2016/0088179 A1 | 3/2016 | Nakazawa et al. | |
| 2016/0112660 A1 | 4/2016 | Nakazawa et al. | |
| 2016/0119495 A1 | 4/2016 | Konno et al. | |
| 2016/0173719 A1 | 6/2016 | Hashimoto et al. | |
| 2016/0268330 A1 | 9/2016 | Nakazawa et al. | |
| 2016/0295138 A1 | 10/2016 | Asaba et al. | |
| 2016/0373604 A1 | 12/2016 | Hashimoto et al. | |
| 2017/0019567 A1 | 1/2017 | Konno et al. | |
| 2017/0163836 A1 | 6/2017 | Nakazawa | |
| 2017/0170225 A1 | 6/2017 | Asaba et al. | |
| 2017/0201700 A1 | 7/2017 | Hashimoto et al. | |
| 2017/0244853 A1 | 8/2017 | Yabuuchi et al. | |
| 2017/0264782 A1 | 9/2017 | Hashimoto | |
| 2017/0295298 A1 | 10/2017 | Ozaki et al. | |
| 2017/0302821 A1 | 10/2017 | Sasa et al. | |
| 2017/0324883 A1 | 11/2017 | Konno et al. | |
| 2018/0069996 A1* | 3/2018 | Shukla | H04N 9/07 |
| 2018/0139345 A1 | 5/2018 | Goh et al. | |
| 2018/0146150 A1 | 5/2018 | Shirado et al. | |
| 2018/0175096 A1 | 6/2018 | Inoue et al. | |
| 2018/0213124 A1 | 7/2018 | Yokohama et al. | |
| 2018/0261642 A1 | 9/2018 | Asaba et al. | |
| 2019/0132471 A1* | 5/2019 | Fujita | H04N 1/2034 |
| 2019/0163112 A1 | 5/2019 | Nikaku et al. | |
| 2019/0238702 A1 | 8/2019 | Ikemoto et al. | |

FOREIGN PATENT DOCUMENTS

| | | |
|---|---|---|
| JP | 2007-243249 | 9/2007 |
| JP | 2008-167320 | 7/2008 |
| WO | WO 2009/158324 A1 | 12/2009 |

OTHER PUBLICATIONS

U.S. Appl. No. 16/269,592, filed Feb. 7, 2019, Masamoto Nakazawa, et al.

* cited by examiner

FIG. 5A
<ORIGINAL DOCUMENT>
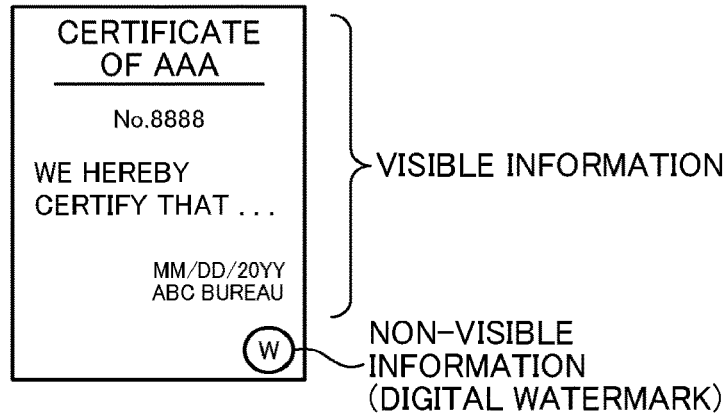
FIG. 5B
<VISIBLE IMAGE>
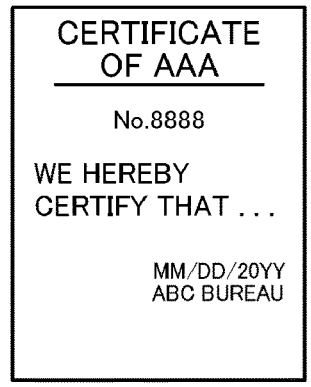
FIG. 5C
<NIR IMAGE DATA>
GENUINE          SPURIOUS
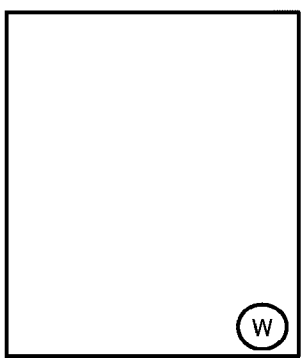  

<ORIGINAL DOCUMENT>

<NIR IMAGE>

<NIR IMAGE>

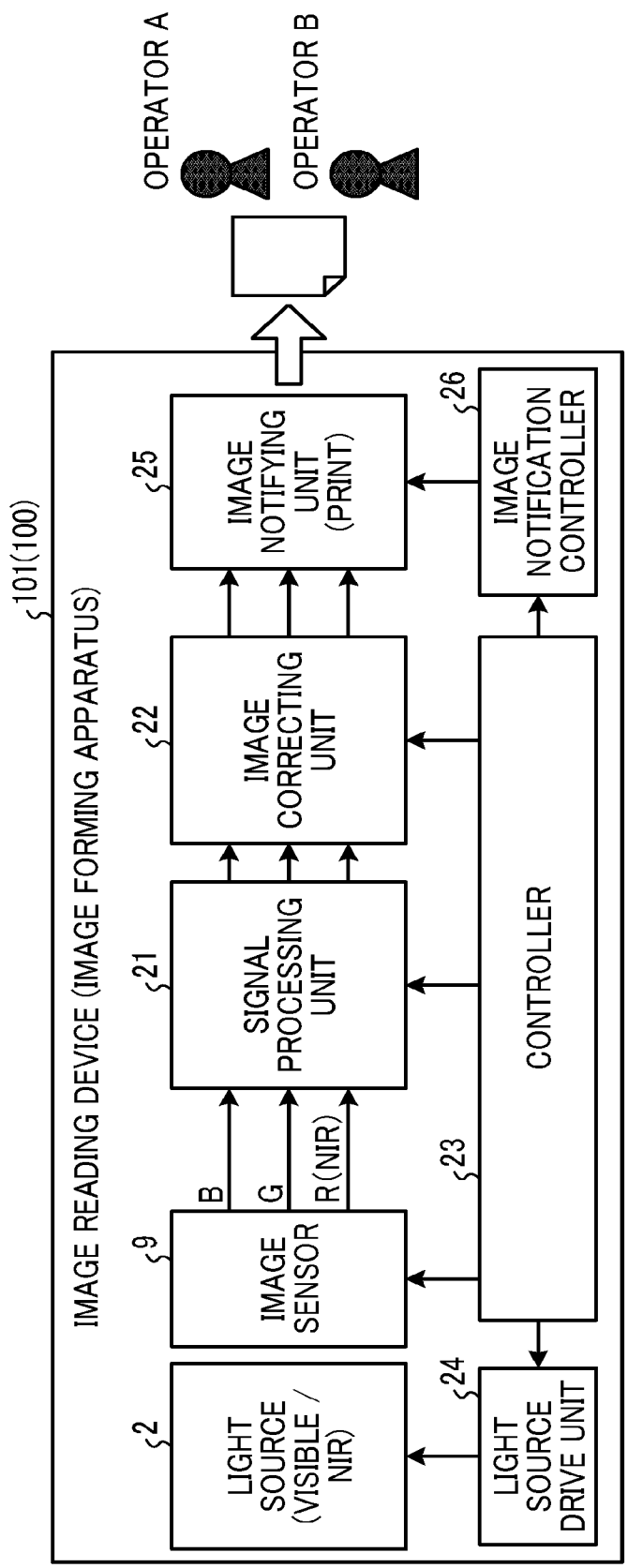

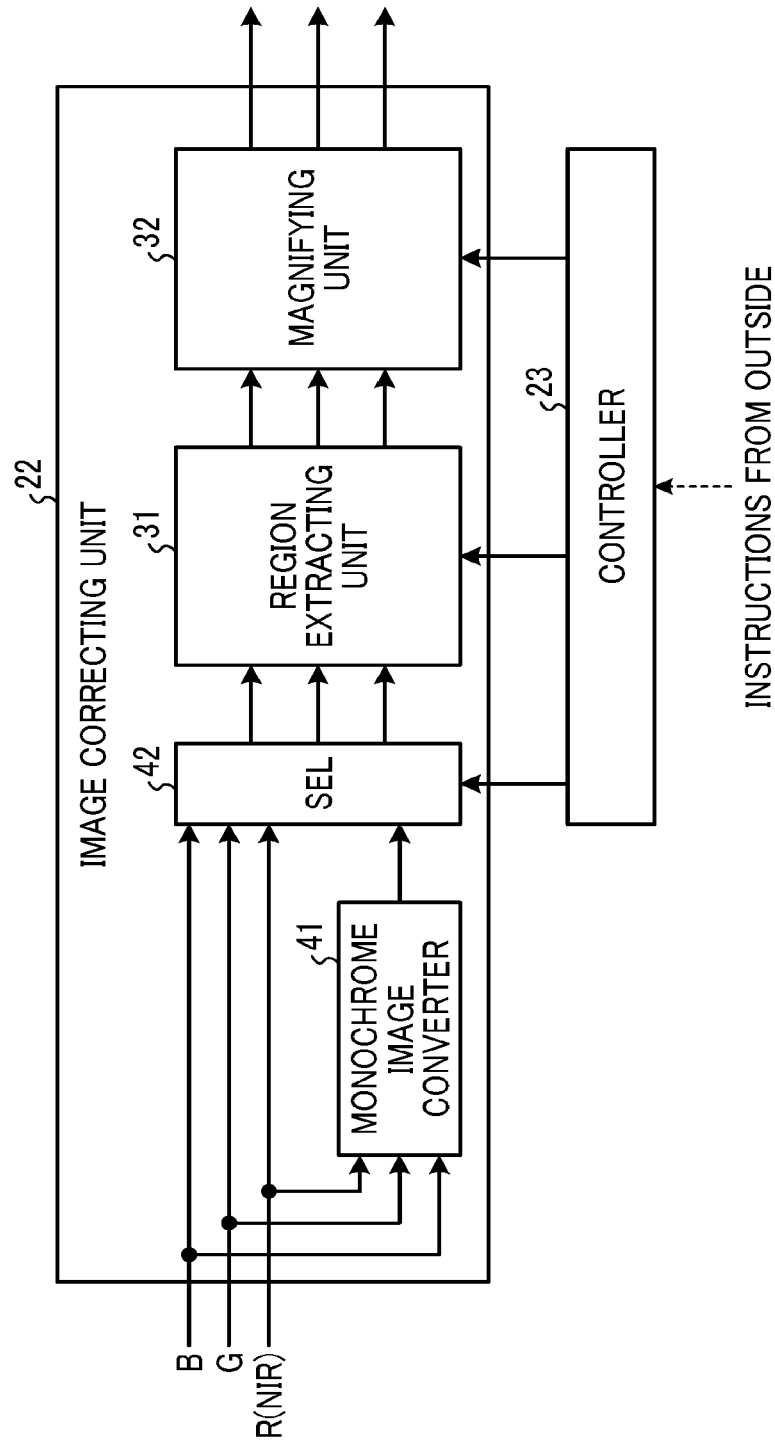

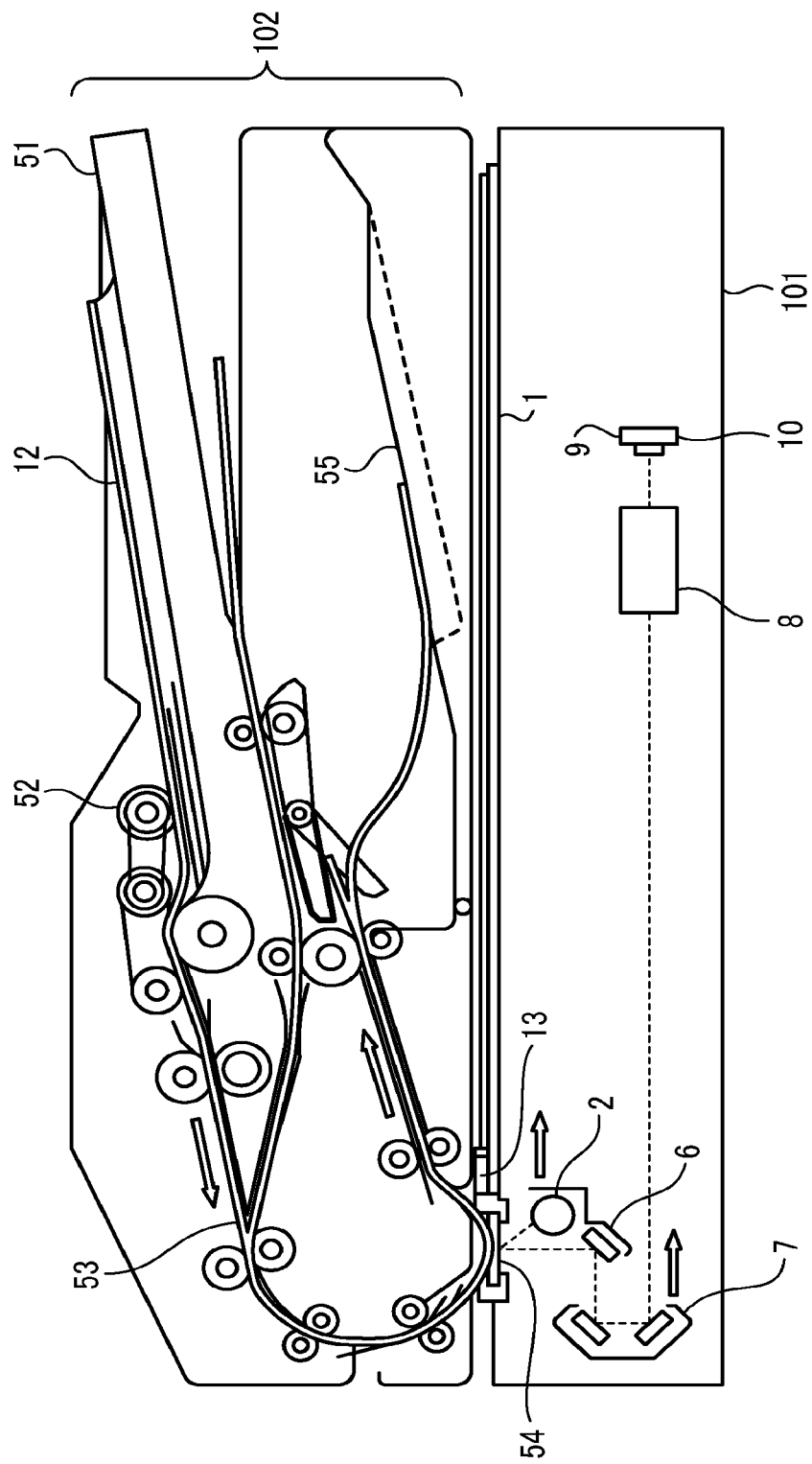

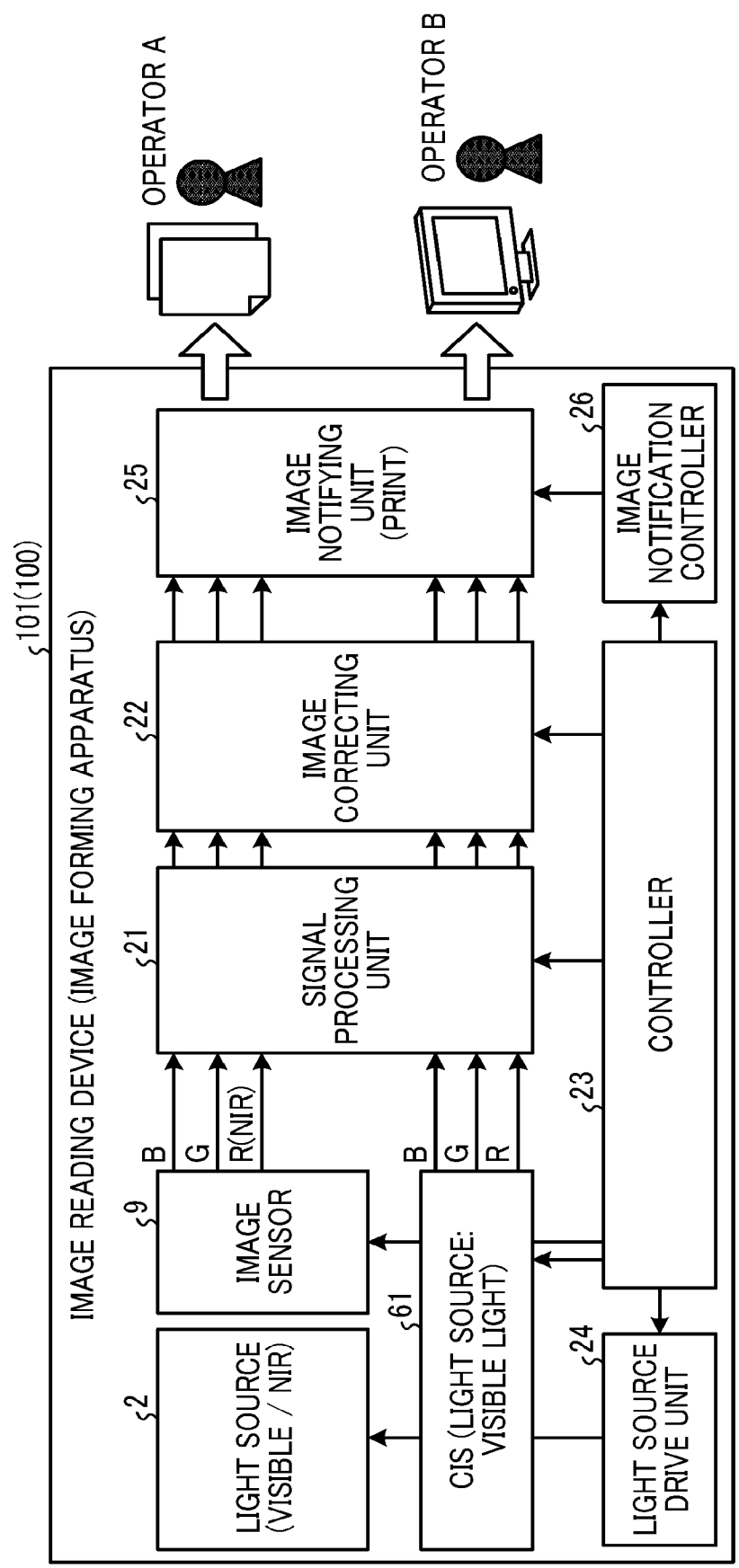

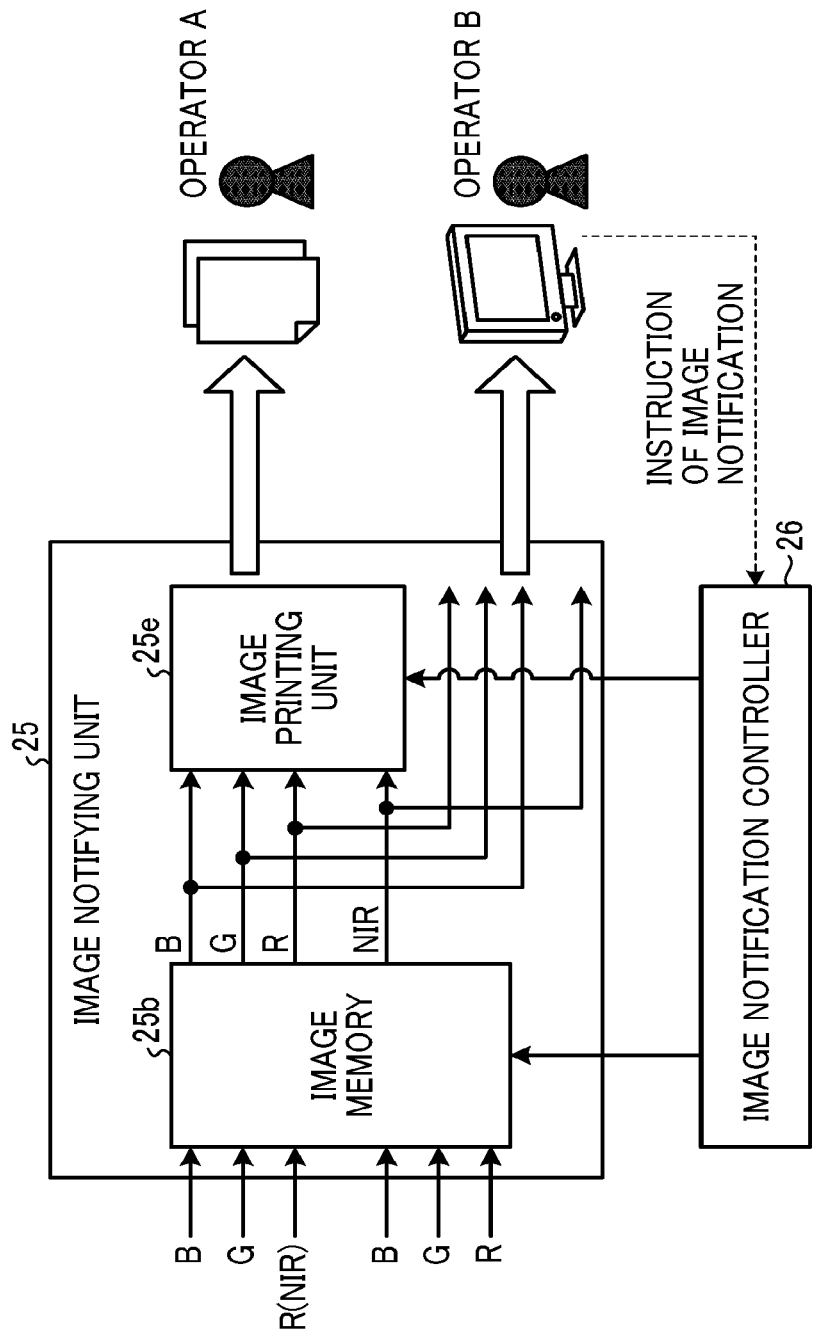

COMPOSITE IMAGE

COMPOSITE IMAGE

<BEFORE ADJUSTMENT>

<AFTER ADJUSTMENT>

<AFTER ADJUSTMENT (BINALIZED)>

<BEFORE ADJUSTMENT>

<AFTER ADJUSTMENT>

<BEFORE CORRECTION>

<AFTER CORRECTION>

READING DEVICE TO READ AND OUTPUT AN INVISIBLE IMAGE INCLUDED IN A DOCUMENT

CROSS-REFERENCE TO RELATED APPLICATIONS

This patent application is based on and claims priority pursuant to 35 U.S.C. § 119(a) to Japanese Patent Application Nos. 2018-152123, filed on Aug. 10, 2018, and 2018-231974, filed on Dec. 11, 2018, in the Japan Patent Office, the entire disclosure of each of which is hereby incorporated by reference herein.

BACKGROUND

Technical Field

Aspects of the present invention relate to a reading device, an image forming apparatus, an authenticity determination system, and a reading method.

Discussion of the Background Art

The security consciousness of a document such as securement of originality or authenticity determination of the document increases. Accordingly, there is known an invisible reading technology of performing securement of originality, authenticity determination, and anti-forgery by embedding invisible information that is not visible to eyes in a document, and by reading the invisible information with invisible light such as infrared light.

SUMMARY

In an aspect of the present invention, there is provided a reading device that includes a light source, an imaging element, a controller, a correcting unit, and a notifying unit. The light source is configured to irradiate an object with light. The imaging element is configured to receive and read the light from the object. The controller is configured to control a second reading operation of reading the object with an invisible image. The correcting unit is configured to perform correction with respect to the invisible image. The notifying unit is configured to notify an outside of at least the invisible image corrected.

In an aspect of the present invention, there is provided a reading device that includes a light source, an imaging element, a controller, a correcting unit, and a notifying unit. The light source is configured to irradiate an object with light. The imaging element is configured to receive and read the light from the object. The controller is configured to control a first reading operation of reading the object with a visible image and a second reading operation of reading the object with an invisible image. The correcting unit is configured to perform correction with respect to at least one of the visible image and the invisible image. The notifying unit is configured to notify an outside of at least the invisible image corrected.

In an aspect of the present invention, there is provided an image forming apparatus that includes the reading device, an original document support device, and an image forming device. The reading device is configured to read an image of an original document. The original document support device is configured to place the original document to a reading position of the reading device. The image forming device is configured to form the image.

In an aspect of the present invention, there is provided an authenticity determination system that includes the reading device and an authenticity determination unit. The authenticity determination unit is configured to determine whether the object is genuine based on the invisible image. An authenticity determination result determined by the authenticity determination unit is notified to the outside by the notifying unit.

In an aspect of the present invention, there is provided a reading method for a reading device configured to receive and read, by an imaging element, light from an object irradiated with light by a light source. The reading method includes controlling a reading operation of reading the object with an invisible image; performing correction with respect to the invisible image; and notifying an outside of at least the invisible image corrected by the correction.

In an aspect of the present invention, there is provided a reading method for a reading device configured to receive and read, by an imaging element, light from an object irradiated with light by a light source. The reading method includes controlling a first reading operation of reading the object with a visible image and a second reading operation of reading the object with an invisible image; performing correction with respect to at least one of the visible image and the invisible image; and notifying an outside of at least the invisible image corrected by the correction.

In an aspect of the present invention, there is provided a non-transitory recording medium storing computer-readable program code that causes a reading device to perform a reading method, the reading device configured to receive and read, by an imaging element, light from an object irradiated with light by a light source. The reading method includes controlling a reading operation of reading the object with an invisible image; performing correction with respect to the invisible image; and notifying an outside of at least the invisible image corrected by the correction.

In an aspect of the present invention, there is provided a non-transitory recording medium storing computer-readable program code that causes a reading device to perform a reading method, the reading device configured to receive and read, by an imaging element, light from an object irradiated with light by a light source. The reading method includes controlling a first reading operation of reading the object with a visible image and a second reading operation of reading the object with an invisible image; performing correction with respect to at least one of the visible image and the invisible image; and notifying an outside of at least the invisible image corrected by the correction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 5A to 5C are diagrams describing an operation and an effect of the image reading process in the image reading device;

FIGS. 11A to 11C are block diagrams illustrating electric connection of respective units of an image forming apparatus according to a fourth embodiment;

FIGS. 13A and 13B are block diagrams illustrating a configuration of an image correcting unit of an image reading device according to a fifth embodiment;

FIG. 14 is a view schematically illustrating configurations of an image reading device and an ADF according to a sixth embodiment;

FIGS. 21A and 21B are block diagrams illustrating electric connection of respective units of an image forming apparatus;

Figure 1:
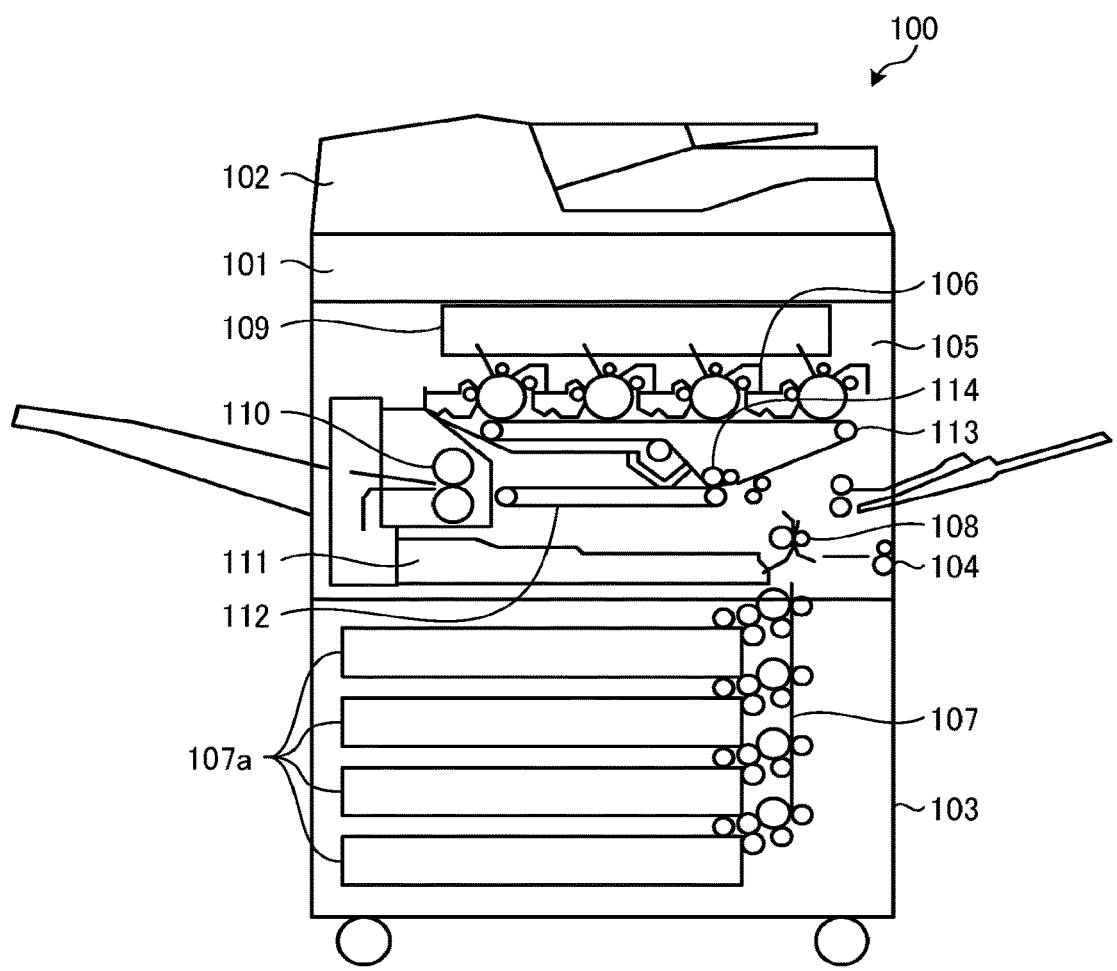
FIG. 1 is a view illustrating a configuration of an example of an image forming apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of a reading device, an image forming apparatus, an authenticity determination system, and a reading method will be described in detail with reference to the accompanying drawings.

First Embodiment

FIG. 1 is a view illustrating an example of a configuration of an image forming apparatus 100 according to a first embodiment. In FIG. 1, the image forming apparatus 100 is an apparatus that is typically referred to as a multifunction peripheral having at least two functions among a copy function, a printer function, a scanner function, and a facsimile function.

The image forming apparatus 100 includes an image reading device 101 that is a reading device, and an automatic document feeder (ADF) 102, and includes an image forming device 103 on a lower side. To describe an internal configuration of the image forming device 103, an external cover is excluded to illustrate an internal configuration.

The ADF 102 is an original document support device that positions an original document of which an image is read at a reading position. The ADF 102 automatically conveys the original document placed on a placing stand to the reading position. The image reading device 101 reads the original document conveyed by the ADF 102 at a predetermined reading position. In addition, the image reading device 101 includes contact glass that is an original document support device on which the original document is placed on an upper surface, and reads the original document on the contact glass at the reading position. Specifically, the image reading device 101 is a scanner including a light source, an optical system, and an image sensor such as a charge coupled device (CCD) on an inner side, and reads reflected light of the original document illuminated with the light source by using the image sensor through an optical system.

The image forming device 103 prints an original document image read by the image reading device 101. The image forming device 103 includes a manual feed roller 104 that manually feeds recording paper, and a recording paper feeding unit 107 that feeds recording paper. The recording paper feeding unit 107 includes a mechanism that delivers recording paper from a multi-stage recording paper feeding cassette 107a. The recording paper that is fed is conveyed to a secondary transfer belt 112 through a registration roller 108.

A toner image on an intermediate transfer belt 113 is transferred to the recording paper that is conveyed on the secondary transfer belt 112 at a transfer part 114.

In addition, the image forming device 103 includes an optical writing device 109, tandem-type image creating units (Y, M, C, and K) 105, the intermediate transfer belt 113, the secondary transfer belt 112, and the like. Through an image creating process by the image creating units 105, an image that is written by the optical writing device 109 is formed on the intermediate transfer belt 113 as a toner image.

Specifically, the image creating units (Y, M, C, and K) 105 rotatably support four photoconductor drums (Y, M, C, and K), and are respectively provided with an image creating element 106 including a charging roller, a developing device, a primary transfer roller, a cleaner unit, and a charge remover at the periphery of each of the photoconductor drums. In the photoconductor drum, the image creating element 106 operates, and an image on the photoconductor drum is transferred onto the intermediate transfer belt 113 by the primary transfer roller.

The intermediate transfer belt 113 is stretched by a drive roller and a driven roller at a nip between the photoconductor drum and the primary transfer roller. A toner image that is primarily transferred to the intermediate transfer belt 113 is secondarily transferred to recording paper on the secondary transfer belt 112 by a secondary transfer device due to travelling of the intermediate transfer belt 113. The recording paper is conveyed to a fixing device 110 by travelling of the secondary transfer belt 112, and the toner image on the recording paper is fixed as a color image. Then, the recording paper is discharged to a paper ejection tray on an outer side of the apparatus. Note that, in the case of double-sided printing, a front side and a rear side of the recording paper is reversed by a reversal mechanism 111, and the reversed recording paper is conveyed onto the secondary transfer belt 112.

Note that, the image forming device 103 is not limited to image formation by an electro-photographic method as described above, and may form an image by an inkjet method.

Next, the image reading device 101 will be described.

Figure 2:
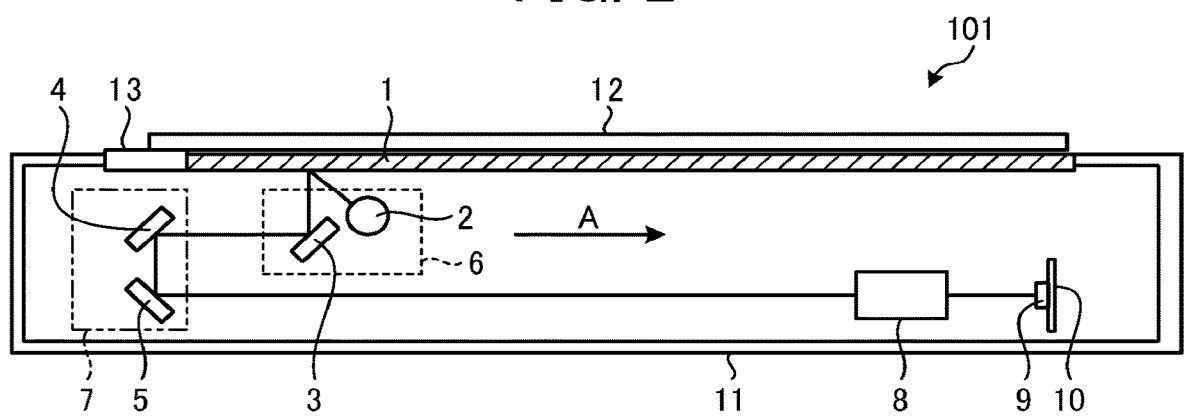
FIG. 2 is a cross-sectional view illustrating a structure of an image reading device in an exemplary manner.

FIG. 2 is a cross-sectional view illustrating a structure of the image reading device 101 in an exemplary manner. As illustrated in FIG. 2, the image reading device 101 includes a sensor substrate 10 including an image sensor 9 that is an imaging element, a lens unit 8, a first carriage 6, and a second carriage 7 at the inside of a main body 11. Examples of the image sensor 9 include CCD or complementary metal oxide semiconductor (CMOS) image sensors, and the like. The first carriage 6 includes a light source 2 that is a light emitting diode (LED), and a mirror 3. The second carriage 7 includes mirrors 4 and 5. In addition, the image reading device 101 includes contact glass 1 and a reference white plate 13 which are provided on an upper surface.

The image reading device 101 allows light from the light source 2 to be emitted toward an upward side while moving the first carriage 6 and the second carriage 7 from a standby position (home position) in a sub-scanning direction (A direction) in a reading operation. In addition, the first carriage 6 and the second carriage 7 causes reflected light from an original document 12 to form an image on the image sensor 9 through the lens unit 8.

In addition, the image reading device 101 reads reflected light from the reference white plate 13 and sets a reference when a power supply is turned on. That is, the image reading device 101 moves the first carriage 6 to a position immediately below the reference white plate 13, turns on the light source 2, and causes reflected light from the reference white plate 13 to form an image on the image sensor 9 to perform gain adjustment.

Figure 3:
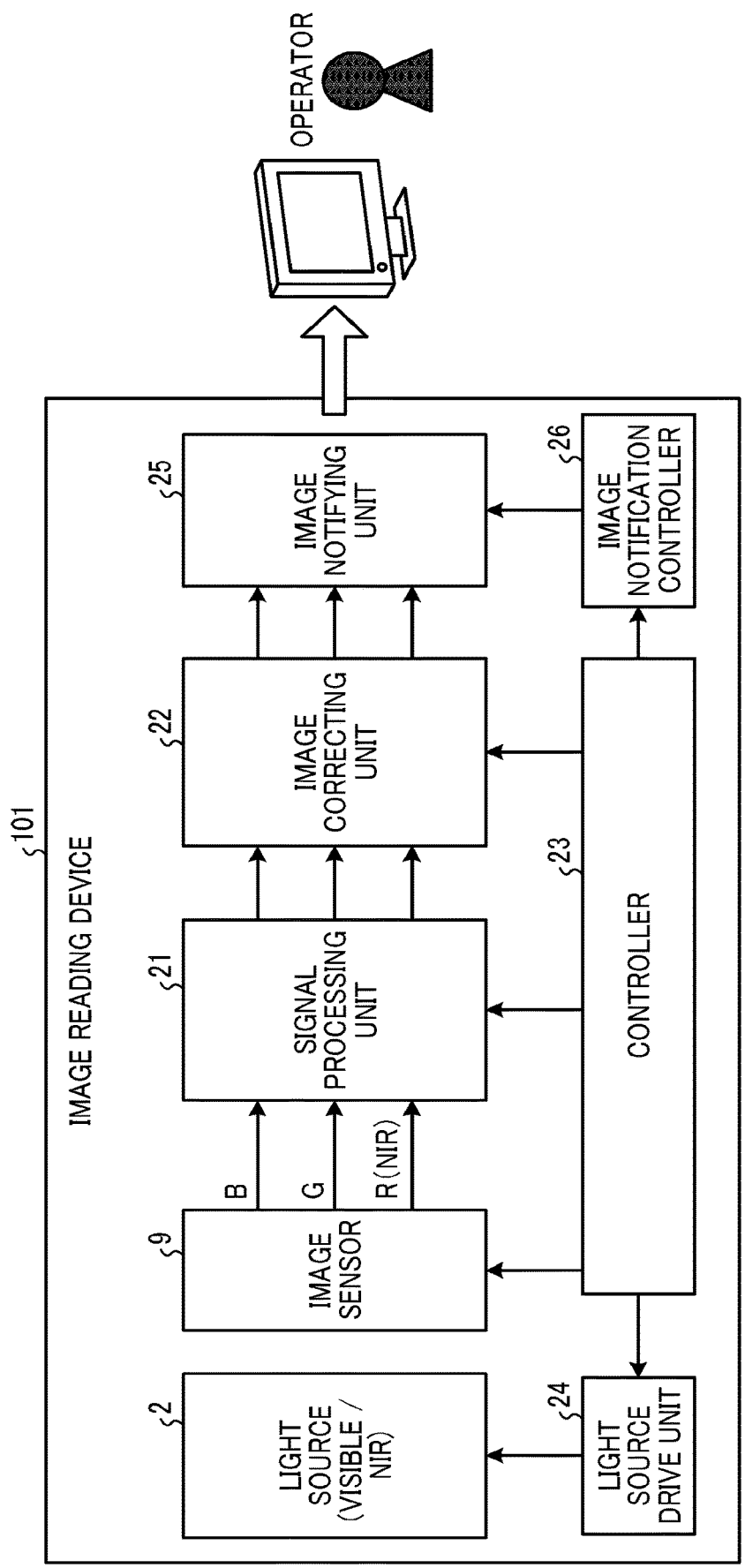
FIG. 3 is a block diagram illustrating electric connection of respective units of the image reading device.

FIG. 3 is a block diagram illustrating electric connection of respective units of the image reading device 101. As illustrated in FIG. 3, the image reading device 101 includes a signal processing unit 21, an image correcting unit 22 that functions as correction unit, a controller 23 that functions as control unit, a light source drive unit 24, an image notifying unit 25 that functions as notification unit, and an image notification controller 26 that functions as notification controller in addition to the image sensor 9 and the light source 2.

The light source 2 is configured for visible and near infrared (NIR). The light source drive unit 24 drives the light source 2.

The image sensor 9 reads reflected light from an object, outputs an RGB signal in the case of reading of a visible image, and outputs an NIR signal in the case of reading of an invisible image. A color filter of a typical image sensor has a characteristic of causing NW light to be transmitted through the color filter, and thus the NW signal is shown in each of RGB outputs in the case of invisible image reading. In this embodiment, for explanation, it is assumed that an NW signal of an R output is used.

The signal processing unit 21 includes a gain control unit (amplifier), an offset control unit, and analog/digital A/D conversion unit (AD converter). The signal processing unit 21 executes gain control, offset control, and A/D conversion with respect to image signals (RGB) output from the image sensor 9 to converts the signal into digital data, and outputs the digital data to the image correcting unit 22 on a rear stage.

The image correcting unit 22 performs various kinds of correction including shading correction, and outputs data after correction to the image notifying unit 25.

The image notifying unit 25 outputs an image to a display or the like so that an operator is easy to confirm an image.

The image notification controller 26 controls an image notification condition with respect to the image notifying unit 25 in correspondence with a notification conditions that is designated from an outside (e.g., an external device or an external unit).

The controller 23 selectively controls a visible image mode or an invisible (NIR) image mode, and controls setting of respective units including the light source drive unit 24, the image sensor 9, the signal processing unit 21, the image correcting unit 22, and the image notification controller 26. The controller 23 selectively controls the visible image mode (first reading operation) or the invisible (NIR) image mode (second reading operation), and controls mode-corresponding setting of the respective units.

Next, a flow of an image reading process under control of the controller 23 will be described. In an image reading operation under control of the controller 23, control is performed to switch various kinds of setting in accordance with whether the operation is the visible image mode or the NIR image mode. Switching control is performed with respect to an image sensor mode (for visible/NIR), a signal processing mode (for visible/NIR), a light source mode (visible light/NIR light), and image correction (for visible/NIR).

Figure 4:
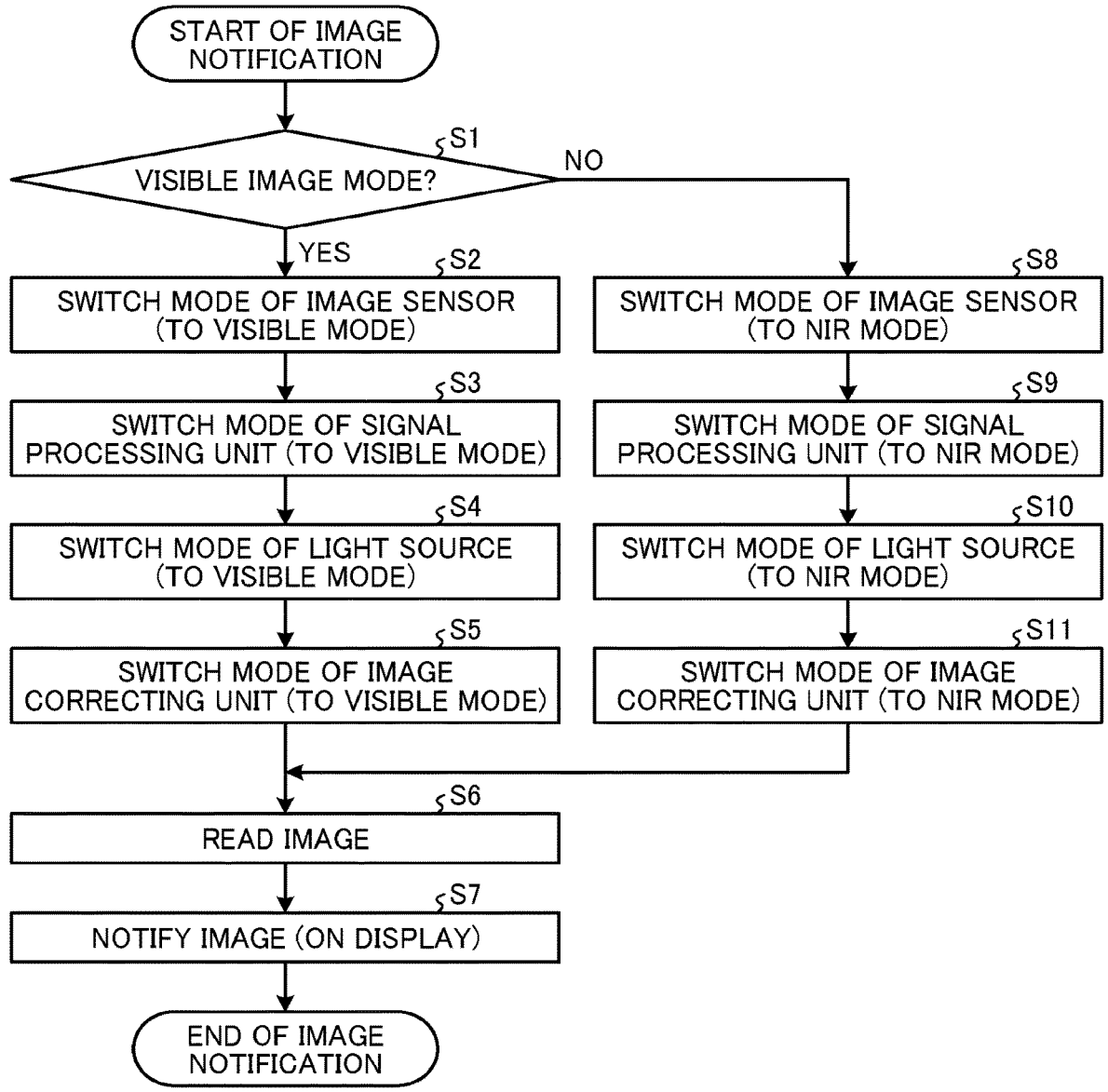
FIG. 4 is a flowchart schematically illustrating a flow of an image reading process.

FIG. 4 is a flowchart schematically illustrating a flow of the image reading process. As illustrated in FIG. 4, first, the controller 23 determines whether or not the visible image mode is designated (step S1).

In a case where the visible image mode is designated (Yes in step S1), the controller 23 proceeds to step S2. In step S2, the controller 23 executes mode switching of the image sensor 9 to set the mode to "visible mode".

Next, the controller 23 executes mode switching of the signal processing unit 21 to set the mode to "visible mode" (step S3), executes mode switching of the light source 2 to set the mode to "visible mode" (step S4), and executes mode switching of the image correcting unit 22 to set the mode to "visible mode" (step S5).

Next, in step S6, the controller 23 executes image reading.

In subsequent step S7, the controller 23 causes the image notifying unit 25 to display a read image on a display.

On the other hand, in a case where the NIR image mode is designated (No in step S1), the controller 23 proceeds to step S8. In step S8, the controller 23 executes mode switching of the image sensor 9 to set the mode to "NIR mode".

Next, the controller 23 executes the mode switching of the signal processing unit 21 to set the mode to "NIR mode" (step S9), executes the mode switching of the light source 2 to set the mode to "NIR mode" (step S10), and executes the mode switching of the image correcting unit 22 to set the mode to "NIR mode" (step S11).

Next, in step S6, the controller 23 executes image reading.

In subsequent step S7, the controller 23 causes the image notifying unit 25 to display a read image to display on the display.

That is, in the image reading process of this embodiment, reading of a document that is set as a target is initiated after setting of respective modes, and an image read in any mode of the visible image mode and the NIR image mode is displayed on the display.

For example, in the case of the visible image mode, the mode is used when confirming described content (information) of a document, and in the case of the NIR image mode, the mode is used when performing authenticity determination of the document.

As described above, when light-emission of a light source is switched between visible reading and NIR reading, it is possible to selectively read a visible image and an invisible image, and it is possible to perform authenticity determination by the invisible image reading.

Next, an operation and an effect of the image reading process in the image reading device 101 will be described.

In recent years, invisible information is embedded in various documents such as a seal registration document, a resident card, and a tax payment certificate as well as an identification card by invisible information embedding (latent image) technology, and this enhances the security of the document. With regard to embedding of the invisible information, for example, when copying a document with a copying machine, the embedded information is made to disappear.

Here, FIGS. 5A to 5C are diagrams describing an operation and an effect of the image reading process in the image reading device 101. FIG. 5A illustrates an example of a certificate (original document) as a document in which invisible (NIR) information is embedded. Net information of the certificate (certification content, an identification number, an issue date, an issuer, and the like) is printed as visible information. On the other hand, on a lower-right side of the certificate, a "positive" character surrounded by a circle mark as invisible information is embedded and is not visually recognized. The invisible information functions as an authenticity determination mark, and the authenticity is determined depending on presence or absence of the mark.

FIG. 5B illustrates an image obtained by reading the certificate in FIG. 5A in the visible image mode. In the visible image mode, visible information of the certificate is read, and an operator can confirm the net information described in the certificate. However, the "positive" character that is invisible information is printed as invisible information, and thus the character is not read on the image, and the information disappears.

On the other hand, FIG. 5C illustrates an image obtained by reading the certificate in FIG. 5A in the NIR image mode. In the NIR image mode, in contrast to the visible image mode, the visible information that is the net information of the certificate is not read, and only the "positive" character that is invisible information is read, and thus an operator can confirm the authenticity determination mark described in the certificate. At this time, in a case where the certificate is genuine or an original document, since the authenticity determination mark is read, the certificate is determined as true (genuine), but in a case where the certificate is fake (spurious) or duplication (replication), since the authenticity determination mark is not read, the certificate is determined as fake (spurious).

As described above, according to this embodiment, an operator side is notified of the NIR image (raw data) that is intermediate information instead of a final determination result, and thus a user can determine validity of the determination result of the authenticity determination.

Note that, the invisible embedding technology may use visible color materials (CMYK), or invisible ink (transparent in a visible region, and absorbed in an NIR region), or may be any method as long as visual recognition is difficult and reading is possible with NIR.

In addition, in this embodiment, description has been given with reference to image reading in an NIR (near infrared) region as invisible reading. However, typically, it is known that a pigment-based color filter shows high transmittance in an NIR (800 to 1000 nm) region, and the Si image sensor 9 also has quantum sensitivity. Accordingly, when using the wavelength region, the image sensor 9 can be used in a high-sensitivity state, and can perform invisible reading with high efficiency.

In a reading device of the related art, the operator side is notified of only a final result obtained by analyzing the read NIR image, and thus it is difficult to improve precision of the authenticity determination. According to this embodiment, the operator side is notified of the NIR image (raw data) that is intermediate information instead of the final result, and thus a user can determined validity of a determination result of the authenticity determination.

In addition, according to this embodiment, the second reading operation is a reading operation in an infrared region, and thus it is possible to efficiently perform invisible reading.

Second Embodiment

Next, a second embodiment will be described.

An image reading device 101 of the second embodiment is different from the first embodiment in that an image is stored and precision of the authenticity determination is enhanced. Hereinafter, in description of the second embodiment, description of the same portion as the portion in the first embodiment will be omitted, and description will be given of a portion different from the first embodiment.

In the first embodiment, a user determines validity of the authenticity determination result in accordance with determination (eyes) of human beings. However, it is required to perform the authenticity determination at timing of performing image reading, that is, in real time, and thus it is not suitable for a case where a plurality of persons performs check.

Here, in the second embodiment, the NIR image that is used in the authenticity determination is stored at once and is given in notification to raise precision of the authenticity determination.

Figure 6A:
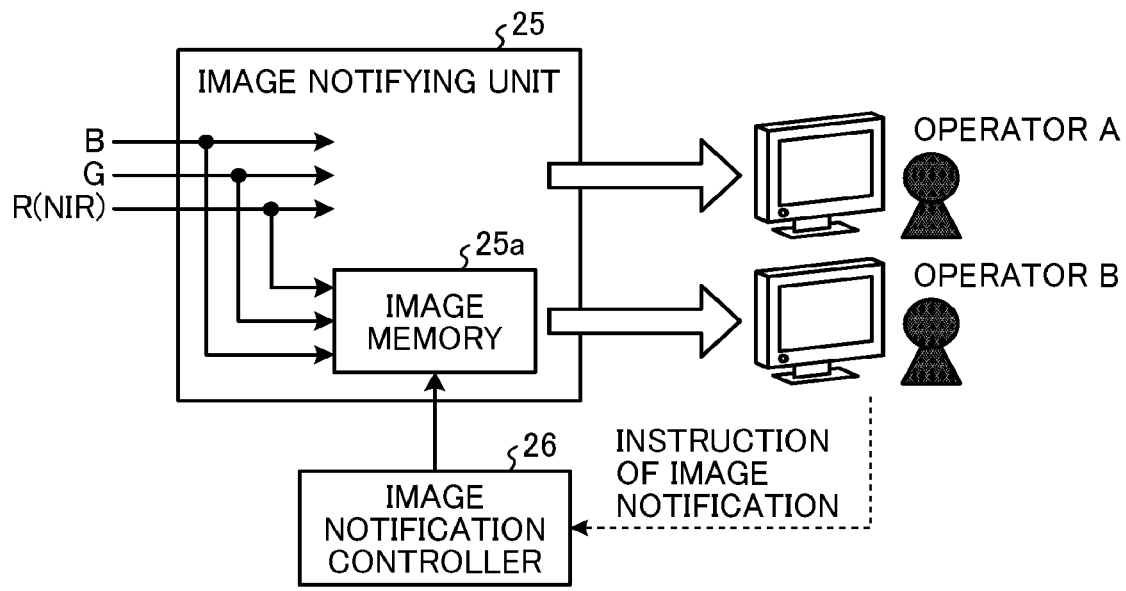
FIGS. 6A and 6B are block diagrams illustrating a configuration of an image notifying unit of an image reading device according to a second embodiment.
Figure 6B:
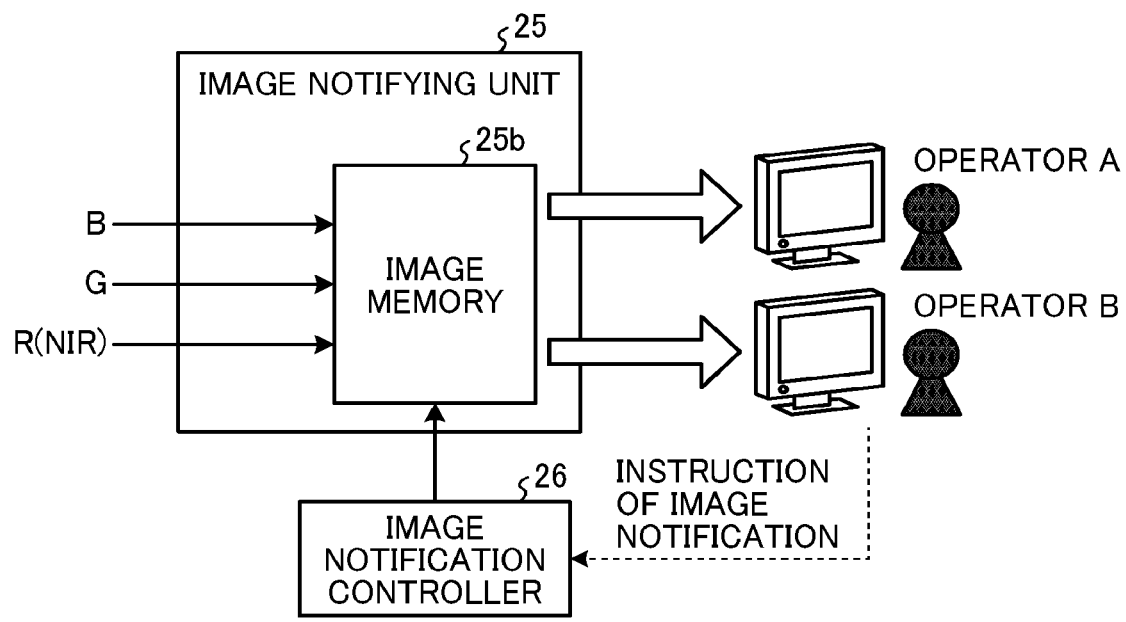

FIGS. 6A and 6B are block diagrams illustrating a configuration of the image notifying unit 25 of the image reading device 101 according to the second embodiment. As illustrated in FIG. 6A, the image notifying unit 25 displays an input image in real time, and an operator A performs the authenticity determination as in the first embodiment. In addition to this, an image notifying unit 25 illustrated in FIG. 6A includes an image storage unit 25*a* that functions as storage unit that stores a read invisible image at once.

According to this configuration, when the operator B performs the authenticity determination, a notification instruction is given to the image notification controller 26, and an image stored in the image storage unit 25*a* is called at notification instruction timing and is given to the operator B side in notification.

In addition, an image notifying unit 25 illustrated in FIG. 6B includes an image storage unit 25*b* that functions as storage unit that stores a read invisible image.

According to this configuration, when the operators A and B perform the authenticity determination, the operators A and B give a notification instruction to the image notification controller 26 in combination, image stored in the image storage unit 25*b* is called at notification instruction timing, and the operators A and B are notified of the image.

As described above, when the read NIR image is stored at once and is given in notification, the authenticity determination can be performed at an arbitrary timing, and for example, multiple-check such as authenticity determination by a plurality of persons can be performed. According to this, it is possible to raise precision of the authenticity determination.

Figure 7:
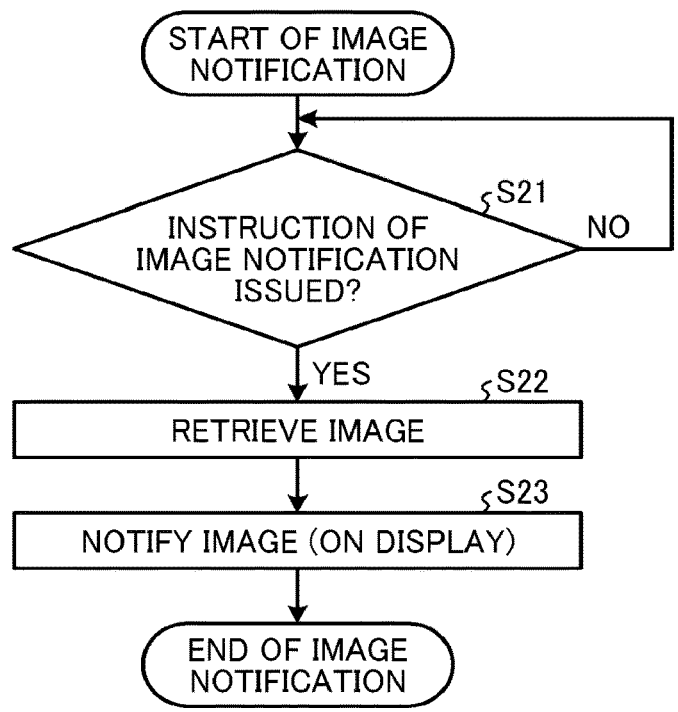
FIG. 7 is a flowchart schematically illustrating a flow of an image notification process.

FIG. 7 is a flowchart schematically illustrating a flow of an image notification process. As illustrated in FIG. 7, in a case where an image is called form an image storage unit, first, the image notification controller 26 confirms whether or not an image notification instruction is given from an operator (step S21).

When it is determined that the image notification instruction is given (Yes in step S21), the image notification controller 26 calls an NIR image from the image storage units 25*a* and 25*b* (step S22), and gives a notification of (displays) an image with a display (step S23). Then, an operator performs the authenticity determination on the NIR image.

As described above, according to this embodiment, it is possible to raise precision of the authenticity determination due to multiple-check by a plurality of persons or a plurality of times.

Third Embodiment

Next, a third embodiment will be described.

An image reading device 101 of the third embodiment is different from the first embodiment and the second embodiment in that the authenticity determination is made to be easy regardless of an embedding position of the invisible information. Hereinafter, in description of the third embodiment, description of the same portion as the portions in the first embodiment and the second embodiment will be omitted, and description will be given of a portion different from the first embodiment and the second embodiment.

As described in the first embodiment, when reading invisible embedded information in various media including a general document, a position at which the invisible embedded information exists may be known, but the position may not be known.

Here, in this embodiment, an image notification method is changed in correspondence with a situation in which the position of the invisible information is known or not known to easily perform the authenticity determination regardless of the situation in which the position of the invisible information is known or not known.

Figure 8:
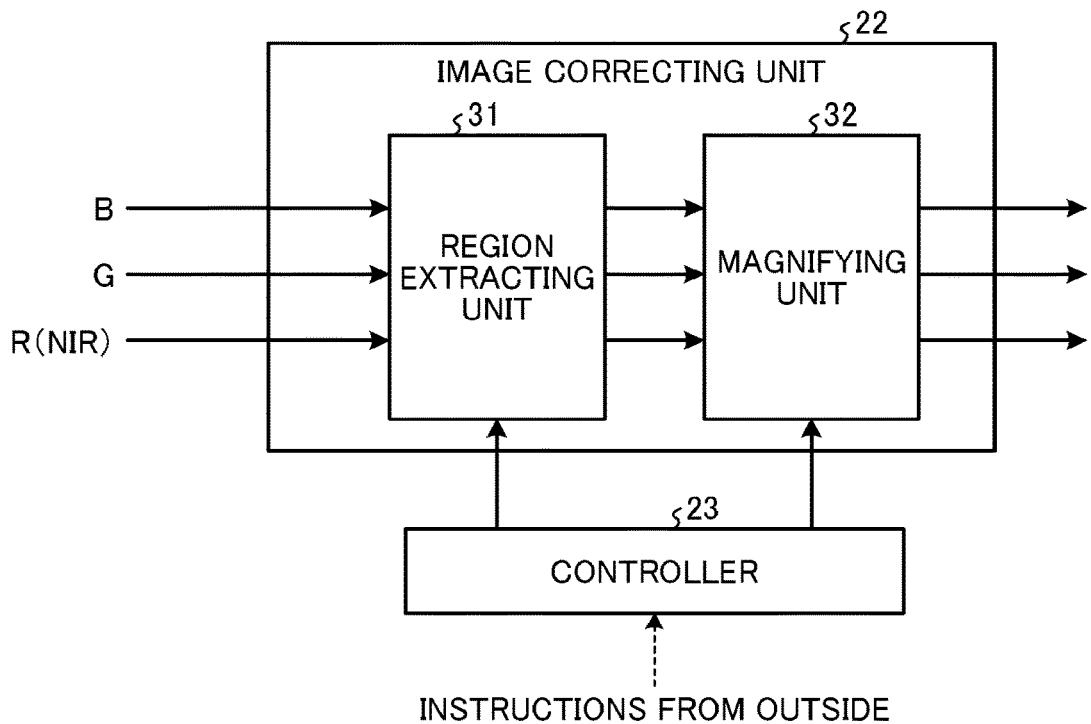
FIG. 8 is a block diagram illustrating a configuration of an image correcting unit of an image reading device according to a third embodiment.

FIG. 8 is a block diagram illustrating a configuration of an image correcting unit 22 of the image reading device 101 according to the third embodiment. As illustrated in FIG. 8, the image correcting unit 22 includes a region extracting unit 31 and a magnifying unit 32.

The region extracting unit 31 extracts an image region designated with a mode determined by an external instruction. The magnifying unit 32 variably magnifies the extracted image region extracted by the region extracting unit 31. In variable magnification, like enlargement, contraction, equivalent magnification (non-magnification), a variable magnification can be selected. However, when performing the authenticity determination, enlargement and equivalent magnification are actually used. A variable magnification condition is also designated with a mode determined by the external instruction.

Next, a flow of an image reading process under control of the controller 23 will be described.

Figure 9:
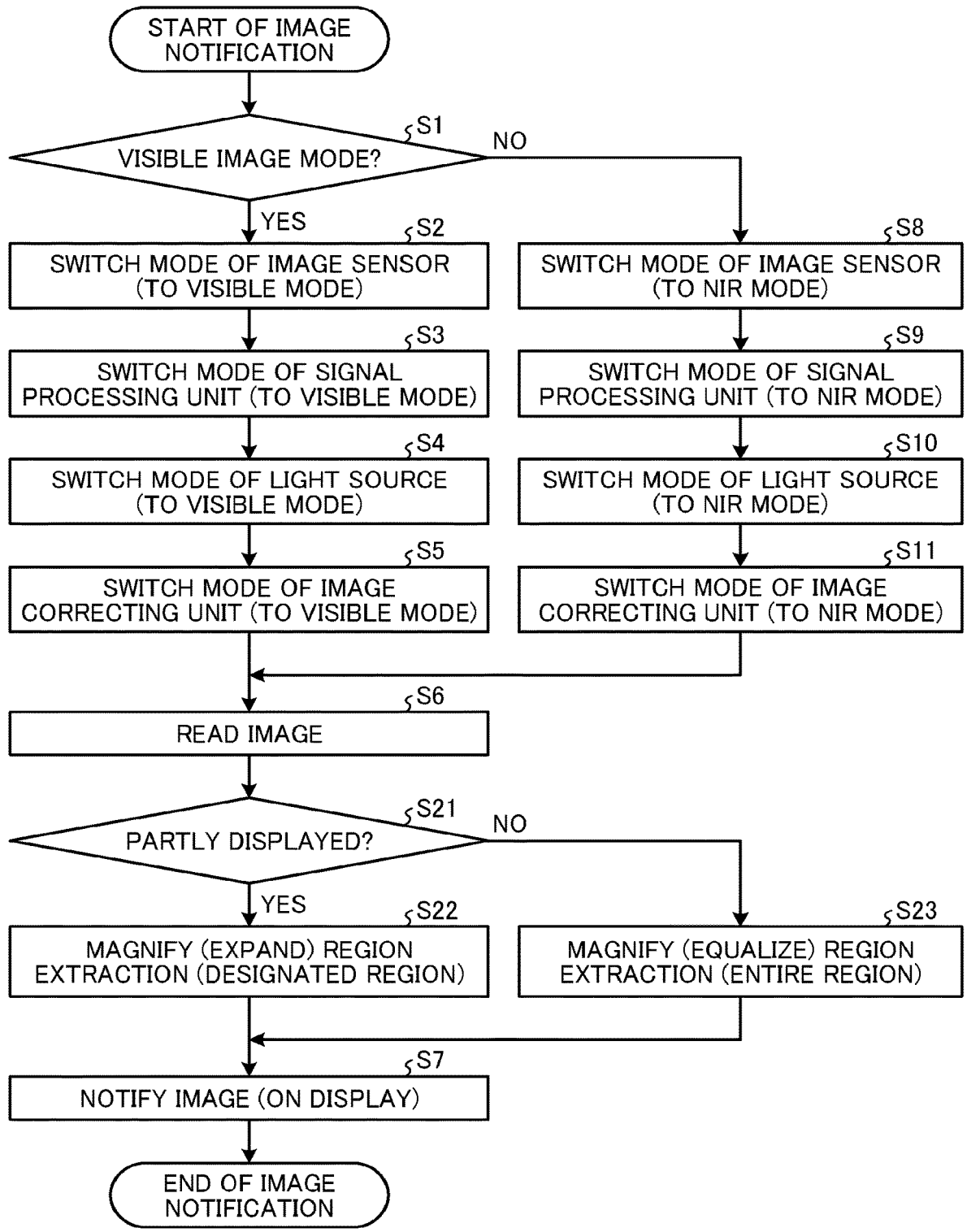
FIG. 9 is a flowchart schematically illustrating a flow of an image reading process in a case where a region extraction process and a variable magnification process exist.

FIG. 9 is a flowchart schematically illustrating the flow of the image reading process in a case where a region extraction process and a variable magnification process exist. Note that, processes in step S1 to step S11 do not vary from the processes described in FIG. 4, and thus description will be omitted. A difference from the flowchart described in FIG. 4 is in that the region extraction process and the variable magnification process exist between the reading process (step S6) and the image notification process (step S7).

When executing image reading (step S6), the controller 23 determines whether or not display is partial display (step S21).

In a case where it is determined that display is partial display (Yes in step S21), the controller 23 controls the image correcting unit 22 to perform region extraction (designated region) and variable magnification (enlargement) (step S22). For example, in a case where a position of invisible information is known, a partial site is required, and thus a corresponding region of an image is extracted and is displayed in an enlarged manner.

On the other hand, in a case where it is determined that display is not partial display (No in step S21), the controller 23 controls the image correcting unit 22 to perform region extraction (entirety) and variable magnification (equivalent magnification) (step S23). For example, in a case where a position of invisible information is not known, it is required to find the invisible information from the entirety of an image, and thus the entirety of the image is set as an extraction target, and is displayed in an equivalent magnification.

Figure 10A:
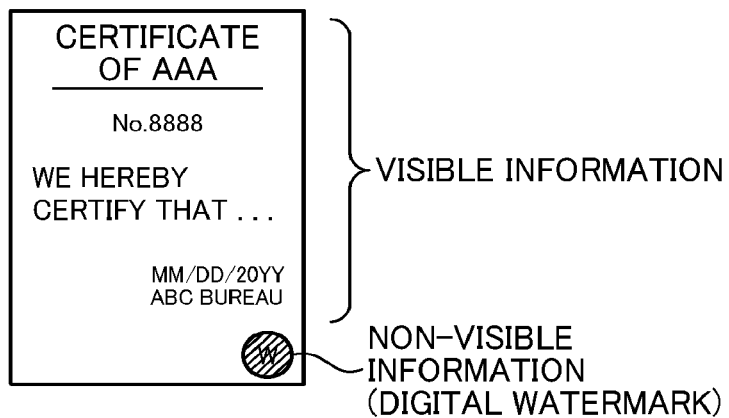
FIGS. 10A to 10C are diagrams describing an operation and an effect of an image reading process in the image reading device.
Figure 10B:
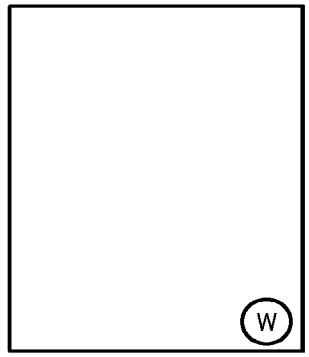
Figure 10C:

FIGS. 10A to 10C are diagrams describing an operation and an effect of the image reading process in the image reading device 101. FIG. 10A illustrates an example of a document (original document) in which invisible (NIR) information is embedded. Net information of a certificate (certification content, an identification number, an issue date, an issuer, and the like) is printed as visible information. On the other hand, on a lower-right side of the certificate, a "positive" character surrounded by a circle mark as invisible information is embedded and is not visually recognized. The invisible information functions as an authenticity determination mark, and the authenticity is determined depending on presence or absence of the mark.

FIG. 10B illustrates an example of a case where a position of invisible information is not known. In this case, an operator does not know the position of the invisible information, and thus it is required to find where the authenticity determination mark exists on the image. According to this, the entirety of the image is set as an extraction target and is displayed in an equivalent magnification in order for the invisible information to be easily found from the entirety of the image. Accordingly, the authenticity determination is made to be easy.

On the other hand, FIG. 10C illustrates an example in a case where the position of the invisible information is known. In this case, the operator knows where the position of the invisible information exists on the image, and thus it is not required to find where the authenticity determination mark exists. However, in a case where a pattern of the authenticity determination mark is complicated, it is required to accurately investigate the pattern (FIG. 10C illustrates an example in which the circle mark is a chain line instead of a continuous line). According to this, only a corresponding region of the image is extracted and the portion is displayed in an enlarged manner to realize identification of the complicated pattern. As a result, the authenticity determination is made to be easy.

As described above, according to this embodiment, even in a case where a printing location of the invisible embedded information is not known, it is possible to make the authenticity determination easy.

In addition, even in the case of determining a minute pattern of the invisible embedded information, it is possible to make the authenticity determination easy.

Fourth Embodiment

Next, a fourth embodiment will be described.

An image forming apparatus 100 of the fourth embodiment is different from the first embodiment to the third embodiment in that the authenticity determination is performed on a printed image. Hereinafter, in description of the fourth embodiment, description of the same portion as the portions in the first embodiment to the third embodiment will be omitted, and description will be given of a portion different from the first embodiment to the third embodiment.

Hereinbefore, description has been given of a case where a read NIR image is displayed on a display or the like and the authenticity determination is performed. However, it is required to provide a plurality of displays in a case where different operators or customers, and the like are instantaneously notified of an image, and in the case of performing multiple-check, and thus there is a disadvantage that handling of an image for the authenticity determination is not practical.

Here, in this embodiment, the authenticity determination is performed by using a printed image obtained by printing a read NIR image to improve image handling, and to make the authenticity determination easier.

Figure 11B:
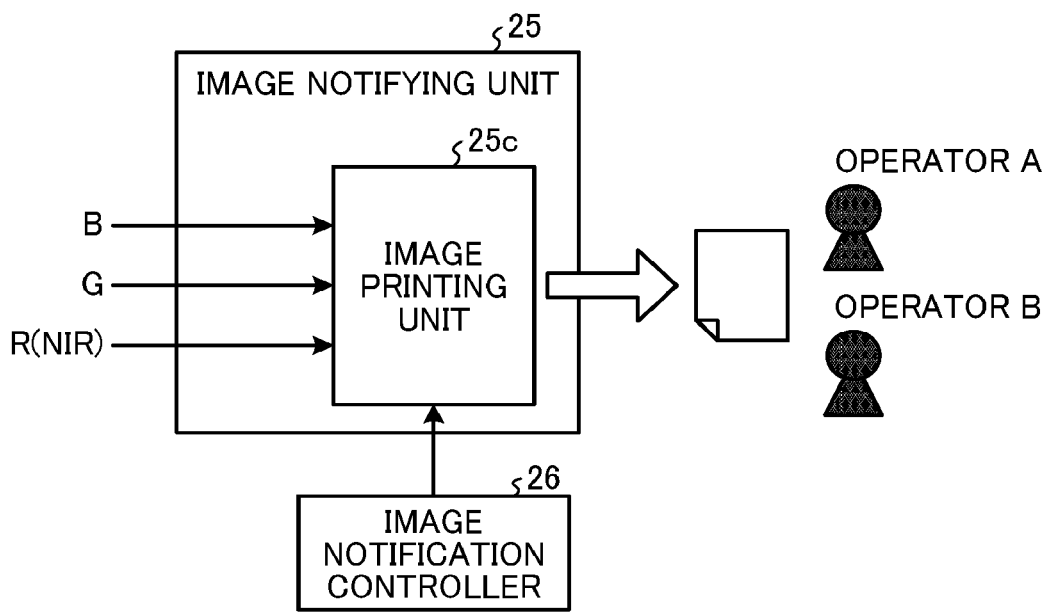
Figure 11C:
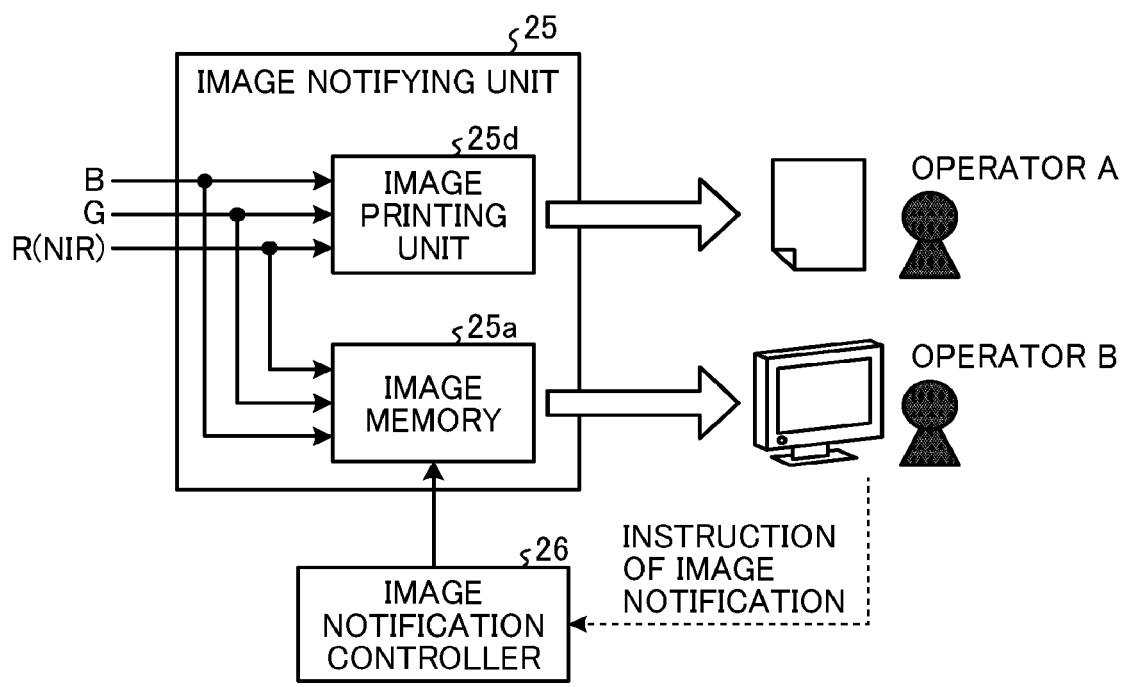

FIGS. 11A to 11C are block diagrams illustrating electric connection of respective units of the image forming apparatus 100 according to the fourth embodiment. FIG. 11A illustrates electric connection of the respective units of the image forming apparatus 100. FIG. 11A is different from FIG. 3 described in the first embodiment in that the image notifying unit 25 gives a notification with a printed image (paper medium) through the image forming device 103 instead of displaying with a display.

FIG. 11B is a block diagram illustrating an example of a configuration of the image notifying unit 25. As illustrated in FIG. 11B, the image notifying unit 25 includes an image printing unit 25c. The image printing unit 25c causes the image forming device 103 to print an input image under control of the image notification controller 26.

According to this embodiment, in the case of performing the authenticity determination on the printed image, even in the case of being checked by a plurality of persons, multiple-check is possible only by presenting the printed image. In addition, the printed image becomes evidence (the ground for determination). Accordingly, even in a case where the evidence is requested by a customer and is presented to the customer, the printed image may be presented as is.

FIG. 11C is a block diagram illustrating another example of the configuration of the image notifying unit 25. As illustrated in FIG. 11C, the image notifying unit 25 includes an image printing unit 25d and an image storage unit 25a. The image printing unit 25d causes the image forming device 103 to print an input invisible image under control of the image notification controller 26. A configuration in which an operator performs authenticity determination of the printed image is the same as the configuration in FIG. 11B, and thus multiple-check becomes easy as described above.

In addition, the image storage unit 25a stores the input invisible image in combination with printing. According to this, when the invisible image stored in the image storage unit 25a is displayed on a display at an arbitrary timing, an additional operator can perform the authenticity determination. In this case, the following situation is considered. That is, the operator performs the authenticity determination with both the printed image and the display, and the printed image is presented to a customer as evidence as is.

Figure 12:
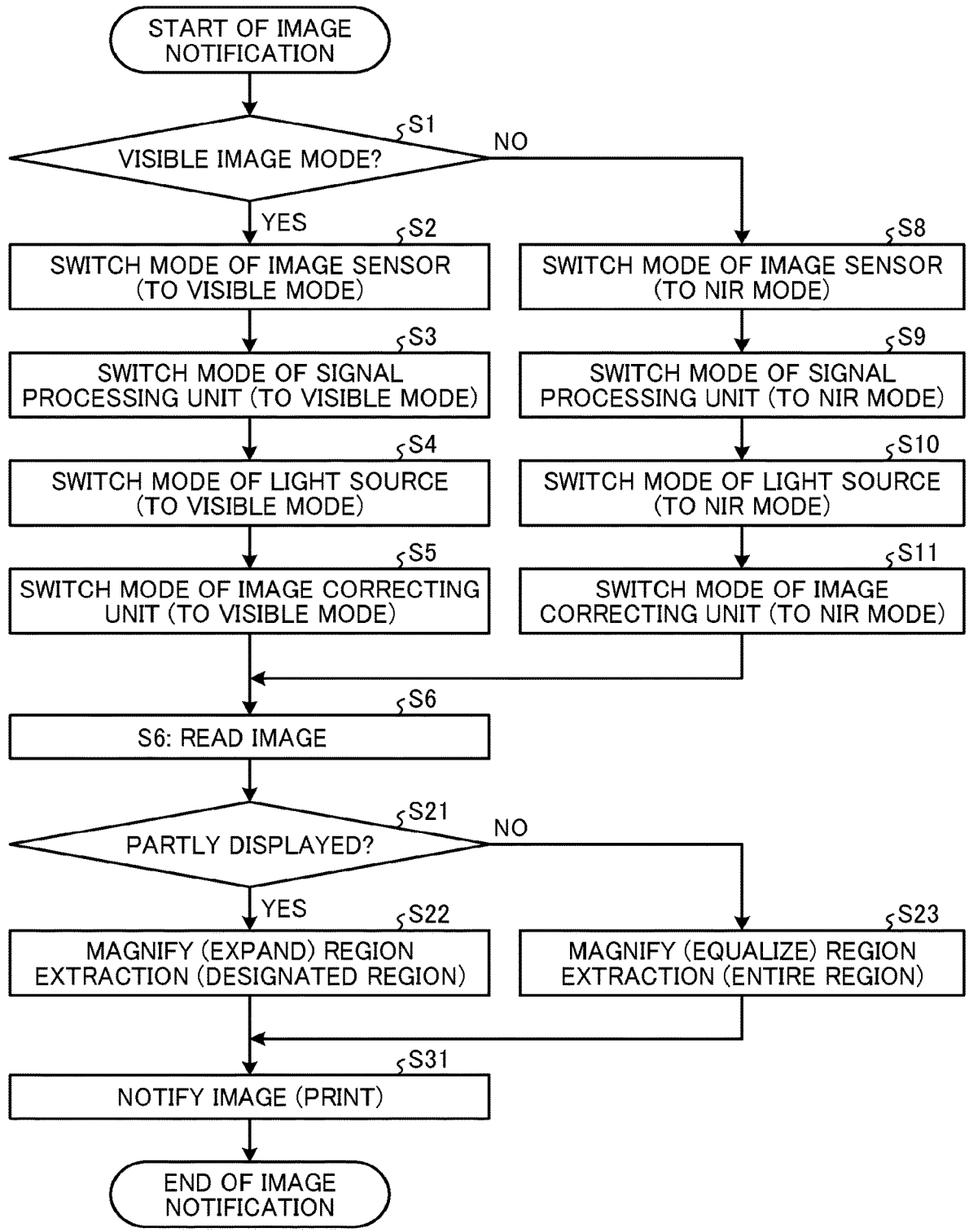
FIG. 12 is a flowchart schematically illustrating a flow of an image reading process when performing authenticity determination on a printed image.

FIG. 12 is a flowchart schematically illustrating a flow of the image reading process when performing the authenticity determination on the printed image. Note that, processes in steps S1 to S6, steps S8 to S11, and steps S21 to S23 do not vary from the processes described in FIG. 9, and description will be omitted. A difference from the flowchart described in FIG. 9 is in that image notification (displaying with a display) (step S7) is changed to image notification (printing) (step S31).

As described above, according to this embodiment, it is possible to easily perform multiple-check of the authenticity determination.

Fifth Embodiment

Next, a fifth embodiment will be described.

An image reading device 101 of the fifth embodiment is different from the first embodiment to the fourth embodiment in that the invisible (NIR) image is converted into a monochrome image. Hereinafter, in description of the fifth embodiment, description of the same portion as the portions in the first embodiment to the fourth embodiment will be omitted, and description will be given of a portion different from the first embodiment to the fourth embodiment.

Hereinbefore, description has been given of a configuration in which RGB is used even in the invisible image, but the NIR image does not have a color concept, and thus it is natural for the NIR image to be handled as monochrome data. In addition, when the NIR image is handled as a color image, there is a disadvantage that a file size increases, or displaying with a display in the image notifying unit 25 gets late.

Here, in this embodiment, the invisible image is converted into monochrome image data, and thus an image file size is minimized, and image notification is performed at a high speed.

Figure 13B:
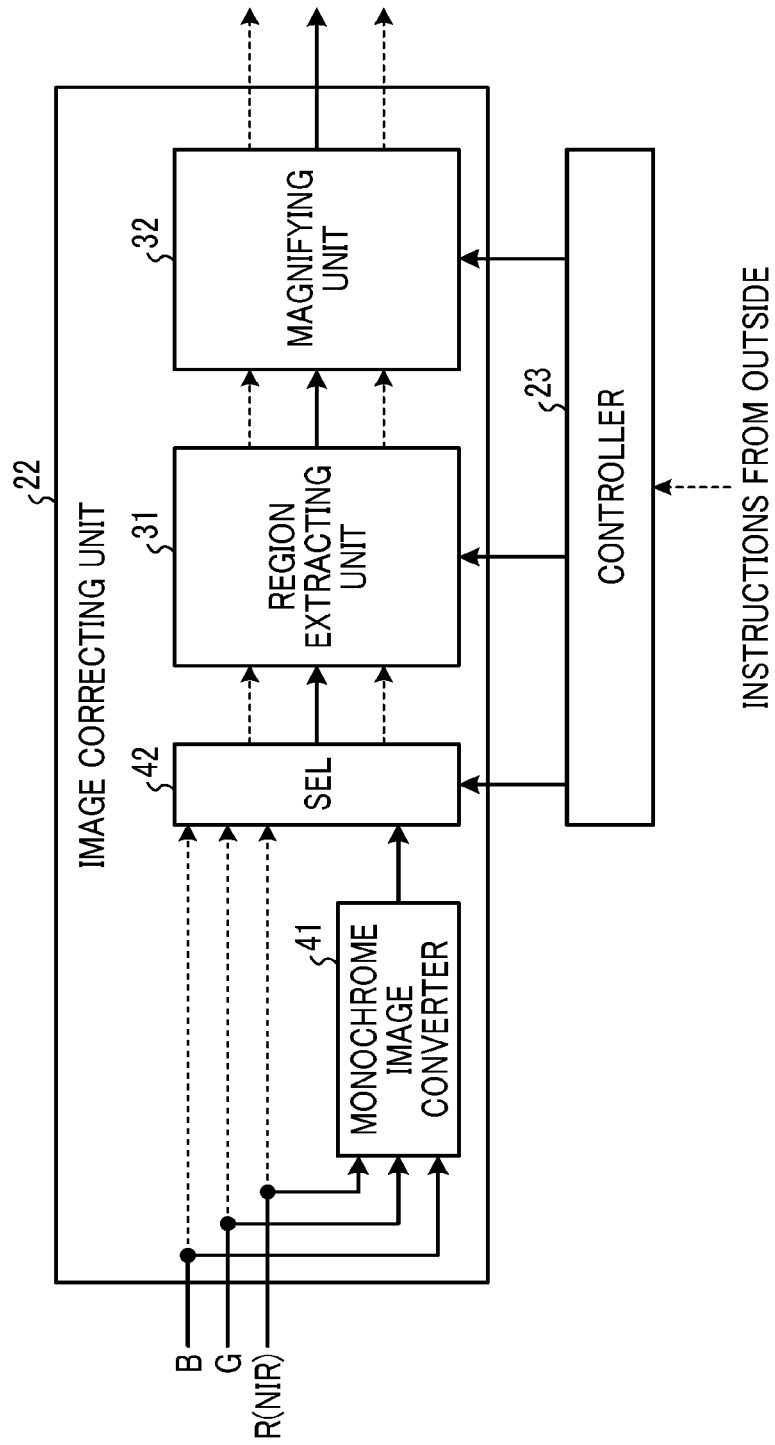

FIGS. 13A and 13B are block diagrams illustrating a configuration of an image correcting unit 22 of the image reading device 101 according to the fifth embodiment. As illustrated in FIG. 13A, the image correcting unit 22 includes a monochrome image converter 41 and a selector (SEL) 42 in addition to the region extracting unit 31 and the magnifying unit 32.

The monochrome image converter 41 converts RGB data into monochrome data.

The selector 42 selects RGB data and converted monochrome data. More particularly, the selector 42 is controlled to select either the RGB data or the monochrome data from the controller 23 by an external instruction.

FIG. 13B illustrates an image path in the case of an NIR image mode. As illustrated in FIG. 13B, in the case of the NIR image mode, the monochrome image converter 41 becomes valid, and the selector 42 on a rear stage selects monochrome data (NIR image). After the selector 42, the monochrome data (single channel data) is transmitted, and thus it is possible to reduce an image file size to approximately ⅓ times the RGB image. In addition, when the file size is reduced, a time required for the image notifying unit 25 to notify an external side of the image is also shortened, and thus high-speed notification becomes possible.

As described above, according to this embodiment, the invisible image is converted into the monochrome image, and thus it is possible to perform image notification to an outside (e.g., an external device or an external unit) at a high speed and at a low cost.

Sixth Embodiment

Next, a sixth embodiment will be described.

An image forming apparatus 100 of the sixth embodiment is different from the first embodiment to the fifth embodiment in that productivity of the authenticity determination is raised. Hereinafter, in description of the sixth embodiment, description of the same portion as the portions in the first embodiment to the fifth embodiment will be omitted, and description will be given of a portion different from the first embodiment to the fifth embodiment.

The image forming apparatus 100 of this embodiment includes an ADF 102 that continuously conveys a plurality of original documents to a reading position. It is possible to raise productivity of the authenticity determination by combining the image reading device 101 and the ADF 102 with each other.

FIG. 14 is a view schematically illustrating configurations of the image reading device 101 and the ADF 102 according to the sixth embodiment. The configuration of the image reading device 101 is the same as the configuration in FIG. 2, and thus description will be omitted.

The ADF 102 transports a plurality of original documents 12 placed on an original document tray 51 to a conveyance route 53 sheet by sheet by using a pickup roller 52. An image of each of the original documents 12 transported to the conveyance route 53 is read by the image reading device 101 at a scanner reading position (light source irradiation position) 54. Here, the reading position 54 is a position to which light from the light source 2 is irradiated. The original document 12 after image reading is output to a paper ejection tray 55. The operations are continuously performed until all of the original documents 12 are ejected. As described above, even in a case where a plurality of documents exists, when the ADF 102 is used, reading productivity, that is, productivity of the authenticity determination can be raised.

Next, a flow of the image reading process under control of the controller 23 will be described.

Figure 15:
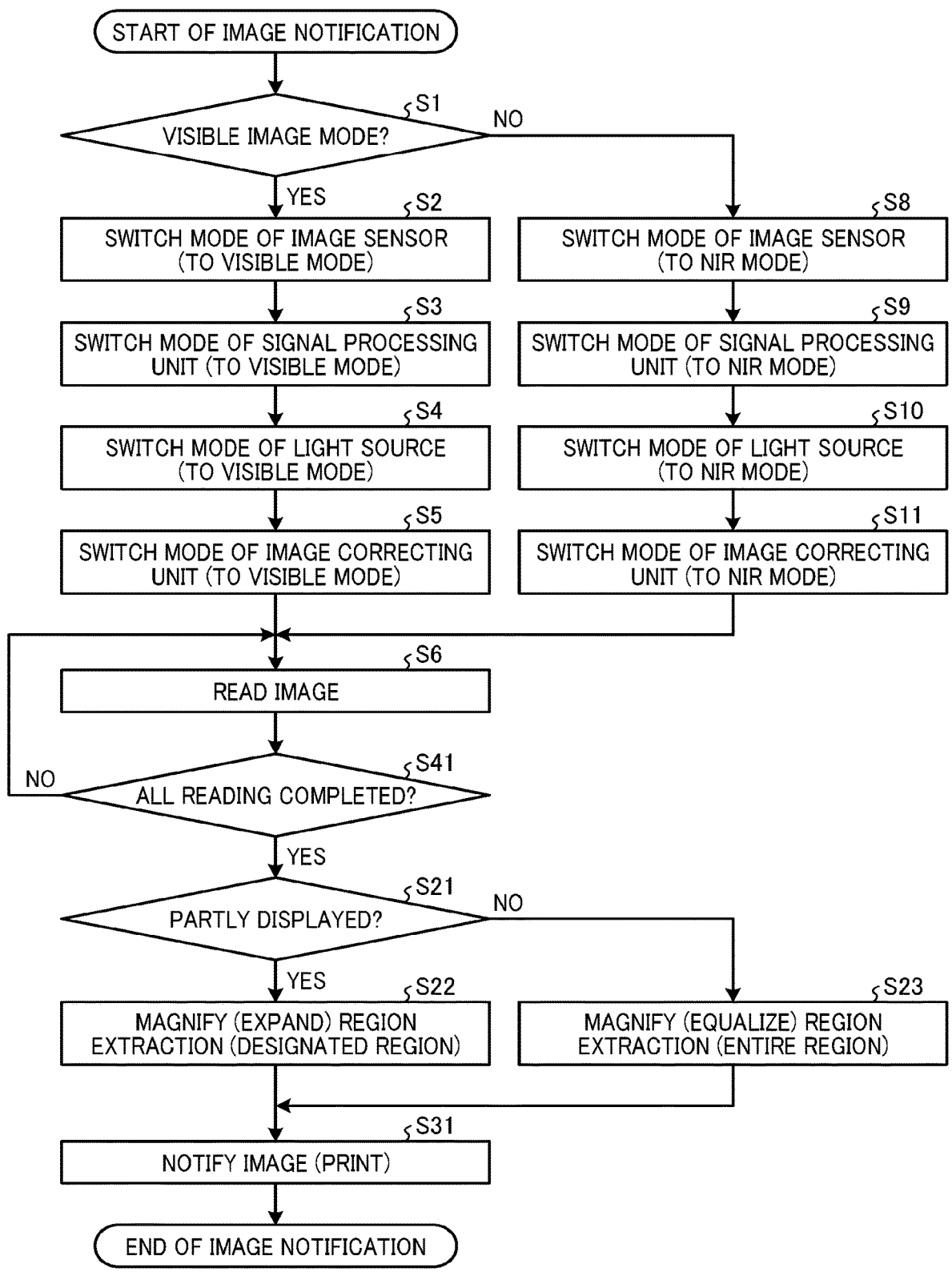
FIG. 15 is a flowchart schematically illustrating a flow of an image reading process in a configuration using the ADF.

FIG. 15 is a flowchart schematically illustrating a flow of the image reading process in a configuration using the ADF 102. Note that, processes in steps S1 to S6, steps S8 to S11, steps S21 to S23, and step S31 do not vary from the processes described in FIG. 12, and thus description will be omitted. A difference from the flowchart described in FIG. 12 is in that a branch for determining whether or not all original documents (documents) have been read after image notification (step S41) is added.

In a case where it is determined that reading of all original documents (documents) is completed (Yes in step S41), the controller 23 terminates a reading operation, and proceeds to step S21. On the other hand, in a case where it is determined that reading of all original documents (documents) is not completed (No in step S41), the controller 23 returns to step S6 to perform reading again, and performs a reading operation until reading of all original documents (documents) is completed. Note that, the reading in step S6 includes an original document (document) conveyance operation by the ADF 102.

In addition, in FIG. 15, image notification is performed after completion of reading of all original documents, but the image notification may be performed for every reading without limitation to the above-described configuration.

As described above, according to this embodiment, it is possible to raise productivity of the authenticity determination.

Seventh Embodiment

Next, a seventh embodiment will be described.

An image reading device 101 of the seventh embodiment is different from the first embodiment to the sixth embodiment in that a visible image and an invisible (NIR) image are notified in an integrated form. Hereinafter, in description of the seventh embodiment, description of the same portion as the portions in the first embodiment to the sixth embodiment will be omitted, and description will be given of a portion different from the first embodiment to the sixth embodiment.

Hereinbefore, description has been given of a configuration in which only the invisible image is used in the authenticity determination, but the invisible image is used to perform the authenticity determination, and it cannot be said that individual identification of a document is possible with the invisible image. For example, in a case where an image output from the image notifying unit 25 is stored as evidence to perform confirmation on later days (this case is assumed on both paper and electronic data), if individual identification of the evidence is difficult, the following disadvantage occurs. That is, an operator does not know that authenticity determination of which document is performed.

Here, in this embodiment, a visible image and an NIR image are notified in the integrated form to allow the operator to know that the authenticity determination of which document is performed.

Figure 16A:
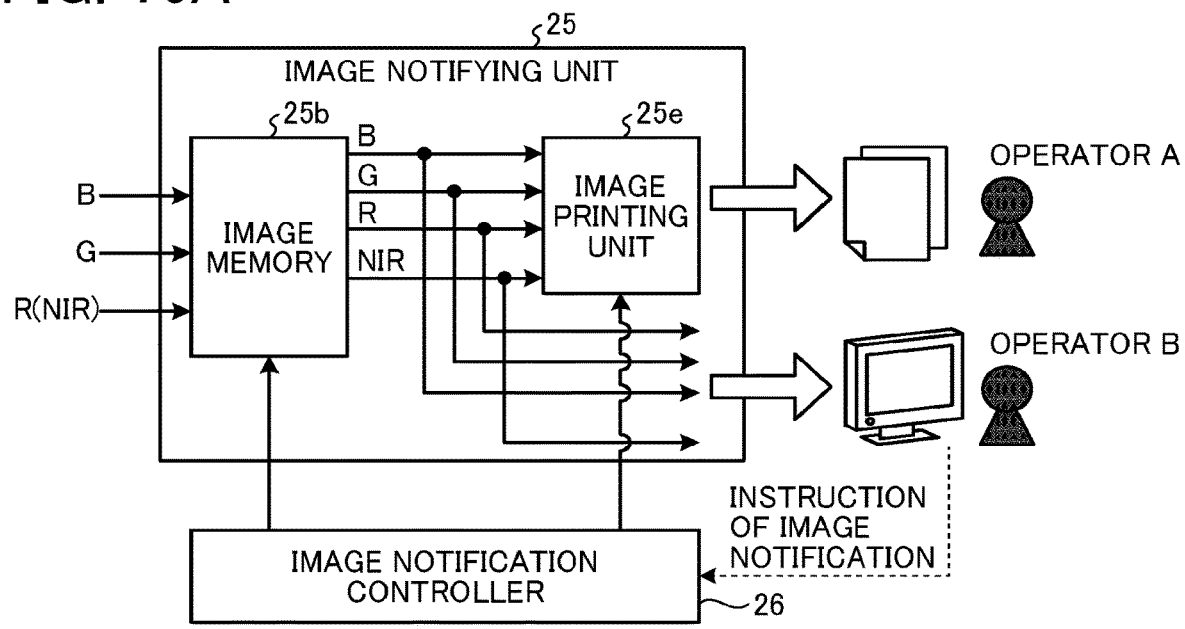
FIGS. 16A to 16C are diagrams describing a configuration of notifying a visible image and an invisible (NIR) image in an integrated form in an image reading device according to a seventh embodiment.
Figure 16B:
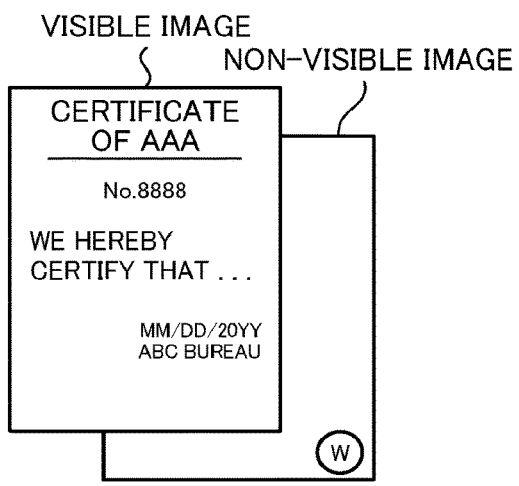
Figure 16C:
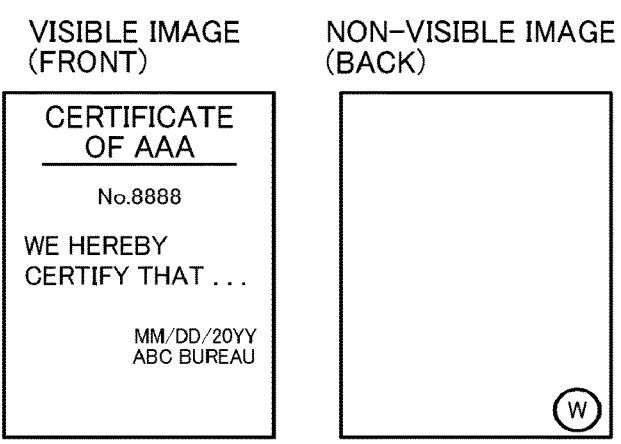

FIGS. 16A to 16C are diagrams describing a configuration in which the visible image and the invisible (NIR) image are notified in the integrated form in the image reading device 101 according to the seventh embodiment.

FIGS. 16A to 16C are block diagrams illustrating a configuration of the image notifying unit 25. In the image notifying unit 25 illustrated in FIG. 16A, the image storage unit 25b illustrated in FIG. 6B, and an image printing unit 25e are connected in serial. The image storage unit 25b stores a visible image (RGB) and an NIR image which are input at an arbitrary timing, and outputs the visible image and the NIR image to the image printing unit 25e at a point of time at which the two images are arranged.

The image printing unit 25e causes the image forming device 103 to print the visible image and the NIR image so as to notify an outside (e.g., an external device or an external unit) of the images. In addition, an image output from the image storage unit 25b are output for a display as described in FIG. 11C to notify an outside of the image as a display image.

FIG. 16B illustrates an example of the image output from the image notifying unit 25. An output from the image notifying unit 25 includes a visible image for individual identification and an invisible image for authenticity determination, and the images are printed or are displayed in an integrated form on a display. As described above, when the invisible image for the authenticity determination and the individual identification information are notified in the integrated form, it is possible to enhance a function as evidence for easy information management. In addition, in a case where images are output from the image notifying unit 25 as printed images, as illustrated in FIG. 16C, when printing is performed so that a visible image is printed on a front surface and an invisible image is printed on a rear surface, it is possible to manage the images as one piece of evidence in a physical manner, and thus it is possible to make information management easier.

Note that, it is not required for the visible image and the invisible image to be simultaneously read. For example, the images may be read at different timings in such a manner that invisible reading is performed after visible image reading (or on the contrary to this). However, when considering an actual operation in which individual identification information is applied to the evidence, it is preferable that a time difference between the visible reading and the invisible reading is small.

Next, a flow of an image reading process under control of the controller 23 will be described.

Figure 17:
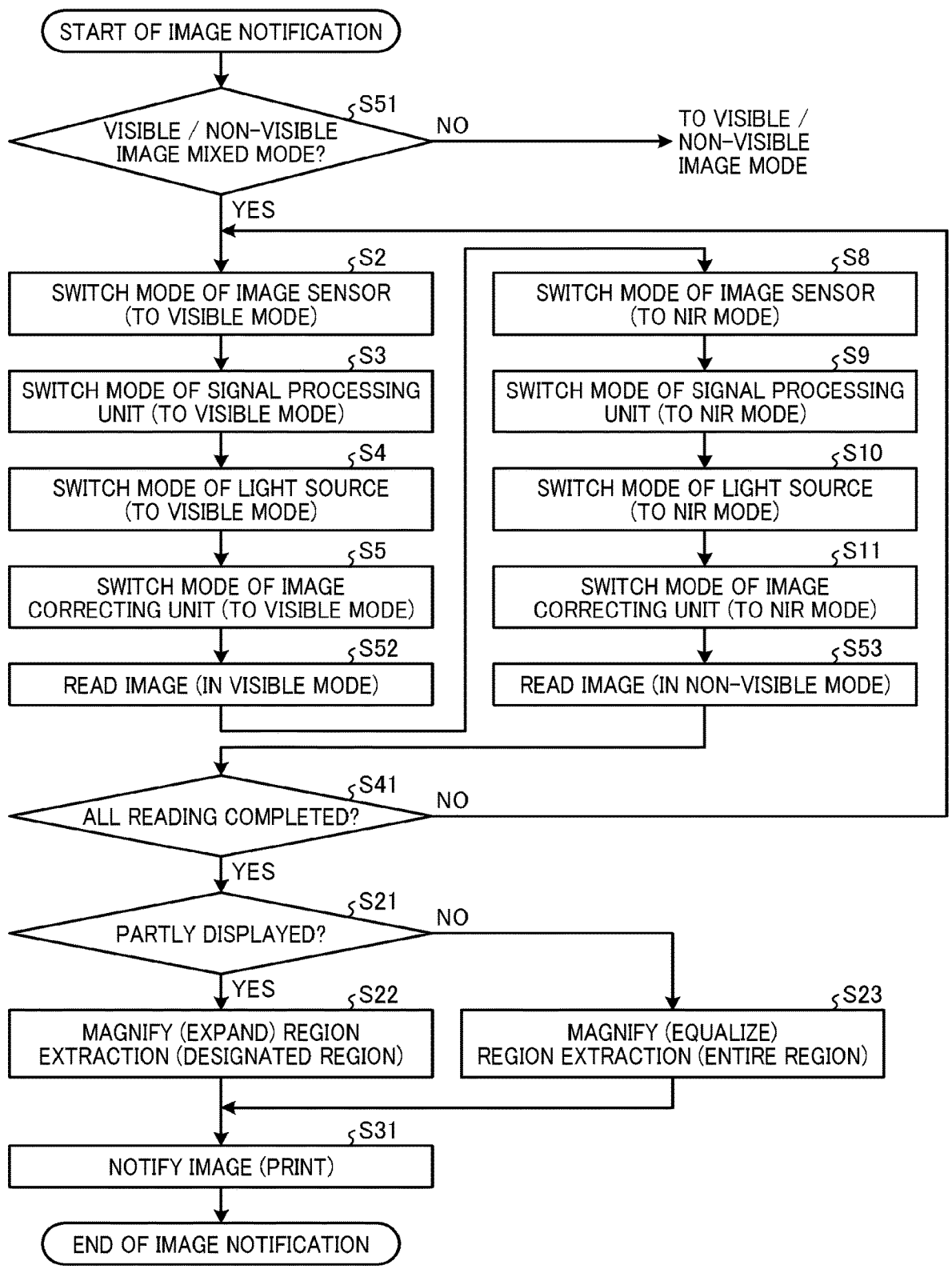
FIG. 17 is a flowchart schematically illustrating a flow of an image reading process in the case of notifying the visible image and the invisible (NIR) image in the integrated form.

FIG. 17 is a flowchart schematically illustrating a flow of an image reading process in a case where the visible image and the invisible (NIR) image are notified in an integrated form. Note that, processes in steps S2 to S5, steps S8 to S11, steps S21 to S23, step S31, and step S41 do not vary from the processes described in FIG. 15, and thus description will be omitted. A difference from the flowchart described in FIG. 15 is in that visible image reading and invisible image reading are sequentially performed, and a mode is set to a visible/invisible image integral mode.

As illustrated in FIG. 17, first, the controller 23 determines whether or not the visible/invisible image integral mode is designated (step S51).

In a case where the visible/invisible image integral mode is designated (Yes in step S51), the controller 23 executes visible image reading after executing the processes in step S2 to S5 (step S52). Next, the controller 23 executes invisible image reading after executing processes in steps S8 to S11 (step S53).

In a case where the visible/invisible image integral mode is not designated (No in step S51), a visible/invisible image mode is selected, and the controller 23 transitions to the image reading flow illustrated in FIG. 15.

Note that, FIG. 17 illustrates an example in which the invisible image reading is performed after the visible image reading, but this order may be reversed. In addition, FIG. 17 illustrates a configuration in which image notification is performed after visible/invisible image reading, but there is no limitation to the configuration, and image notification may be performed for each reading.

As described above, according to this embodiment, a visible image and an invisible image after correction are input to the image notifying unit 25, and the image notifying unit 25 notifies the visible image and the invisible image in an integral form, and thus it is possible to make information management for the authenticity determination easy.

In addition, according to this embodiment, the image notifying unit 25 gives a notification of the visible image and the invisible image by printing the visible image and the invisible image respectively on a first surface and a second surface of printed images, and thus it is possible to further easily perform information management for the authenticity determination.

Eighth Embodiment

Next, an eighth embodiment will be described.

An image forming apparatus 100 of the eighth embodiment is different from the first embodiment to the seventh embodiment in that the visible image and the invisible (NIR) image are simultaneously read. Hereinafter, in description of the eighth embodiment, description of the same portion as the portions in the first embodiment to the seventh embodiment will be omitted, and description will be given of a portion different from the first embodiment to the seventh embodiment.

The seventh embodiment illustrates an example in which the visible image and the invisible (NIR) image are sequentially read, and results are notified in an integrated form. However, when considering operability of an operator, there is a disadvantage that an operation (instruction) of reading the visible image and the invisible image two times becomes complicated.

Here, in this embodiment, the visible image and the NIR image are simultaneously read to improve the operability of the operator.

Figure 18A:
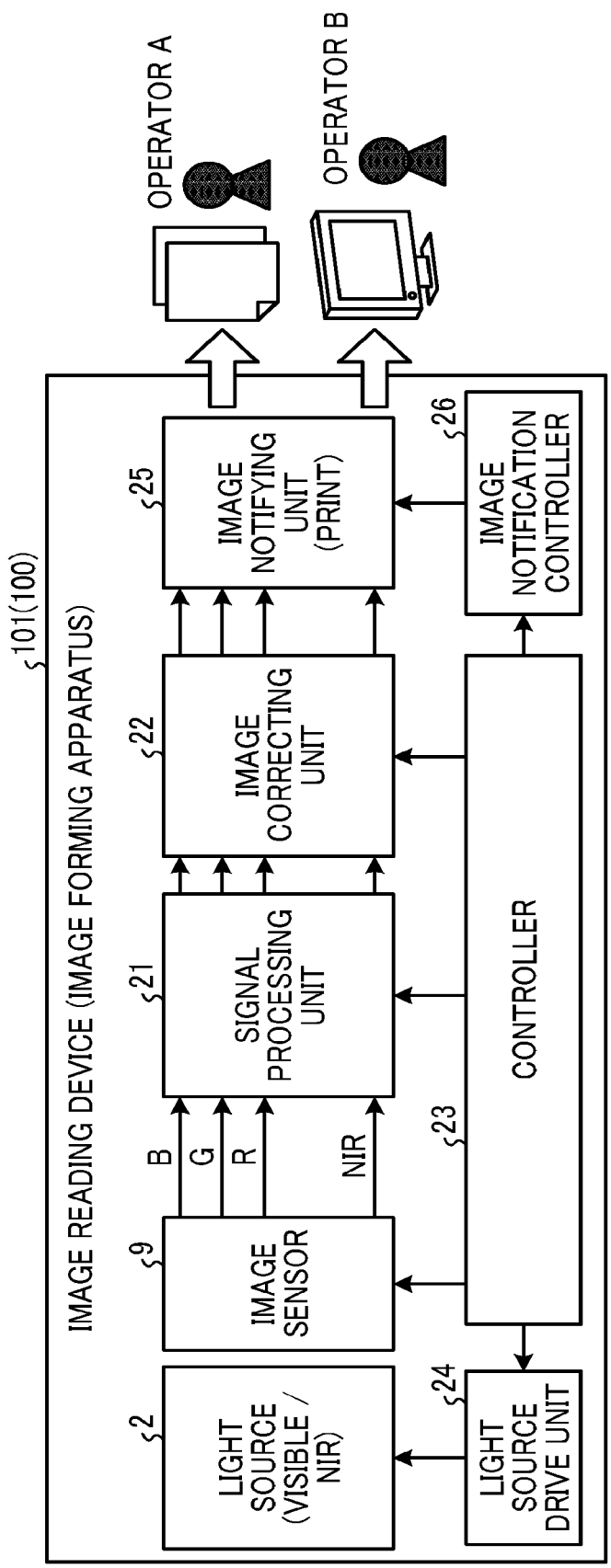
FIGS. 18A to 18C are block diagrams illustrating electric connection of respective units of an image forming apparatus according to an eighth embodiment.
Figure 18B:
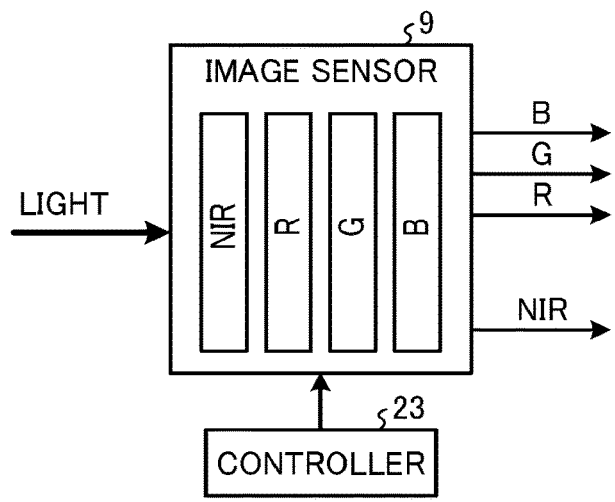
Figure 18C:
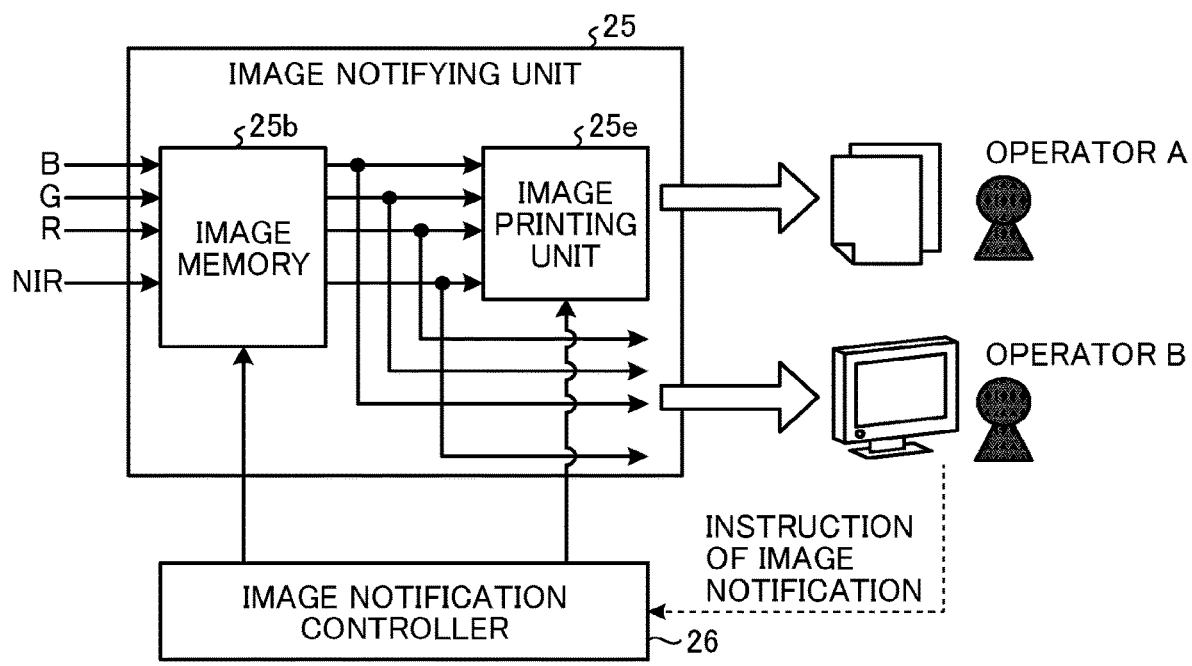

FIGS. 18A to 18C are block diagrams illustrating electric connection of respective units of an image forming apparatus 100 according to the eighth embodiment. FIG. 18A illustrates a configuration in a case where the visible image and the NIR image are simultaneously read. In the configuration illustrated in FIG. 3, any one image signal between RGB and NIR is output from the image sensor 9. On the other hand, in the image forming apparatus 100 illustrated in FIG. 18A, the image sensor 9 reads reflected light from an object, and outputs an RGB image signal and an NIR image signal at a time.

The RGB image signal and the NIR image signal which are output from the image sensor 9 are output to the image notifying unit 25 through the signal processing unit 21 and the image correcting unit 22.

FIG. 18B is a diagram illustrating a configuration of the image sensor 9. As illustrated in FIG. 18B, the image sensor 9 construct an NIR pixel array in addition to an RGB pixel array to read the RGB image and the NIR image at a time.

FIG. 18C is a diagram illustrating a configuration of the image notifying unit 25. As illustrated in FIG. 18C, the RGB image signal and the NIR image signal are input to the image storage unit 25b at a time.

As described above, according to the configuration in which the visible image and the NIR image are simultaneously read, it is possible to improve operability of an operator.

Next, a flow of an image reading process under control of the controller 23 will be described.

Figure 19:
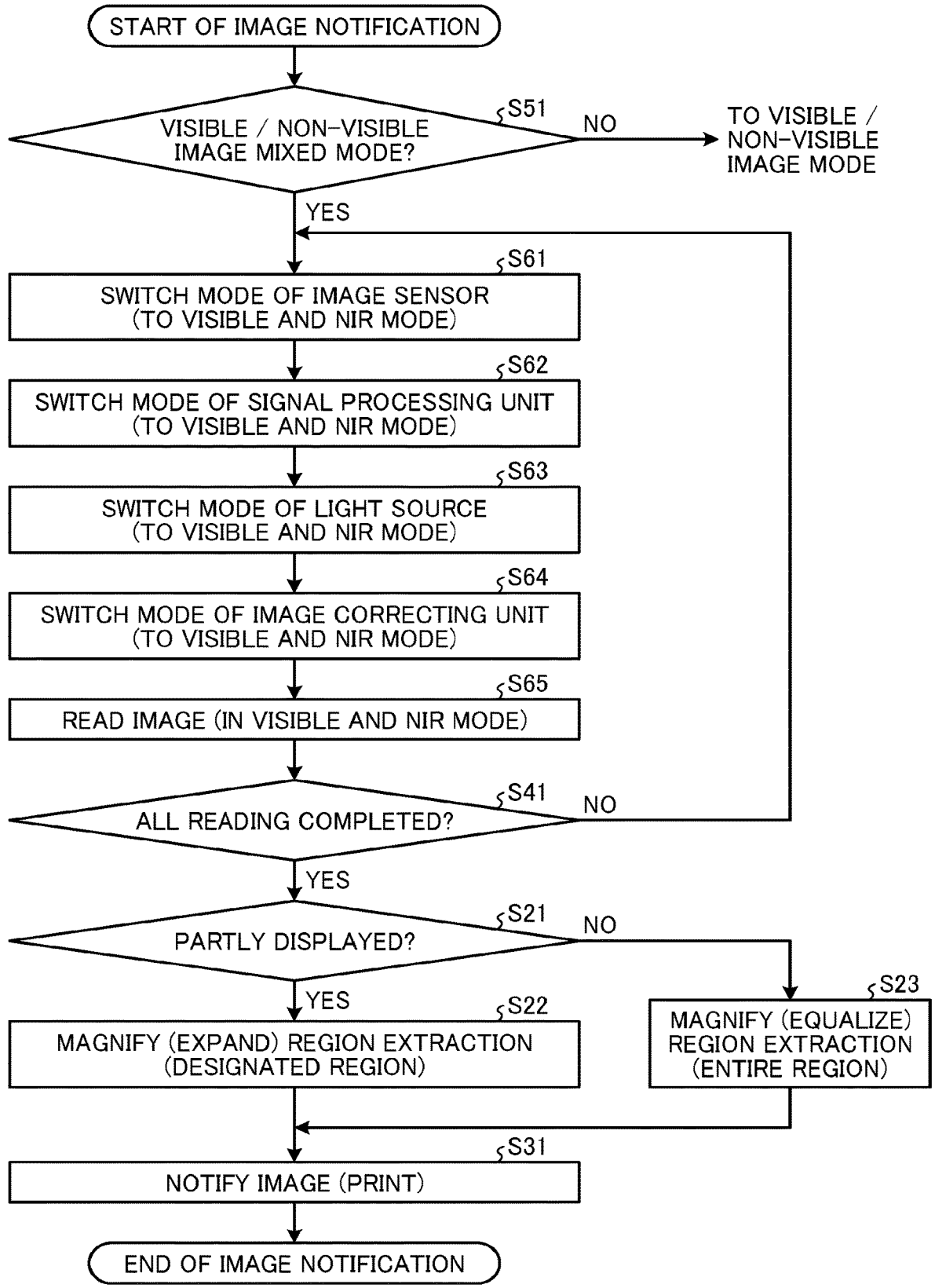
FIG. 19 is a flowchart schematically illustrating a flow of an image reading process in the case of simultaneously reading a visible image and an invisible (NIR) image.

FIG. 19 is a flowchart schematically illustrating a flow of an image reading process in a case where the visible image and the invisible (NIR) image are simultaneously read. Note that, processes in steps S21 to S23, step S31, step S41, and step S51 do not vary from the processes described in FIG. 17, and thus description will be omitted. A difference form the flowchart described in FIG. 17 is as follows. That is, in a case where the visible/invisible image integral mode is selected, the image sensor 9, the signal processing unit 21, the light source 2, and the image correcting unit 22 are set to simultaneously read the visible (RGB) image and the invisible (NIR) image.

As illustrated in FIG. 19, in a case where the visible/invisible image integral mode is designated (Yes in step S51), the controller 23 proceeds to step S61. In step S61, the controller 23 executes mode switching of the image sensor 9 to set the mode to "visible and NIR mode".

Next, the controller 23 executes mode switching of the signal processing unit 21 to set the mode to "visible and NIR mode" (step S62), executes mode switching of the light source 2 to set the mode to "visible and NIR mode" (step S63), and executes mode switching of the image correcting unit 22 to set the mode to "visible and NIR mode" (step S64).

Next, in step S65, the controller 23 simultaneously reads the visible (RGB) image and the invisible (NIR) image.

As described above, according to this embodiment, it is possible to raise productivity of the authenticity determination while easily performing information management.

Ninth Embodiment

Next, a ninth embodiment will be described.

An image forming apparatus 100 of a ninth embodiment is different from the first embodiment to the eighth embodiment in that the visible image and the invisible (NIR) image on a front surface and a rear surface are simultaneously read. Hereinafter, in description of the ninth embodiment, description of the same portion as the portions in the first embodiment to the eighth embodiment will be omitted, and description will be given of a portion different from the first embodiment to the eighth embodiment.

The eighth embodiment illustrates a configuration of simultaneously reading the visible image and the invisible (NIR) image by using an image sensor 9 in which an NIR pixel array is added. However, this case can merely cope with a case where the visible image and the NIR image exist on the same surface, and in a case where the visible image and the NIR image do not exist on the same surface such as a case where the visible image exists on a front surface and the NIR image exists on a rear surface, it is difficult to simultaneously read the visible image and the NIR image.

Here, in this embodiment, the NIR image is read on the front surface and the visible image is read on the rear surface, and thus even in a case where the visible image and the NIR image do not exist on the same surface, the images can be simultaneously read.

Figure 20:
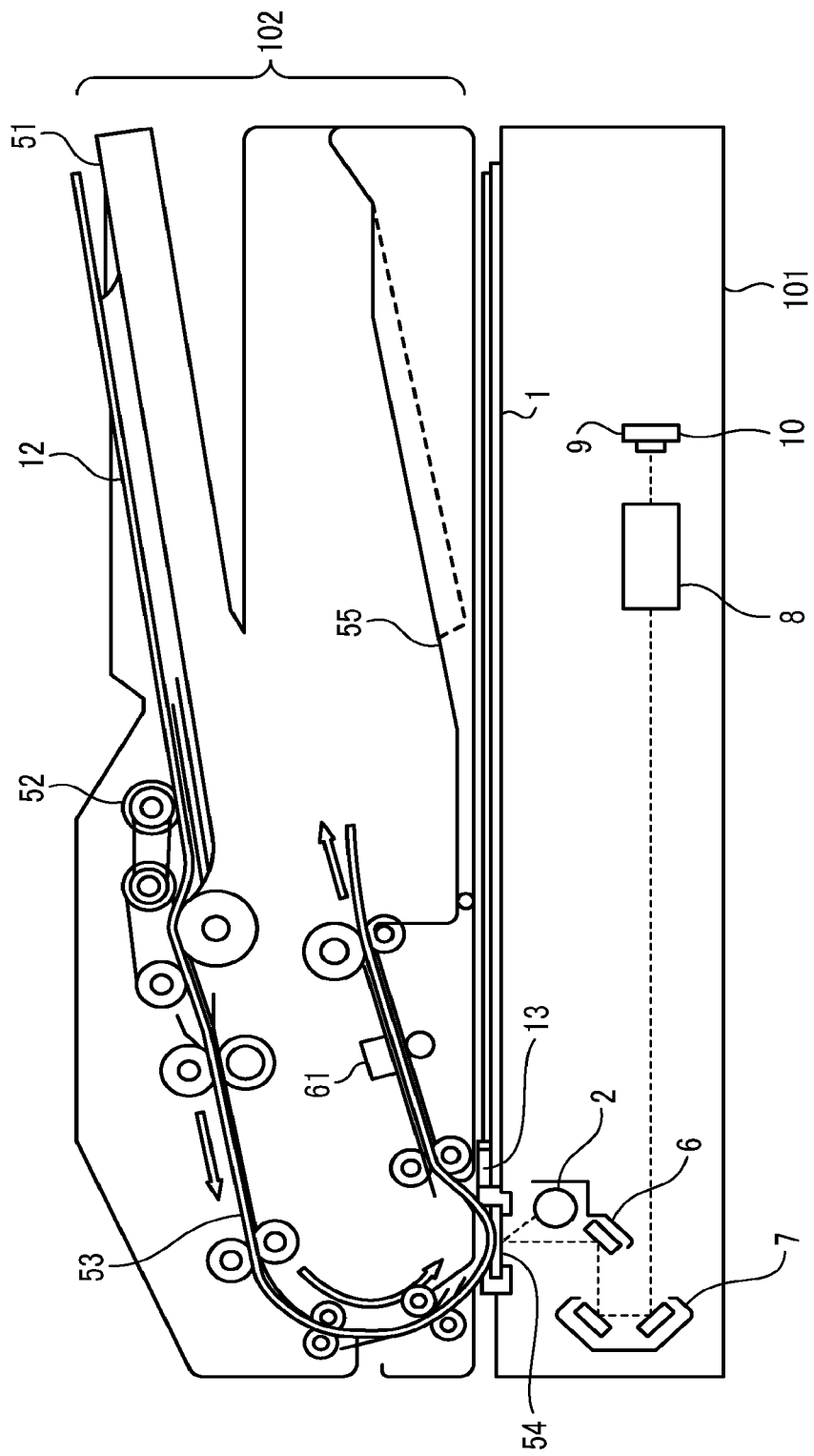
FIG. 20 is a view schematically illustrating configurations of an image reading device and an ADF according to a ninth embodiment.

FIG. 20 is a view schematically illustrating configurations of an image reading device 101 and an ADF 102 according to the ninth embodiment. The ADF 102 includes a one-pass conveyance route 53 and includes a contact image sensor (CIS) 61 in the conveyance route 53. This configuration is different form the configuration of the ADF 102 illustrated in FIG. 14. Here, it is assumed that the image reading device 101 is provided with a visible image mode and an NIR image mode, and the CIS 61 of the ADF 102 is provided with only the visible image mode.

The ADF 102 transports a plurality of original documents 12 placed on the original document tray 51 to the conveyance route 53 sheet by sheet by using the pickup roller 52. The NIR image on a front surface of each of the original documents 12 transported to the conveyance route 53 is read by the image reading device 101 at the scanner reading position (light source irradiation position) 54. Then, the original document 12 is conveyed toward the paper ejection tray 55. An RGB image on a rear surface of the original document 12 conveyed toward the paper ejection tray 55 is read by the CIS 61 located in the middle of the conveyance route 53.

As described above, when the NIR image is read on the front surface and the visible image is read on the rear surface, even in a case where the visible image and the NIR image do not exist on the same surface, the images can be simultaneously read.

Note that, FIG. 20 illustrates a configuration in which the NIR image is read by the image reading device 101 and the RGB image is read by the CIS 61, but this relationship may be reversed. In addition, the CIS 61 may be set to reading in an optical reduction system. On the contrary, an optical reduction system of on the image reading device 101 side may be CIS.

FIGS. 21A and 21B are block diagrams illustrating electric connection of respective units of the image forming apparatus 100. FIG. 21A illustrates a configuration in which visible images on a front surface and a rear surface, or an invisible (NIR) image on a front surface and a visible image on a rear surface are simultaneously read. A different from the configuration illustrated in FIGS. 18A to 18C is in that the CIS 61 (a light source is visible light) that reads a rear surface of an original document is added in addition to the configuration (the light source 2 and the image sensor 9) of reading a front surface of the original document.

The CIS 61 is controlled by the controller 23 and the light source drive unit 24. That is, an operation of the CIS 61 is controlled in correspondence with an image mode.

An output of the CIS 61 includes only a visible image and becomes an RGB output. An RGB (NIR) image on the image reading device 101 side and an RGB image on the CIS 61 side are output to the image notifying unit 25 through the signal processing unit 21 and the image correcting unit 22.

FIG. 21B is a diagram illustrating a configuration of the image notifying unit 25. As illustrated in FIG. 21B, an RGB (NIR) image signal for a front surface and an RGB image signal for a rear surface are input to the image storage unit 25*b* at a time. In this case, an RGB image on the rear surface and an NIR image on a front surface are output from the image storage unit 25*b*, and are printed or displayed on a display.

Next, a flow of an image reading process under control of the controller 23 will be described.

Figure 22:
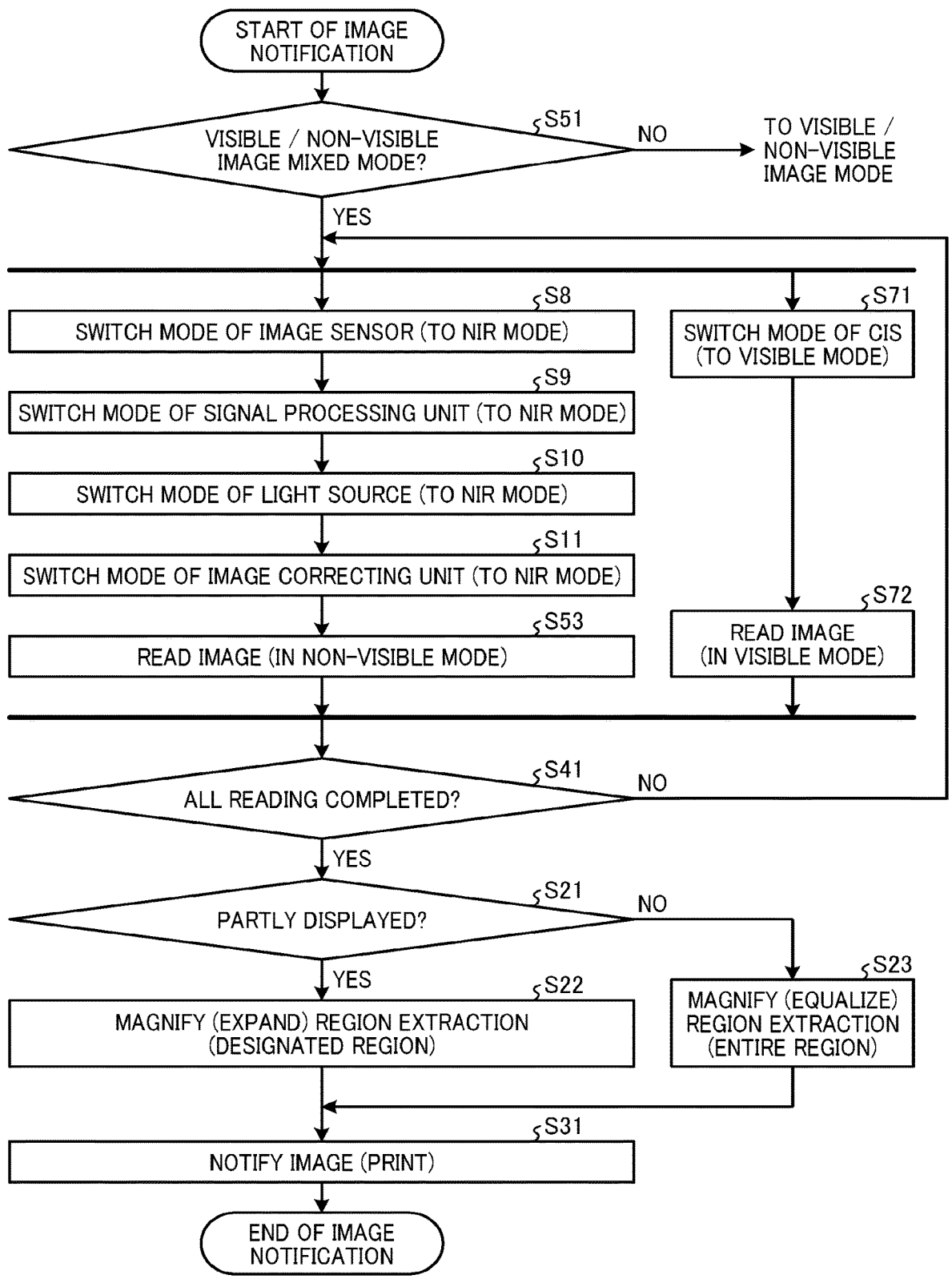
FIG. 22 is a flowchart schematically illustrating a flow of an image reading process in the case of simultaneously reading front and rear visible images, or a front invisible (NIR) image and a rear visible image.

FIG. 22 is a flowchart schematically illustrating a flow of an image reading process in the case of simultaneously reading visible images on a front surface and a rear surface, or an invisible (NIR) image on the front surface and a visible image on the rear surface. Note that, processes in steps S8 to S11, steps S21 to S23, step S31, step S41, step S51, and step S53 do not vary from the processes described in FIG. 17, and thus description will be omitted. A difference from the flowchart described in FIG. 17 is in that visible image reading and invisible image reading are performed in parallel, and a mode is set to a visible/invisible image integral mode.

As illustrated in FIG. 22, in a case where the visible/invisible image integral mode is designated (Yes in step S51), the controller 23 executes reading of the invisible image on the front surface of the original document after executing the processes in step S8 to S11 (step S53).

In addition, in a case where the visible/invisible image integral mode is designated (Yes in step S51), the controller 23 sets setting of the CIS 61 to visible (RGB) setting for a rear surface of an original document (step S71), and executes reading of a visible image on the rear surface of the original document (step S72).

Note that, it is assumed that there is no particular limitation to a timing relationship between front surface reading (NIR) and rear surface reading (RGB).

As described above, according to this embodiment, even in a case where visible information and invisible information respectively exist on surfaces different from each other, it is possible to raise productivity of the authenticity determination while easily performing information management.

Tenth Embodiment

Next, a tenth embodiment will be described.

An image reading device 101 of the tenth embodiment is different from the first embodiment to the ninth embodiment in that the visible image and the NIR image are composed into one image. Hereinafter, in description of the tenth embodiment, description of the same portion as the portions in the first embodiment to the ninth embodiment will be omitted, and description will be given of a portion different from the first embodiment to the ninth embodiment.

The eighth embodiment or the ninth embodiment illustrates a configuration in which the visible image and the NIR image are notified in an integrated form, but it is required to give a notification of a plurality of images (surfaces), and thus there is a disadvantage that a time is taken until notification is completed.

Here, in this embodiment, the visible image and the NIR image are composed into one sheet (frame) of image to shorten an image notification time.

Figure 23A:
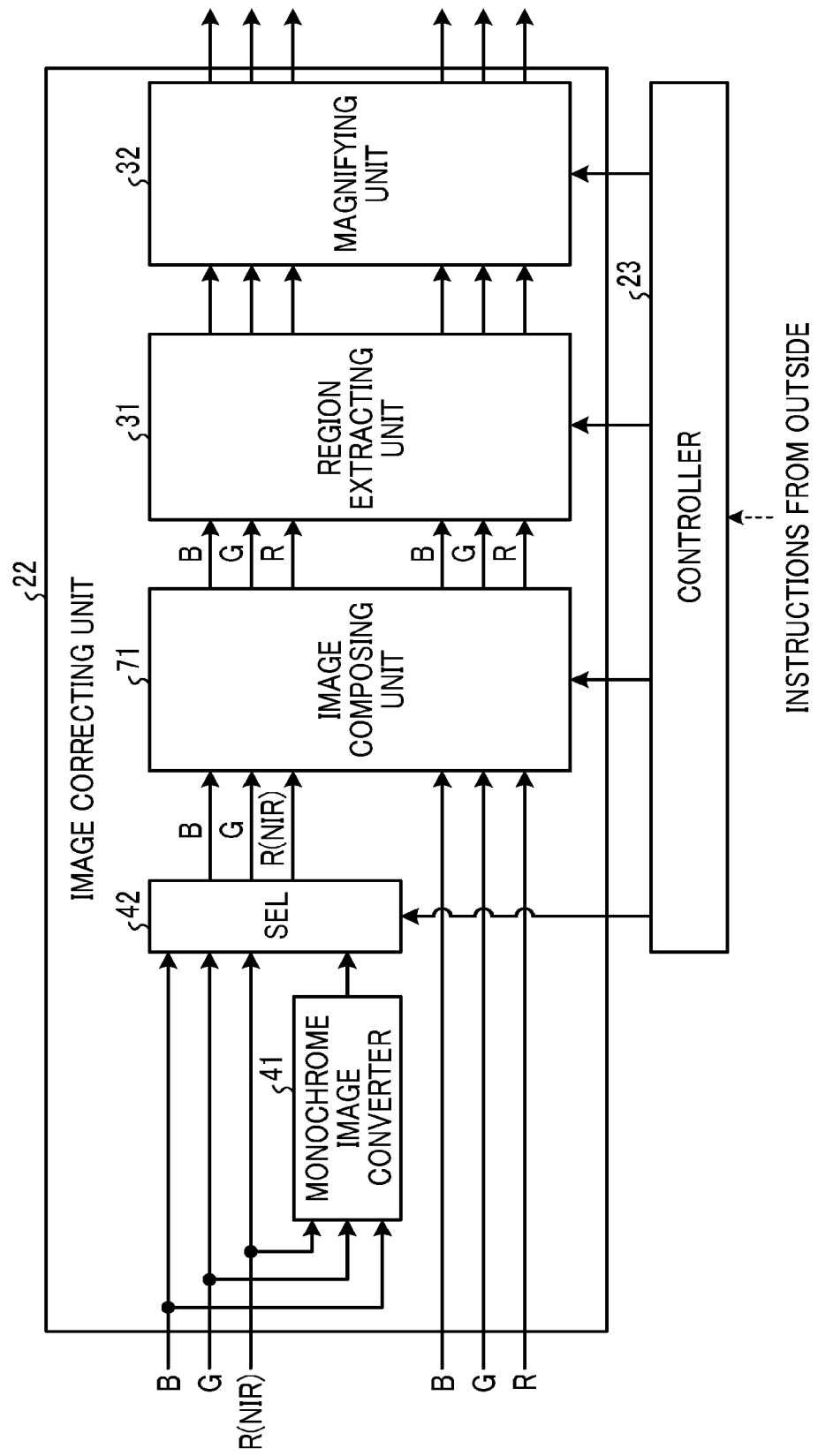
FIGS. 23A and 23B are block diagrams illustrating a configuration of an image correcting unit of an image reading device according to a tenth embodiment.
Figure 23B:
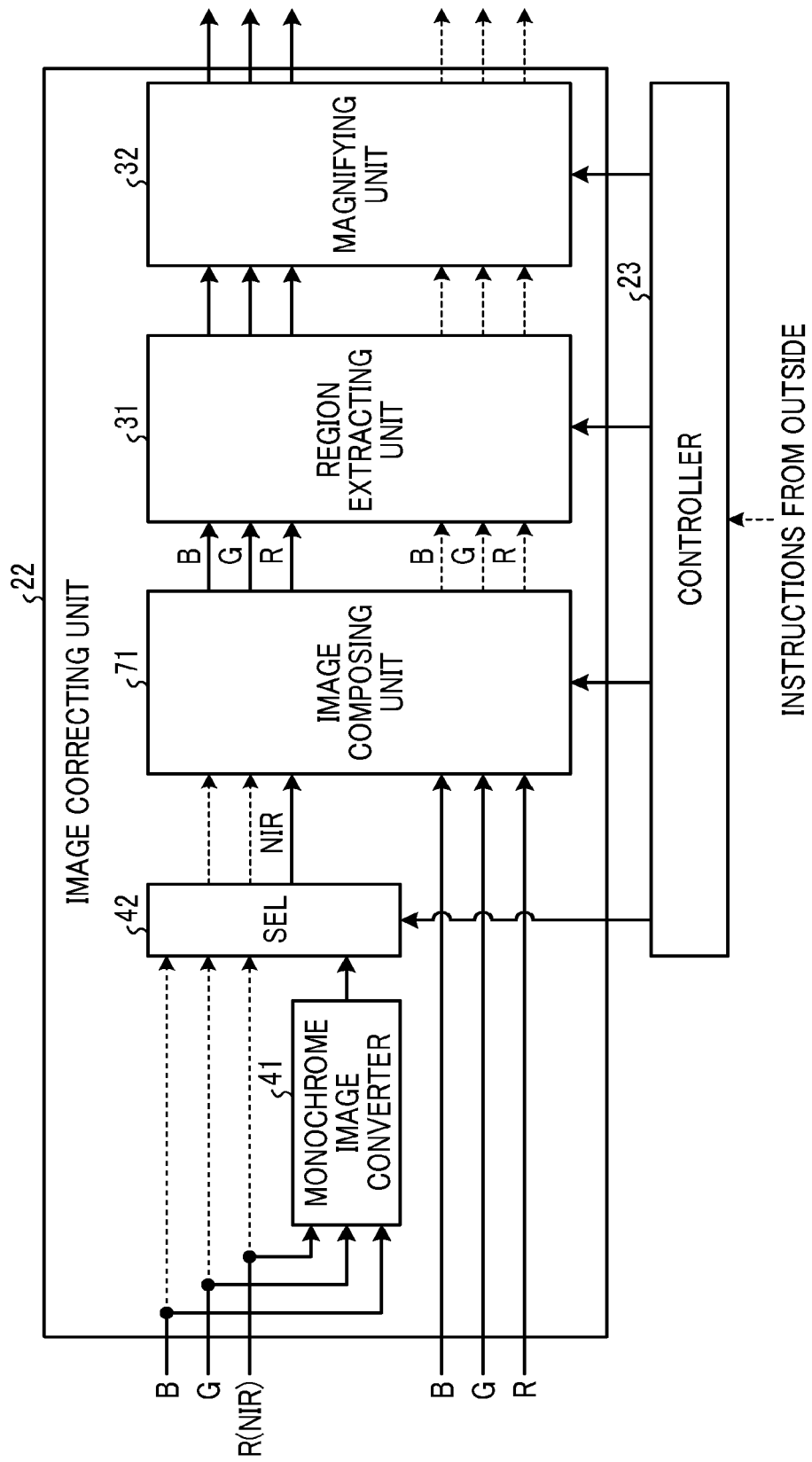

FIGS. 23A and 23B are block diagrams illustrating a configuration of an image correcting unit 22 of an image reading device 101 according to the tenth embodiment. As illustrated in FIG. 23A, the image correcting unit 22 includes an image composing unit 71 that functions as composing unit in addition to the region extracting unit 31, the magnifying unit 32, the monochrome image converter 41, and the selector (SEL) 42.

For example, in the case of receiving an external instruction for notifying the visible image and the NIR image on the front surface and the rear surface in an integral form, the controller 23 validates image composing in the image composing unit 71. The image composing unit 71 composes the visible image and the NIR image into one sheet (frame) of image under control of the controller 23.

FIG. 23B illustrates a valid image path in the case of composing the visible image and the NIR image into one sheet (frame) of image. As illustrated in FIG. 23B, in the case of composing the visible image and the NIR image into one sheet (frame) of image, the image composing unit 71 acquires the NIR image included in a front surface read image through the monochrome image converter 41. On the other hand, the image composing unit 71 acquires an RGB image that is a rear surface read image as is.

The image composing unit 71 composes the NIR image and the RGB image which are input to generate a new RGB image. The image composing unit 71 outputs the generated RGB image to the image notifying unit 25 on a rear stage through the region extracting unit 31 and the magnifying unit 32. At this time, when viewed from the image notifying unit 25 on a rear stage, only the RGB image is given in notification (not illustrated). In this case, only the RGB image may be given in notification, and basically, an operation of the image notifying unit 25 does not vary. Note that, an image path that becomes invalid in RGB output from the image composing unit 71 is a path in the case of outputting images on a front surface and a rear surface as visible images.

As described above, when the visible image and the NIR image are composed into one sheet (frame) of image, an image notification time is shortened, and thus high-speed image notification can be realized.

Note that, this embodiment describes the case of performing region extraction and variable magnification is performed after image composing, but image composing may be performed after the region extraction and variable magnification.

Next, a flow of an image reading process under control of the controller 23 will be described.

Figure 24:
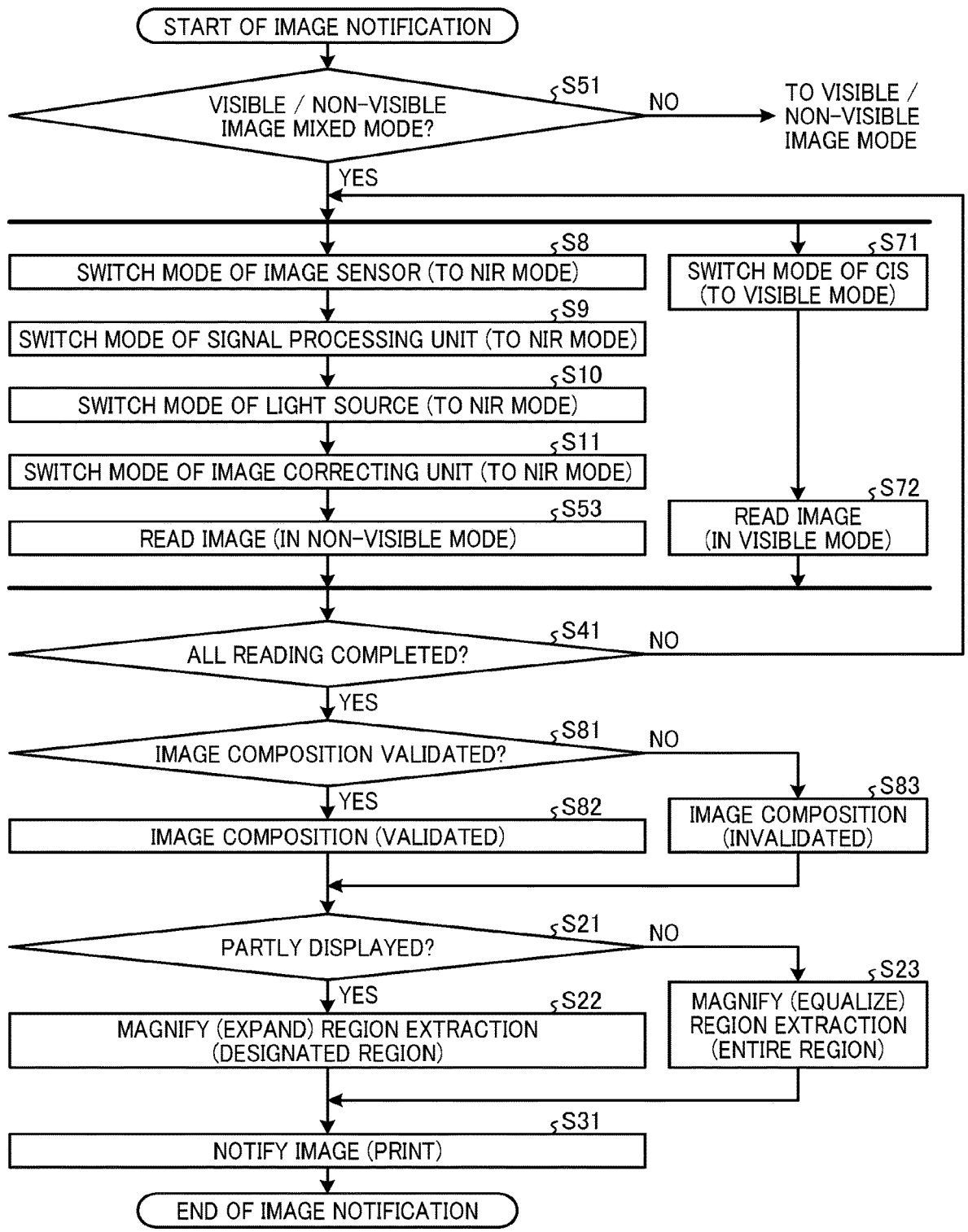
FIG. 24 is a flowchart schematically illustrating a flow of an image reading process in a case where a visible image and an NIR image are composed into one image.

FIG. 24 is a flowchart schematically illustrating a flow of an image reading process in a case where the visible image and the NIR image are composed into one image. Note that, processes in steps S8 to S11, steps S21 to S23, step S31, step S41, step S51, step S53, and step S71 and S72 do not vary from the processes described in FIG. 22, and thus description will be omitted. A difference from the flowchart illustrated in FIG. 22 is in that a determination as to whether or not to compose the visible image and the invisible image after completion of reading is added.

As illustrated in FIG. 24, in a case where it is determined that reading of all original documents (documents) is completed (Yes in step S41), the controller 23 determines whether or not to validate image composing in the image composing unit 71 (step S81). In the case of receiving an external instruction for notifying the visible image and the NIR image on the front surface and the rear surface in an integral form, the controller 23 determines that image composing in the image composing unit 71 is validated (Yes in step S81), and validates image composing in the image composing unit 71 (step S82).

On the other hand, in the case of not receiving the external instruction for notifying the visible image and the NIR image on the front surface and the rear surface in the integral form, the controller 23 determines that image composing in the image composing unit 71 is not validated (No in step S81), and invalidates image composing in the image composing unit 71 (step S83).

Figure 25A:
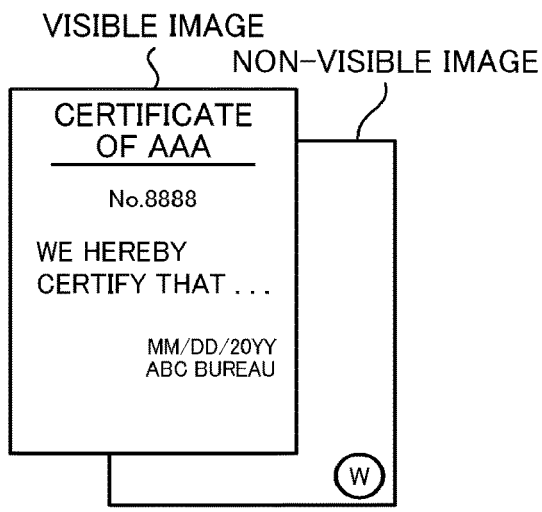
FIGS. 25A to 25C are diagrams describing an operation and an effect of an image reading process in the image reading device.
Figure 25B:
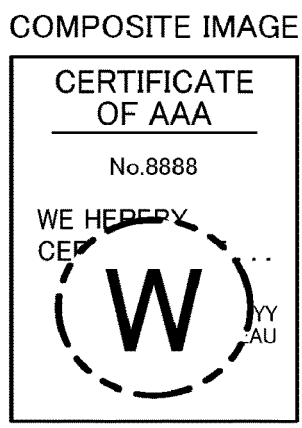
Figure 25C:
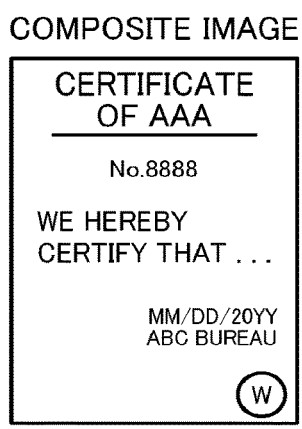

Here, FIGS. 25A to 25C are diagrams describing an operation and an effect of the image reading process in the image reading device 101. FIG. 25A illustrates an example of the visible image (RGB) and the invisible image (NIR) which are input to the image composing unit 71.

FIG. 25B illustrates an example of image composing. An example illustrated in FIG. 25B is a composing example in which an authenticity mark of the NIR image is enlarged and superimposed on the RGB image, and an NIR image portion is handled as a monochrome pattern. As described above, when the RGB image and the NIR image are composed into one sheet of image on the same surface, it is possible to reduce data capacity that is handled by the image notifying unit 25, and thus it is possible to realize high-speed image notification.

In addition, FIG. 25C illustrates another example of image composing. The example illustrated in FIG. 25C is an example in which the authenticity mark of the NIR image is composed to a margin area of the RGB image, and an NIR image portion is handled as a monochrome image as in FIG. 25B. As described above, when the NIR image is laid out and composed to a region different from a region in which a context of the RGB image exists, it is possible to realize high-speed image notification while maintaining a visual recognition property of visible information.

Note that, in this embodiment, the NIR image portion is handled as a monochrome image, but when the image is composed in a color different from a color of the visible image, it is possible to raise visual recognition property of the invisible information.

As described above, according to this embodiment, it is possible to realize high-speed image notification to an external side while easily performing information management.

In addition, according to this embodiment, when the visible image and the invisible image are laid out in different regions on the same surface, it is possible to maintain visual recognition property of visible information.

In addition, according to this embodiment, when a color of the invisible image is made to be different from a color of the visible image, it is possible to raise the visual recognition property of the invisible information.

Eleventh Embodiment

Next, an eleventh embodiment will be described.

An image reading device 101 of the eleventh embodiment is different form the first embodiment to the tenth embodiment in that contrast of the invisible image is adjusted to further raise the precision of the authenticity determination. Hereinafter, in description of the eleventh embodiment, description of the same portion as the portions in the first embodiment to the tenth embodiment will be omitted, and description will be given of a portion different from the first embodiment to the tenth embodiment.

The invisible embedding technology, a so-called latent image technology illustrated also in FIGS. 5A to 5C of the first embodiment can embed information that is difficult to visually recognize. However, a concentration of an embedded image is further lowered in comparison to a typical image in order for the embedded image to be visually inconspicuous. Therefore, even when viewing an invisible image that is read, contrast may be insufficient, and thus the authenticity determination may be difficult. In addition, an image density read by a reading device may be weak, and in this case, there is a disadvantage that the authenticity determination may also be difficult.

Here, in this embodiment, contrast of an image is corrected to maintain precision of the authenticity determination even in a case where contrast of the invisible image is insufficient.

Figure 26:
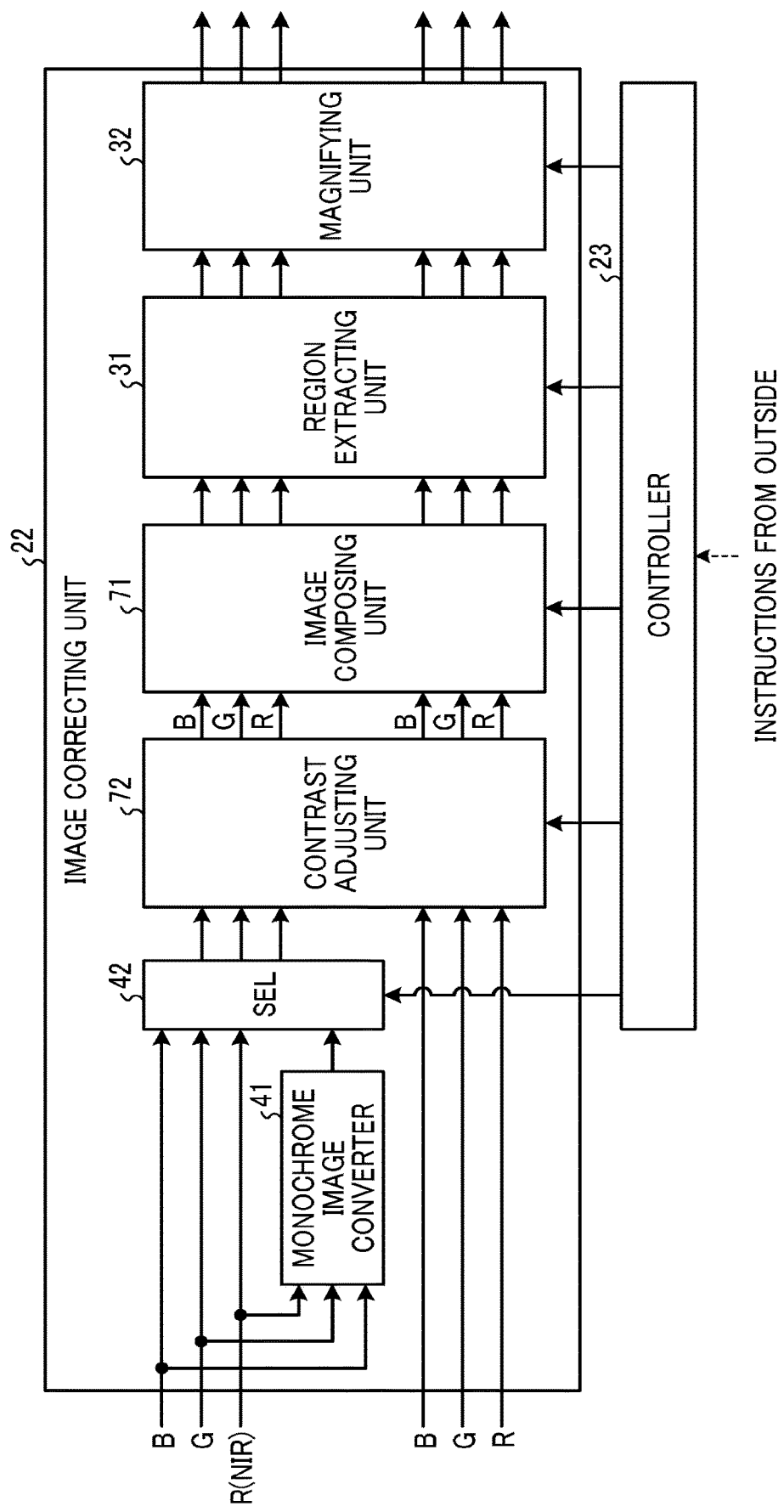
FIG. 26 is a block diagram illustrating a configuration of an image correcting unit of an image reading device according to an eleventh embodiment.

FIG. 26 is a block diagram illustrating a configuration of an image correcting unit 22 of an image reading device 101 according to the eleventh embodiment. As illustrated in FIG. 26, the image correcting unit 22 includes a contrast adjusting unit 72 in addition to the region extracting unit 31, the magnifying unit 32, the monochrome image converter 41, the selector (SEL) 42, and the image composing unit 71.

The contrast adjusting unit 72 adjusts contrast of the visible image and the invisible (NIR) image. Specifically, the contrast adjusting unit 72 performs a contrast emphasis process or a binarization process of the NIR image, or a contrast reducing process (integrating process) of the visible image.

Figure 27A:
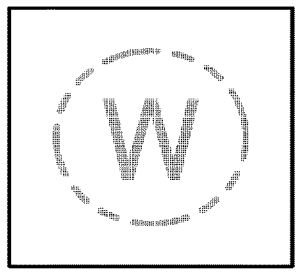
FIGS. 27A to 27C are diagrams describing an operation and an effect of a contrast adjustment process of an invisible image in a contrast adjusting unit.
Figure 27B:
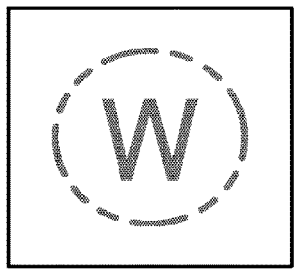
Figure 27C:
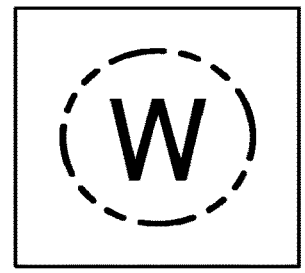

Here, FIGS. 27A to 27C are diagrams describing an operation and an effect of the contrast adjustment process of the invisible image in the contrast adjusting unit 72. FIG. 27A illustrates an invisible read image before adjustment. FIG. 27B illustrates an invisible image after contrast adjustment, and it can be understood that when performing the contrast emphasis process, an authenticity determination mark can be more clearly identified in comparison to the image in FIG. 27A. In addition, FIG. 27C illustrates an invisible image in the case of adjusting contrast through binarization, and it can be understood that the authenticity determination mark can be more clearly identified in comparison to the image in FIG. 27A. Furthermore, as a threshold value of the binarization, an appropriate value is set in advance. When performing the contrast emphasis process by the binarization process, it is possible to easily maintain authenticity determination precision.

Note that, in FIGS. 27A to 27C, the contrast of the invisible image is adjusted. However, when considering that the contrast is relative to the visible image, the same effect can be exhibited even when changing the contrast of the visible image.

Figure 28A:
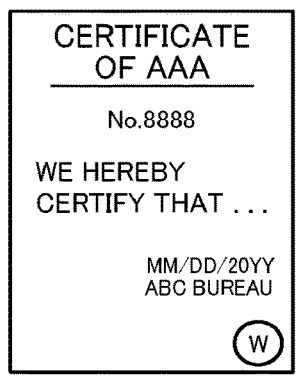
FIGS. 28A and 28B are diagrams describing an operation and an effect of a contrast adjustment process of a visible image in the contrast adjusting unit.
Figure 28B:
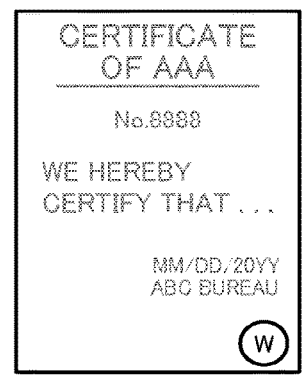

Here, FIGS. 28A and 28B are diagrams describing an operation and an effect of a contrast adjustment process of the visible image in the contrast adjusting unit 72. FIG. 28A illustrates an image obtained by composing a visible image and an invisible read image before adjustment into one frame. FIG. 28B illustrates an image of which contrast is adjusted to suppress contrast of the visible image, and it can be understood that when a contrast reducing process is performed, the authenticity determination mark can be more clearly identified in comparison to the image in FIG. 28A. Note that, the contrast reducing process can be easily realized by using an integration filter. When the contrast reducing process is performed by an integration filter process, it is possible to easily maintain the authenticity determination precision.

As described above, according to this embodiment, when the contrast emphasis process is performed with respect to the invisible image, even in a case where the invisible image has a weak concentration, it is possible to maintain the authenticity determination precision.

In addition, according to this embodiment, when performing the contrast reducing process of suppressing the contrast of the visible image, even in a case where the invisible image is constituted by dots (edited dots), it is possible to maintain the authenticity determination precision.

Twelfth Embodiment

Next, a twelfth embodiment will be described.

An image reading device 101 of the twelfth embodiment is different from the first embodiment to the eleventh embodiment in that a linearization process is performed with respect to the invisible image. Hereinafter, in description of the twelfth embodiment, description of the same portion as the portions in the first embodiment to the eleventh embodiment will be omitted, and description will be given of a portion different from the first embodiment to the eleventh embodiment.

In the eleventh embodiment, description has been given with reference to the contrast of the invisible image as an example. However, in the invisible embedding (latent image) technology, when the invisible image may be composed of dots (halftone dots) in order for the invisible image to be visually inconspicuous (a concentration appears to be equivalently lowered to eyes of human beings), and in this case, there is a disadvantage that the authenticity determination may be difficult.

Here, in this embodiment, correction for linearizing dots of an image performed to maintain the authenticity determination precision even in a case where the invisible image is composed of dots (halftone dots).

Figure 29:
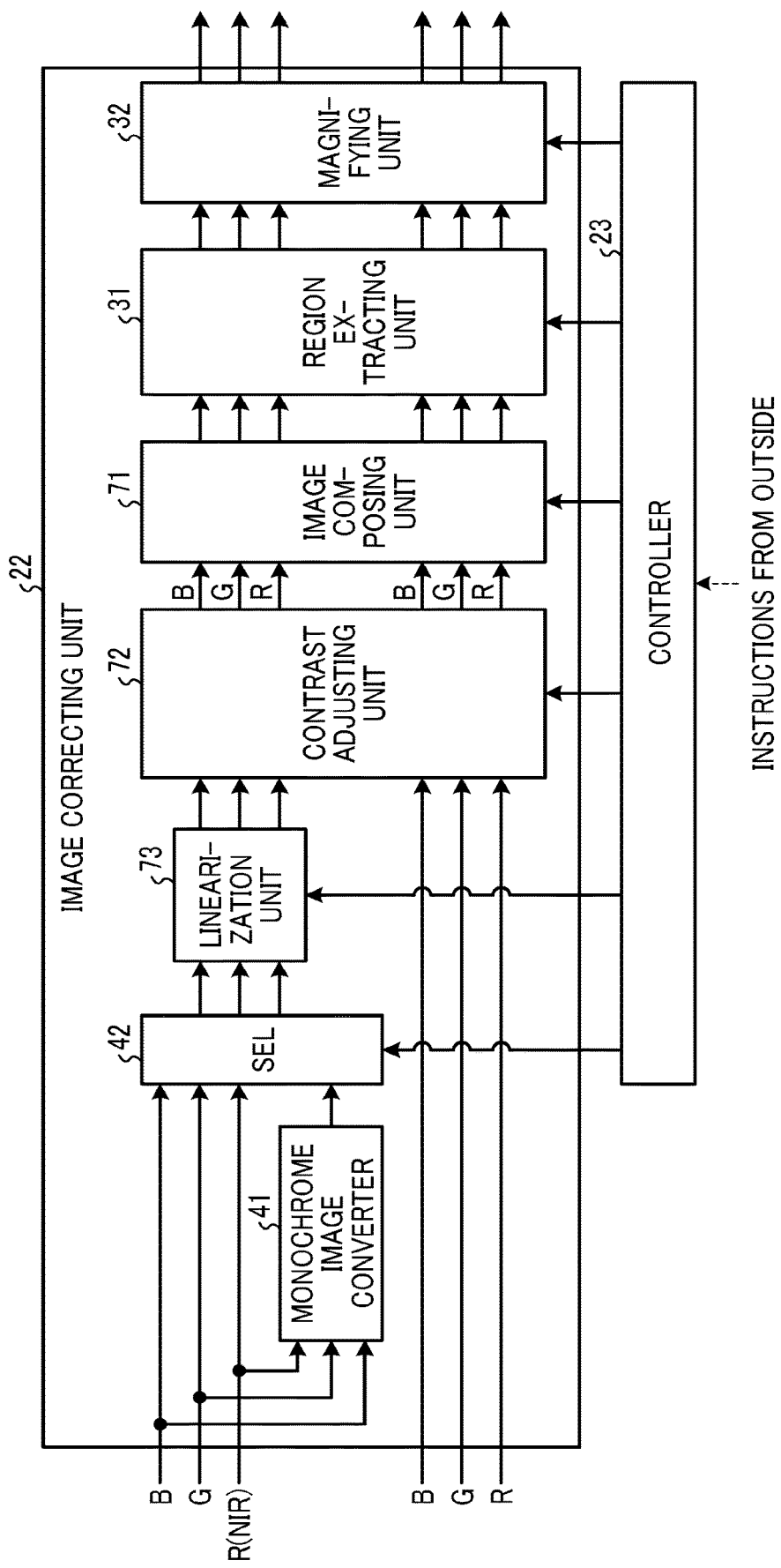
FIG. 29 is a block diagram illustrating a configuration of an image correcting unit of an image reading device according to a twelfth embodiment.

FIG. 29 is a block diagram illustrating a configuration of an image correcting unit 22 of the image reading device 101 according to the twelfth embodiment. As illustrated in FIG. 29, the image correcting unit 22 includes a linearization unit 73 in addition to the region extracting unit 31, the magnifying unit 32, the monochrome image converter 41, the selector (SEL) 42, the image composing unit 71, and the contrast adjusting unit 72.

The linearization unit 73 performs a linearization process of recognizing dots and connecting the dots to each other. Note that, in this embodiment, the linearization unit 73 is disposed on a side in which the NIR image is input so as to perform the process with respect to the invisible image, but may be disposed on the visible image side.

Figure 30A:
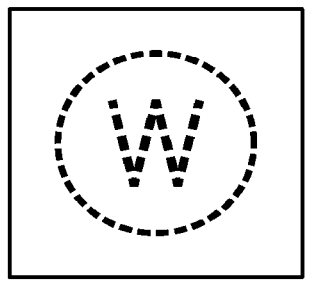
FIGS. 30A and 30B are diagrams describing an operation and an effect of a linear imaging process with respect to an invisible image.
Figure 30B:
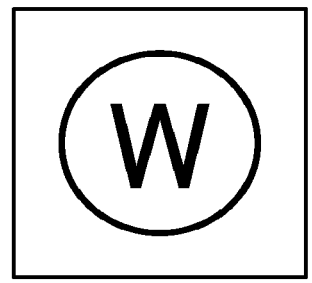

FIGS. 30A and 30B are diagrams describing an operation and an effect of the linearization process with respect to the invisible image. FIG. 30A illustrates an invisible read image before the process. An authenticity determination mark "positive in a circle mark" is composed of dots (halftone dots), and thus it is difficult to identify the mark only in this stat. FIG. 30B illustrates an image subjected to the linearization process, and the image is a smooth image in which respective dots are connected and continuous. Accordingly, it can be understood that the authenticity determination mark is more clearly identified in comparison to FIG. 30A.

Note that, in this embodiment, a pattern of the authenticity determination mark is changed in arbitrary meaning, but it is assumed that there is no disadvantage in the authenticity determination even though the pattern is changed in advance.

Next, a flow of an image reading process under control of the controller 23 will be described.

Figure 31:
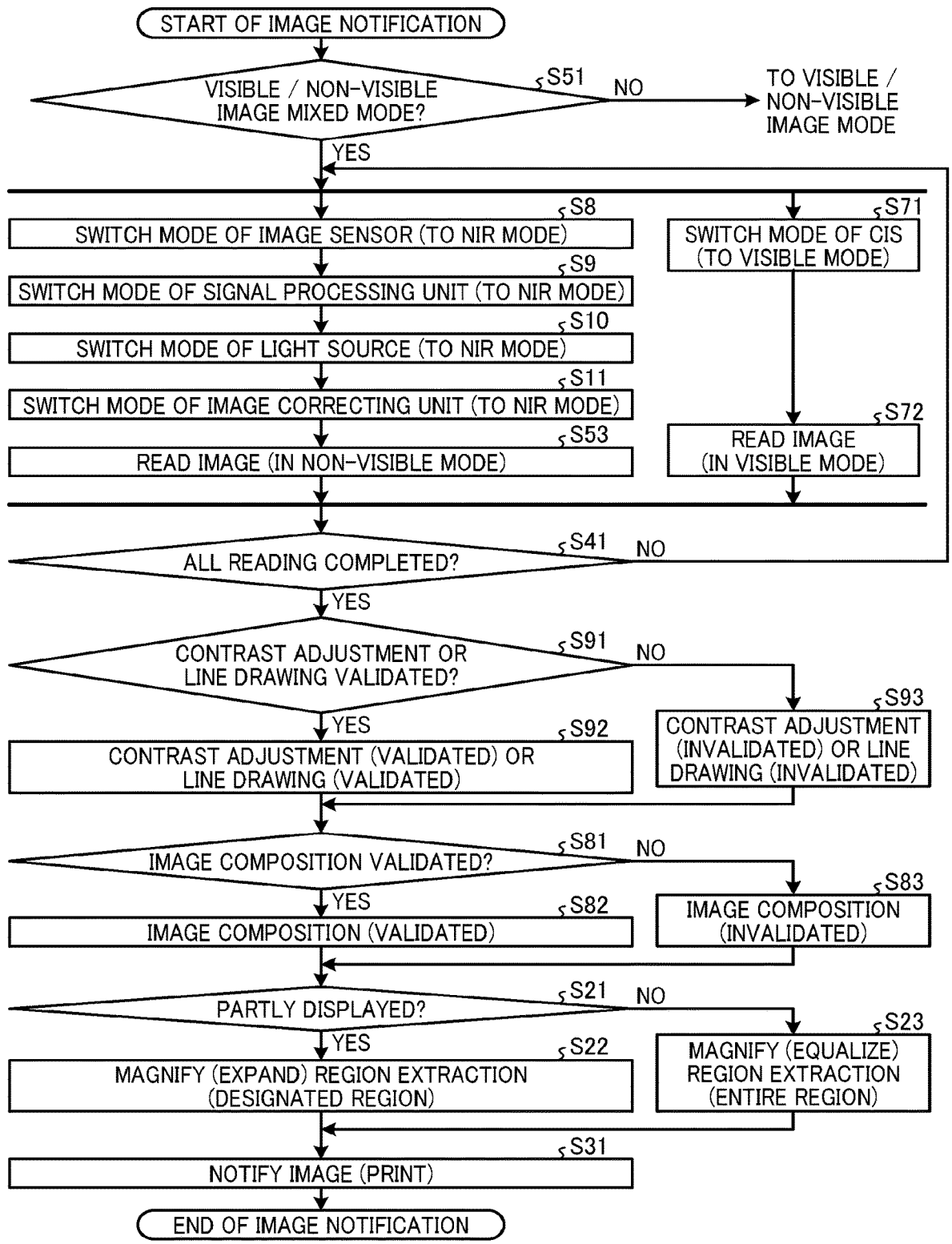
FIG. 31 is a flowchart schematically illustrating a flow of an image reading process including a contrast adjustment process and a linear imaging process.

FIG. 31 is a flowchart schematically illustrating a flow of an image reading process including the contrast adjustment process or the linearization process. Note that, processes in steps S8 to S11, steps S21 to S23, step S31, step S41, step S51, step S53, steps S71 and S72, and steps S81 to S83 do not vary from the processes described in FIG. 24, and thus description will be omitted. A difference from the flowchart described in FIG. 24 is in that a determination as to whether or not to perform the contrast adjustment process or the linearization process after completion of reading is added.

As illustrated in FIG. 31, in a case where it is determined that reading of all original documents (documents) is completed (Yes in step S41), the controller 23 determines whether or not to validate the contrast adjustment process in the contrast adjusting unit 72 or the linearization process in the linearization unit 73 (step S91). In a case where it is determined that the contrast adjustment process or the linearization process is to be validated (Yes in step S91), the controller 23 validates the contrast adjustment process or the linearization process (step S92).

On the other hand, in a case where it is determined that the contrast adjustment process or the linearization process is not to be validated (No in step S91), the controller 23 invalidates the contrast adjustment process or the linearization process (step S93).

Note that, in FIG. 31, it is stated that any one of contrast adjustment (invisible image), contrast adjustment (visible image), and the linearization process is selected, but these processes may be used in combination.

As described above, according to this embodiment, even in a case where the invisible image is composed of dots (halftone dots), it is possible to maintain the authenticity determination precision.

Thirteenth Embodiment

Next, a thirteenth embodiment will be described.

The thirteenth embodiment is different from the first embodiment to the twelfth embodiment in that primary determination of the authenticity determination is performed in an apparatus. Hereinafter, in description of the thirteenth embodiment, description of the same portion as the portions in the first embodiment to the twelfth embodiment will be omitted, and description will be given of a portion different from the first embodiment to the twelfth embodiment.

Hereinbefore, description has been given of a configuration in which the validity of the authentication determination can be confirmed through visual confirmation. However, in the case of confirming the validity of the authenticity determination, there is a disadvantage that the authenticity determination is also performed, and thus a time is taken for a determination process.

Here, in this embodiment, primary determination of the authenticity determination is performed in an apparatus to shorten a time taken for the determination process.

Figure 32A:
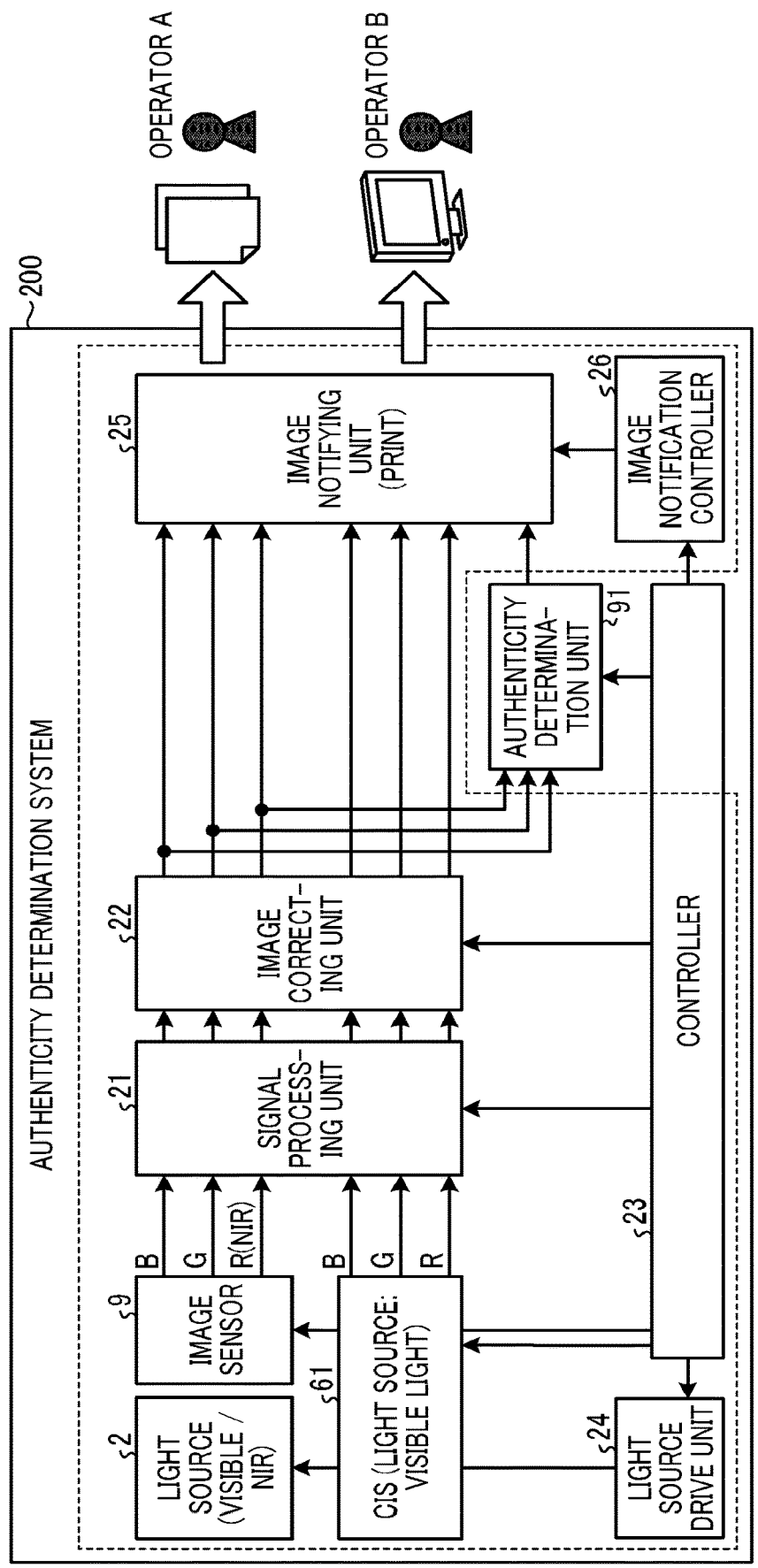
FIGS. 32A and 32B are block diagrams illustrating electric connection of respective units of an authenticity determination system according to a thirteenth embodiment.
Figure 32B:
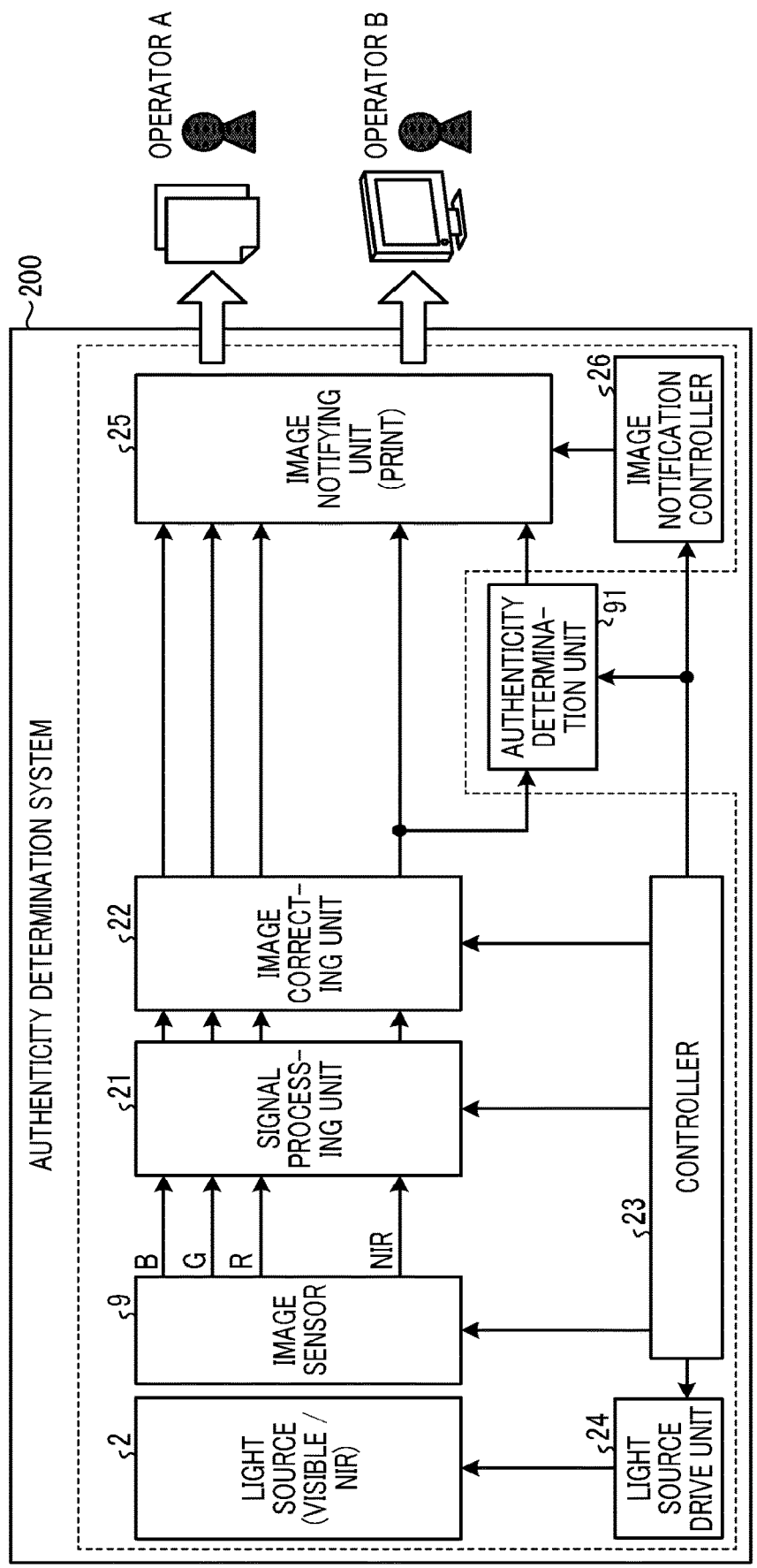

FIGS. 32A and 32B are block diagrams illustrating electric connection of respective units of an authenticity determination system 200 according to the thirteenth embodiment. The authenticity determination system 200 illustrated in FIG. 32A includes an authenticity determination unit 91 that functions as authenticity determination unit for performing the authenticity determination between the image correcting unit 22 and the image notifying unit 25.

The authenticity determination unit 91 detects presence or absence of the authenticity determination mark ("positive" in a circle mark) of an NIR image output from the image correcting unit 22 to perform the authenticity determination. The authenticity determination unit 91 outputs an authenticity determination result to the image notifying unit 25.

The image notifying unit 25 also gives a notification of the authenticity determination result in combination with the image information described up to now.

The controller 23 performs control of presence or absence of execution of the authenticity determination, a determination method, and a determination condition with the authenticity determination unit 91 in correspondence with an image mode.

Note that, constituent elements excluding the authenticity determination unit 91 are similar to the constituent elements in the image reading device 101 or the image forming apparatus 100 described above, and thus a configuration in which the authenticity determination unit 91 is added to the constituent elements is referred to as the authenticity determination system 200.

FIG. 32B illustrates an authenticity determination system 200 using the image sensor 9 capable of simultaneously acquiring the RGB image and the NIR image. A difference from the authenticity determination system 200 illustrated in FIG. 32A is in that a configuration capable of simultaneously acquiring the RGB image and the NIR image by using the CIS 61 in FIG. 32A is substituted with the image sensor 9 capable of simultaneously acquiring the RGB image and the NIR image.

In addition, the authenticity determination result obtained (given to an outside in notification) by the authenticity determination system 200 is handled as the primary determination result. The reason for this is that it cannot be said that a result is valid at all times when considering forgery, falsification, and the like. According to this, a final determination result is determined from the primary determination result obtained from the authenticity determination system 200 and validity determination by the NIR image that is given in notification from the image notifying unit 25.

As described above, the primary determination of the authenticity determination is performed in the apparatus, and the authentication determination is performed in combination with the NIR image that is given in notification. According to this, it is possible to shorten a time taken for the determination process.

As described above, according to this embodiment, it is possible to shorten the authenticity determination.

Fourteenth Embodiment

Next, a fourteenth embodiment will be described.

An authenticity determination system 200 of the fourteenth embodiment is different from the first embodiment to the thirteenth embodiment in that invisible and visible images, and an authenticity determination result are notified in an integrated form. Hereinafter, in description of the fourteenth embodiment, description of the same portion as the portions in the first embodiment to the thirteenth embodiment will be omitted, and description will be given of a portion different from the first embodiment to the thirteenth embodiment.

In the thirteenth embodiment, the authenticity determination system 200 is illustrated. However, from the viewpoint of information management, there is a disadvantage that when storing the authenticity determination result as evidence separately from the NIR image, subsequent information management becomes difficult.

Here, in this embodiment, the NIR image and the authenticity determination result are notified in an integrated form to make information management as evidence easy.

Figure 33:
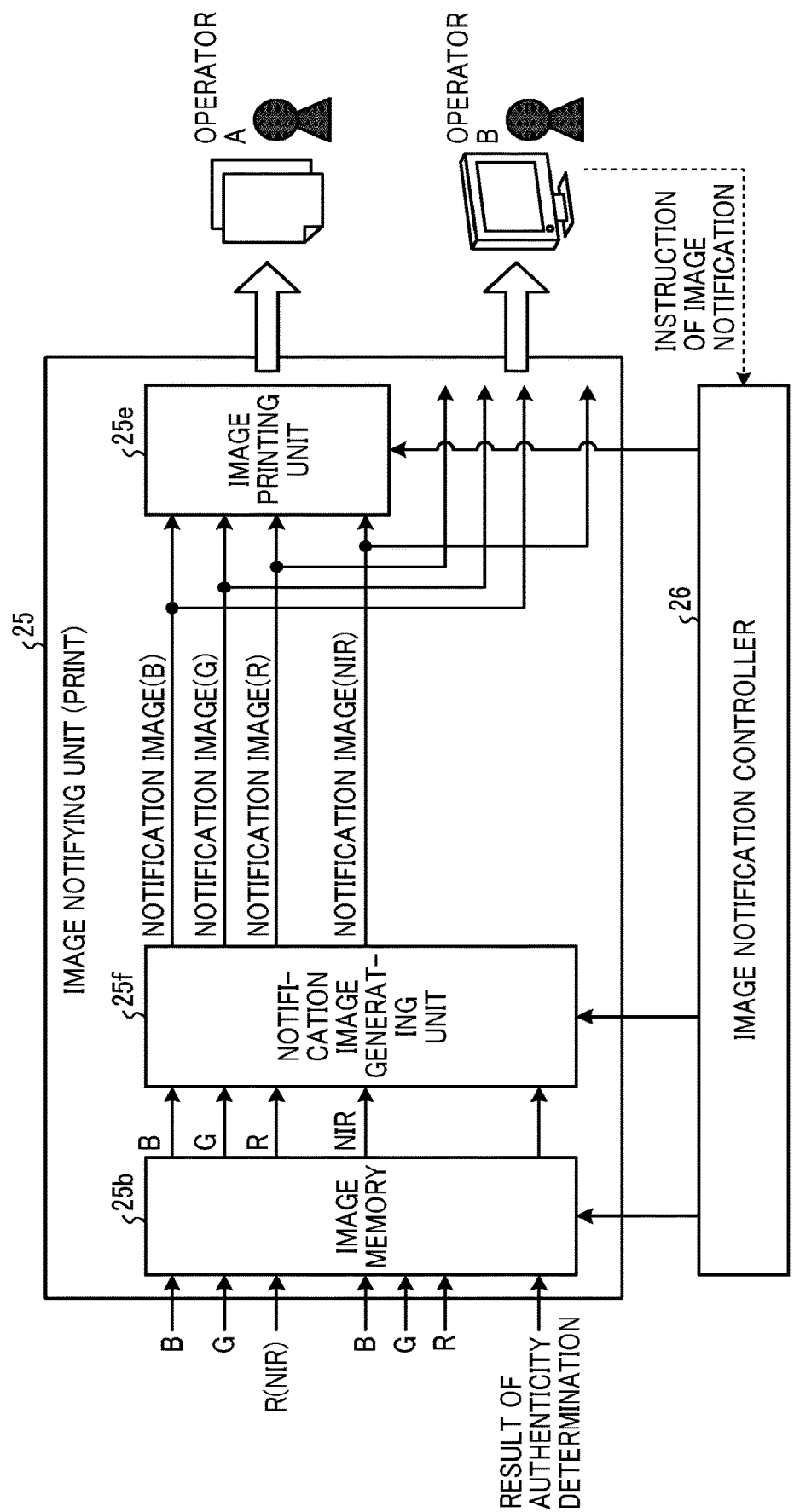
FIG. 33 is a diagram illustrating a configuration of an image notifying unit of an image reading device according to a fourteenth embodiment.

FIG. 33 is a diagram illustrating a configuration of an image notifying unit 25 of an image reading device 101 according to the fourteenth embodiment. The image notifying unit 25 of the image reading device 101 illustrated in FIG. 33 includes a notification image generating unit 25f that functions as information composing unit between the image storage unit 25b and the image printing unit 25e.

As illustrated in FIG. 33, an authenticity determination result as well as the visible image and the NIR image are input to the image notifying unit 25. The input images are stored in the image storage unit 25b, and are output as an RGB image and an NIR image to the notification image generating unit 25f on a rear stage. In addition, the authenticity determination result is also stored in the image storage unit 25b, and is output to the notification image generating unit 25f on a rear stage.

The notification image generating unit 25f performs image composing in which the authenticity determination result is applied to the input NIR image. The notification image generating unit 25f outputs the NIR image (notification image (NIR)) after the composing to the image printing unit 25e. The image printing unit 25e visually prints the NIR image (notification image (NIR)) after the composing or displays the NIR image on a display.

As described above, when the NIR image and the authenticity determination result are notified in an integrated form as an image, it is possible to make information management easy.

Note that, in FIG. 33, description has been given of a configuration in which the authenticity determination result is composed to the NIR image, but the authenticity determination result may be composed to the visible image.

Figure 34A:
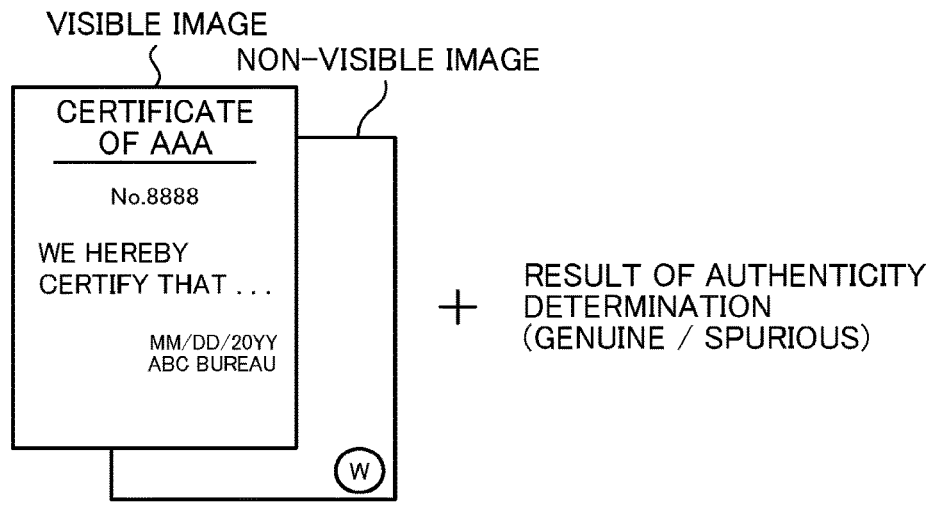
FIGS. 34A to 34C are diagrams describing an operation and an effect in the case of notifying invisible/visible images in an integrated form, and an authenticity determination result.
Figure 34B:
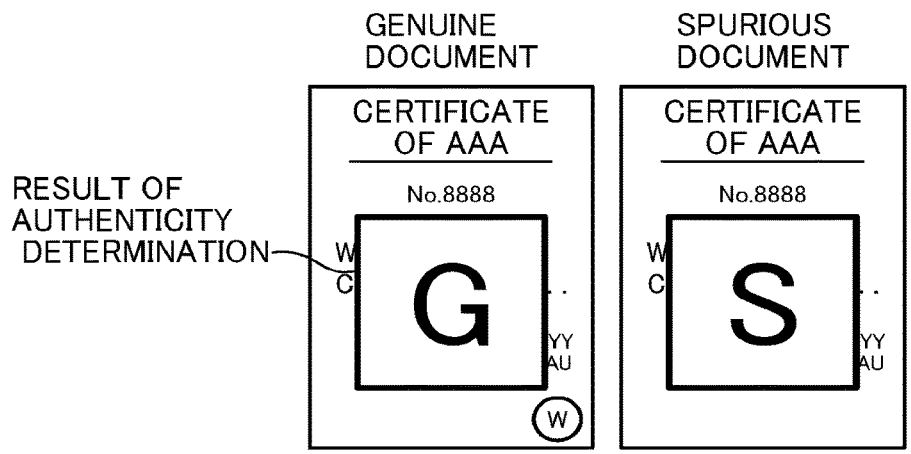
Figure 34C:
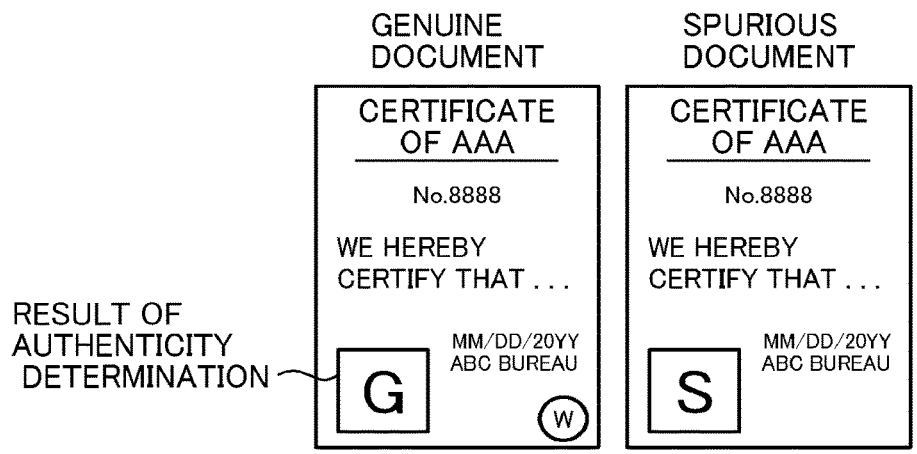

FIGS. 34A to 34C are diagrams describing an operation and an effect in a case where invisible/visible images and an authentication determination result are notified in an integrated form. FIG. 34A illustrates an example of the visible image (RGB), the invisible image (NW), and the authenticity determination result which are input to the image notifying unit 25.

FIG. 34B illustrates an example of image composing. Specifically, FIG. 34B illustrates a composing example in which an authenticity mark of the NW image is composed to the RGB image, and the authenticity determination result is superimposed on the resultant image. An NW image portion or an authenticity determination result portion is handled as a monochrome pattern.

As described above, when the images and the authenticity determination result are composed into one sheet of image on the same surface, the subsequent information management becomes easy. Note that, in a case where the origin is a fake, an authenticity mark is not present. In addition, as the authenticity determination result, a "false" character is composed, and is given in notification.

In addition, FIG. 34C illustrates another example of a composed image. Specifically, FIG. 34C illustrates an example in which the authenticity determination result is composed to a margin area of an authenticity mark of the RGB image or the NW image. As described above, the NW image portion and the authenticity determination result are handled as a monochrome image. As described above, when the authenticity determination result is laid out and composed to a region different from a region in which a context of an image exists, it is possible to maintain visual recognition property of image information, and it is possible to attain the effect, particularly, through composing with the NIR image.

In addition, in the embodiment, the authenticity determination result portion is handled as a monochrome image. However, when image composing is performed in a color different from that of the visible/invisible images, it is possible to raise visual recognition property of the authenticity determination result.

As described above, according to this embodiment, it is possible to make information management easy while shortening an authenticity determination.

Fifteenth Embodiment

Next, a fifteenth embodiment will be described.

An authenticity determination system 200 of the fifteenth embodiment is different from the first embodiment to the fourteenth embodiment in that image information is stored in an external storage (cloud). Hereinafter, in description of the fifteenth embodiment, description of the same portion as the portions in the first embodiment to the fourteenth embodiment will be omitted, and description will be given of a portion different from the first embodiment to the fourteenth embodiment.

Hereinbefore, it has been assumed that image information given to an outside in notification is stored as evidence in a local storage or on printed paper. However, actually, there is a disadvantage that a mass storage capacity or a space for storing a large amount of the printed paper is required.

Here, in this embodiment, particularly, image information with large capacity is stored in an external storage, and only an access key is given to an outside in notification to make storage of evidence easy.

Figure 35A:
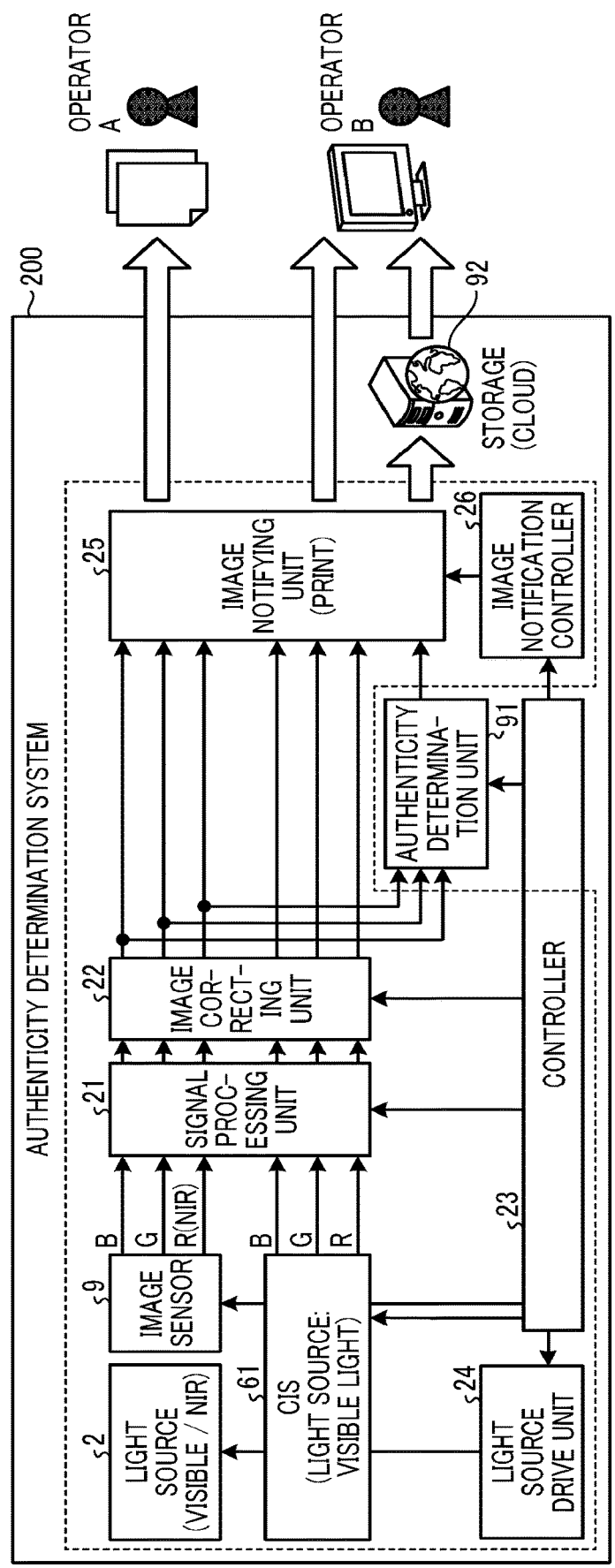
FIGS. 35A and 35B are block diagrams illustrating electric connection of respective units of an authenticity determination system according to a fifteenth embodiment.
Figure 35B:
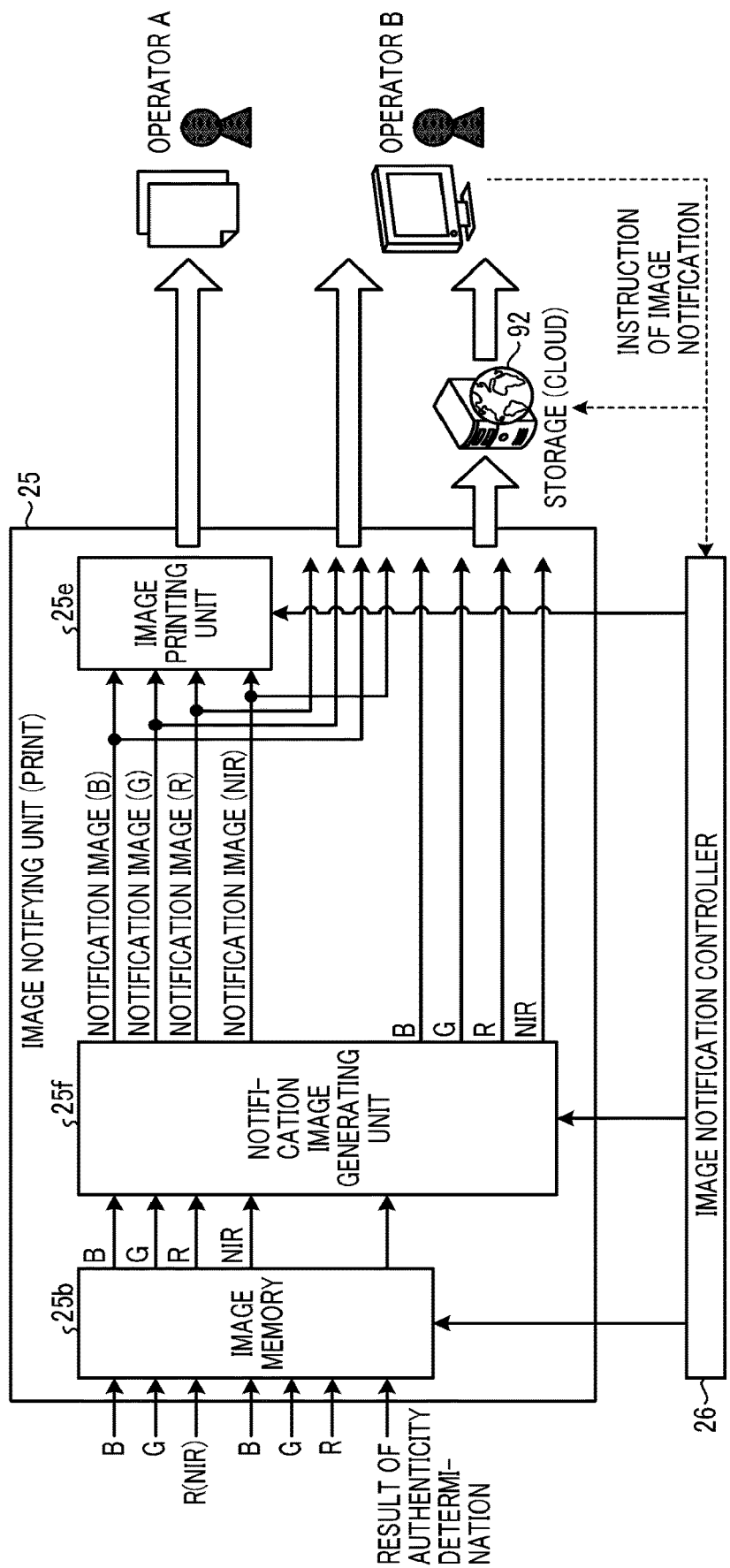

FIGS. 35A and 35B are block diagram illustrating electric connection of respective units of the authenticity determination system 200 according to the fifteenth embodiment. FIG. 35A illustrates a configuration in which image information is stored in the external storage (cloud). In the authenticity determination system 200 illustrated in FIG. 35A, the image notifying unit 25 is connected to an external storage (cloud) 92.

The external storage (cloud) 92 functions as storage unit, and examples include a storage on a network such as a cloud. The authenticity determination system 200 includes the external storage (cloud) 92.

FIG. 35B is a diagram illustrating a configuration of the image notifying unit 25. As illustrated in FIG. 35B, an authenticity determination result as well as the visible image and the NIR image are input to the image notifying unit 25. The input images are stored in the image storage unit 25b, and are output as the RGB image and the NIR image to the notification image generating unit 25f on a rear stage. In addition, the authenticity determination result is also stored in the image storage unit 25b, and is output to the notification image generating unit 25f on a rear stage.

The notification image generating unit 25f performs image composing in which the authenticity determination result is applied to the input NIR image. The notification image generating unit 25f outputs the NIR image (notification image (NIR)) after the composing to the image printing unit 25e. The image printing unit 25e visually prints the NIR image (notification image (NIR)) after the composing or displays the NIR image on a display.

In addition to this, the notification image generating unit 25f outputs a storage image (RGB or NIR) with respect to the external storage (cloud) 92. The storage image (RGB or NIR) output from the notification image generating unit 25f is different from the notification image (RGB or NW) output from the notification image generating unit 25f in combination. Specifically, it is assumed that the notification image is an image to which the authenticity determination result or the like is combined, and the storage image is image information before composing.

According to this, the following operation is also possible. Specifically, first, the authenticity determination result is instantaneously given to an operator side in notification with the notification image, and in a case where validity determination is required, the storage image with respect to the external storage (cloud) 92 is called, and validity confirmation of the authenticity determination is performed. Access information (access key) to the external storage (cloud) 92 is generated by the notification image generating unit 25f and is given in notification in combination with the authenticity determination result on a notification image.

Figure 36A:
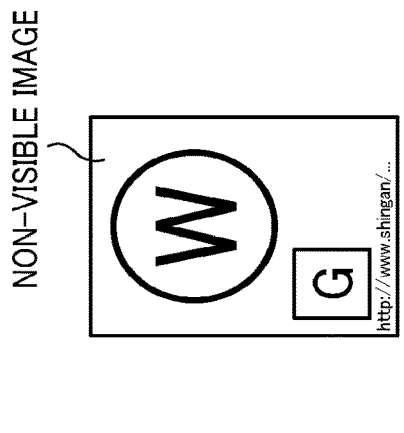
FIGS. 36A to 36C are diagrams describing an operation and an effect in the case of storing image information in an external storage (cloud)
Figure 36B:
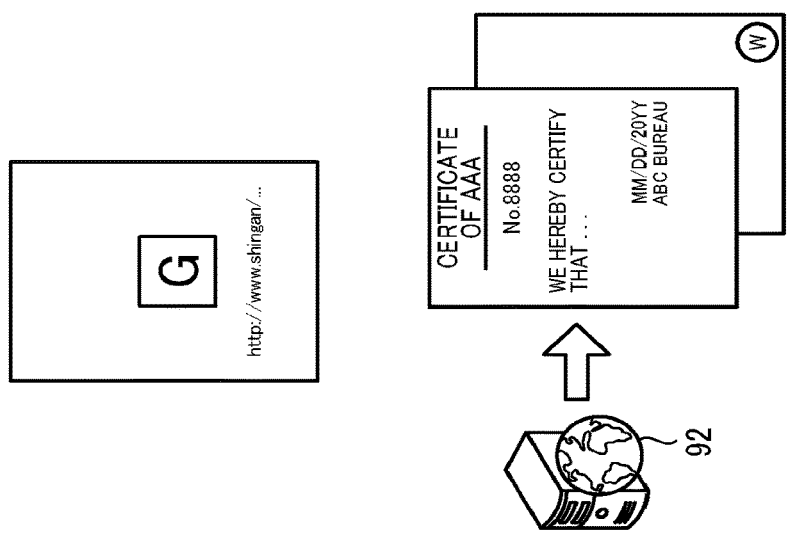
Figure 36C:
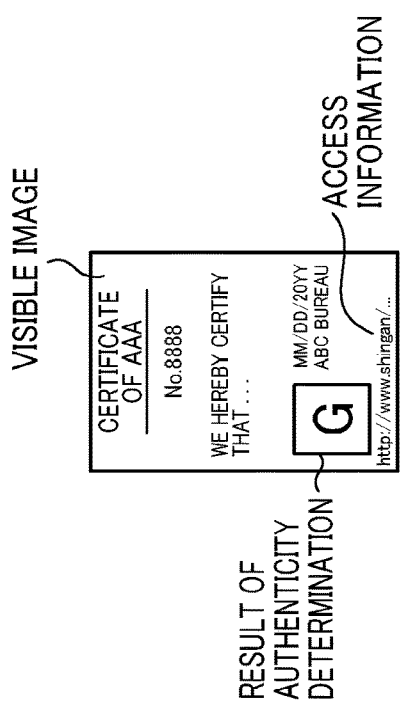

FIGS. 36A to 36C are diagrams describing an operation and an effect in a case where the image information is stored in the external storage (cloud) 92. In FIGS. 36A and 36C, an upper end represents a notification image, and a lower end represents an image stored in the external storage (cloud) 92.

FIG. 36A illustrates an example in which the visible (RGB) image and the authenticity determination result are composed to the notification image, and the storage image is the invisible (NIR) image. The notification image illustrated in FIG. 36A is different from the image described in FIG. 34C according to the fourteenth embodiment in that access information (access key) to an image is composed to a lower portion of the authenticity determination result.

A work flow is performed as follows. Specifically, after an operator recognizes a primary result of the authenticity determination of any specific individual (document) with reference to visible information and an authenticity determination result which are given in notification, the operator accesses the external storage (cloud) 92 by using the access key that is applied in combination as required, and confirms the invisible image that is stored to perform validity confirmation. In this case, since the visible image (individual identification information) is given first in notification in combination with the authenticity determination result and the access key, information management becomes easy.

FIG. 36B illustrates an example in which the invisible image (NIR) and the authenticity determination result are composed to the notification image, and the storage image is the visible image (RGB). It is assumed that the NIR image stated here is obtained by extracting and enlarging the authenticity determination mark.

In this case, the following work flow is performed. Specifically, an operator recognizes the primary result of the authenticity determination with reference to the invisible information and the authenticity determination result which are given in notification, and performs the validity determination. Then, the operator accesses the external storage (cloud) 92 by using the access key that is applied in combination as required, and confirms the visible image that is stored to perform individual identification for confirming that the result pertains to which document. In this case, since the NIR information is given first in notification in combination with the authenticity determination result and the access key, it is possible to perform validity confirmation of the authenticity determination in real time.

FIG. 36C illustrates an example in which the notification image is composed of only the authenticity determination result, and the storage image includes the visible (RGB) image and the invisible (NIR) image.

In this case, the following work flow is performed. Specifically, after an operator recognizes the primary result of the authenticity determination with reference to the authenticity determination result that is given in notification, the operator accesses the external storage (cloud) 92 by using the access key that is applied in combination as required, and confirms the visible image and the NIR image which are stored to perform the validity confirmation or the individual identification for confirming that the result pertains to which document. In this case, since only the authenticity determination result and the access key are given in notification, it is possible to early perform the primary determination of the authenticity determination.

As described above, when the image information is stored in the external storage (cloud) 92, and only the access key is given to an outside in notification, it is possible to make evidence storage easy while maintaining precision or validity of the authenticity determination.

Figure 37A:
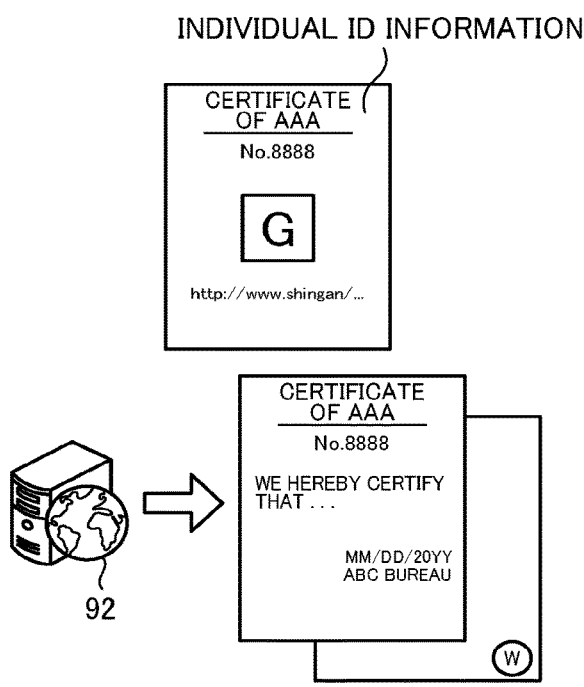
FIGS. 37A and 37B are views describing an operation and an effect in the case of storing both a visible image and an invisible image in the external storage (cloud)
Figure 37B:
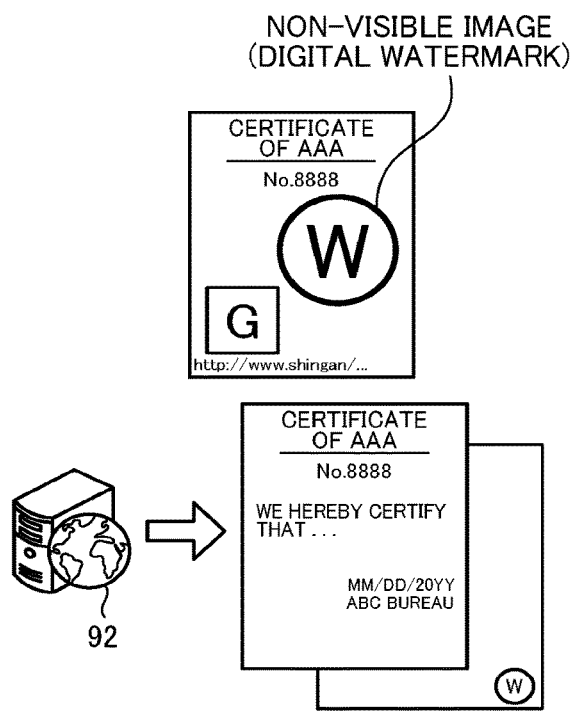

FIGS. 37A and 37B are diagrams describing an operation and an effect in a case where both the visible image and the invisible image are stored in the external storage (cloud) 92. In FIGS. 37A and 37B, an upper end represents a notification image, and a lower end represents an image that is stored in the external storage (cloud) 92.

FIGS. 36A to 36C illustrate an example in which any one or both of the visible image and the invisible image which are not included in the notification image are stored in the external storage (cloud) 92. However, from the viewpoint of evidence storage reliability, it is preferable that both the visible image and the invisible image are stored regardless of the notification image.

FIG. 37A illustrates an example in which individual identification information extracted from the visible (RGB) image, an authenticity determination result, and an access key are composed to the notification image. A storage image includes both the visible (RGB) image and the invisible (NIR) image.

A work flow of an operator is the same as the work flow described with reference to FIG. 36A, but both the RGB image and the NIR image are stored in the external storage (cloud) 92, and thus it is possible to raise storage reliability.

Note that, the notification image in FIG. 37A is set to an example in which individual identification information extracted from the RGB image is described, but the visible image that is used in the notification image is stored (backed up) differently from FIG. 36A. According to this, processing of the RGB image is possible.

FIG. 37B illustrates an example in which the individual identification information extracted from the visible (RGB) image, the authenticity determination result, the access key, and the authenticity determination mark that is extracted and enlarged from the NIR image are composed to the notification image. The storage image includes both the visible (RGB) image and the invisible (NIR) image.

A work flow of an operator is basically the same as the work flow in FIG. 37A, and the authenticity determination mark is also given in notification, and thus validity confirmation is performed in combination. Since both the RGB image and the NIR image are stored in the external storage (cloud) 92, it is possible to raise storage reliability.

Note that, the notification image in FIG. 37B is set to an example in which the individual identification information extracted from the RGB image is also described, and this example relates to a configuration in which the visible image that is used in the notification image is stored (backed up), and thus processing of the RGB image is possible.

As described above, when both the visible image and the invisible image are stored in the external storage (cloud) 92, it is possible to raise evidence storage reliability.

As described above, according to this embodiment, it is possible to make evidence storage of the authenticity determination easy.

Sixteenth Embodiment

Next, a sixteenth embodiment will be described.

An authenticity determination system 200 of the sixteenth embodiment is different from the first embodiment to the fifteenth embodiment in that an access key to image information is encrypted. Hereinafter, in description of the sixteenth embodiment, description of the same portion as the portions in the first embodiment to the fifteenth embodiment will be omitted, and description will be given of a portion different from the first embodiment to the fifteenth embodiment.

Hereinbefore, description has been given of an example in which image information is acquired through access to the external storage (cloud) 92 by using an access key. However, there is a disadvantage that access is easy for human beings who can view a notification image, and thus this example is not preferable from the viewpoint of security.

Here, in this embodiment, the access key is encrypted and is given to an outside in notification to perform evidence storage with security.

Figure 38A:
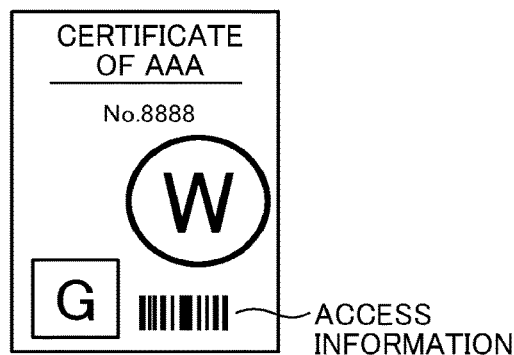
FIGS. 38A and 38B are diagrams describing an operation and an effect in the case of encrypting an access key to image information in an authenticity determination system according to a sixteenth embodiment.
Figure 38B:
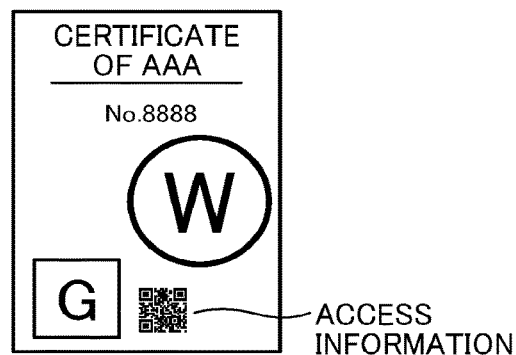

FIGS. 38A and 38B are diagram describing an operation and an effect of a case where an access key to image information is encrypted in an authenticity determination system 200 according to the sixteenth embodiment.

FIGS. 38A and 38B illustrate an example in which the access key is encrypted. FIG. 38A illustrates a one-dimensional encryption code (for example, a bar code), and FIG. 38B illustrates a two-dimensional encryption code (for example, a QR code (registered trademark)). A code symbol such as the bar code or the QR code is an encryption method that has been spreading already. Accordingly, when the code symbol is used, encryption becomes easy.

As described above, when the access key is given in notification after being encrypted, it is possible to realize evidence storage with security.

As described above, according to this embodiment, since the access information is encrypted, and thus it is possible to perform evidence storage with security.

Note that, in the respective embodiments, description has been given of examples in which the image forming apparatus of the invention is applied to a multifunction peripheral having at least two functions among a copy function, a printer function, a scanner function, and a facsimile function. However, the image forming apparatus is applicable to any apparatus as long as the apparatus is an image forming apparatus such as a copying machine, a printer, a scanner device, and a facsimile device.

In addition, in the respective embodiments, description has been given of examples in which the reading device of the invention is applied to the multifunction peripheral, but there is no limitation. For example, the reading device is applicable to applications in various fields such as inspection in an FA field.

In addition, the reading device of the invention is also applicable to a paper money reading device for determination of the paper money and anti-forgery. In addition, the reading device of the invention is applicable to a device that reads a visible image and an invisible image, and performs an arbitrary process in the subsequent process.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A reading device, comprising:
a light source configured to irradiate an object with light;
an imaging element configured to receive and read the light from the object;
a controller configured to control a reading operation of reading an invisible image included in the object; and
circuitry configured to perform correction of the read invisible image, and output, in visible form, an image including only the corrected invisible image.

2. A reading device, comprising:
a light source configured to irradiate an object with light;
an imaging element configured to receive and read the light from the object;
a controller configured to control a first reading operation of reading a visible image included in the object and a second reading operation of reading an invisible image included in the object; and
circuitry configured to perform correction of at least one of the visible image and the invisible image, and output the invisible image separate from the visible image.

3. The reading device according to claim 1, wherein the circuitry is further configured to control a notification condition when outputting the image.

4. The reading device according to claim 3, further comprising a memory to store the invisible image,
wherein the circuitry is further configured to output the invisible image stored in the memory at arbitrary timing.

5. The reading device according to claim 1, wherein the circuitry is further configured to output the image of a whole surface of the object in addition to outputting the image including only the invisible image.

6. The reading device according to claim 1, wherein the circuitry is further configured to output an additional image obtained by enlarging a part of a whole surface of the object.

7. The reading device according to claim 1, wherein the circuitry is further configured to output the image as a printed image.

8. The reading device according to claim 1, wherein the reading operation is a reading operation in an infrared region.

9. The reading device according to claim 1, wherein the circuitry is further configured to convert the invisible image into a monochrome image.

10. The reading device according to claim 1, wherein the reading operation performs continuous reading of the invisible image included in the object.

11. The reading device according to claim 1,
wherein the circuitry is further configured to output a visible image in addition to the image including only the invisible image, in an integrated form.

12. The reading device according to claim 11, wherein the circuitry is further configured to output the visible image and the invisible image printed on a first surface and a second surface, respectively, of a printed image.

13. The reading device according to claim 2, wherein the controller is further configured to simultaneously perform the first reading operation and the second reading operation.

14. The reading device according to claim 13, wherein the first reading operation is an operation of reading a first surface of the object and the second reading operation is an operation of reading a second surface of the object.

15. The reading device according to claim 13, wherein the circuitry is further configured to perform image composing in which the visible image read by the first reading operation and the invisible image read by the second reading operation are laid out on a same surface.

16. The reading device according to claim 15, wherein the circuitry is further configured to lay out the visible image and the invisible image in different regions on the same surface.

17. The reading device according to claim 15, wherein the circuitry is further configured to make a color of the invisible image different from a color of the visible image.

18. The reading device according to claim 1, wherein the circuitry is further configured to perform a contrast emphasis process with respect to the invisible image.

19. The reading device according to claim 18, wherein the circuitry is further configured to perform the contrast emphasis process, which is a binarization process.

20. The reading device according to claim 1, wherein the circuitry is further configured to perform a contrast reducing process of reducing contrast of the invisible image.

21. The reading device according to claim 20, wherein the contrast reducing process performed by the circuitry is an integration filter process.

22. The reading device according to claim 1, wherein the circuitry is further configured to perform a linearization process of connecting dots of the invisible image.

23. An image forming apparatus, comprising:
the reading device according to claim 1, which is configured to read an original document;
an original document support device configured to place the original document at a reading position of the reading device; and
an image forming device configured to form the image.

24. An authenticity determination system, comprising:
the reading device according to claim 1; and
authenticity circuitry configured to determine whether the object is genuine based on the invisible image,
wherein an authenticity determination result determined by the authenticity circuitry is output by the circuitry.

25. The authenticity determination system according to claim 24,
wherein the circuitry is further configured to perform image composing in which the authenticity determination result and one of the invisible image and a visible image are laid out on a same surface,
wherein the circuitry is further configured to output the invisible image and the authenticity determination result.

26. The authenticity determination system according to claim 25,
wherein the circuitry is further configured to perform image composing of the invisible image and the authenticity determination result, and lay out the invisible image and the authenticity determination result in different regions on the same surface.

27. The authenticity determination system according to claim 25, wherein the circuitry is further configured to make a color of the authenticity determination result different from a color of the invisible image.

28. The authenticity determination system according to claim 27, wherein the circuitry is further configured to make the color of the authenticity determination result different from a color of the visible image.

29. The authenticity determination system according to claim 24, further comprising a memory to store a visible image or the invisible image on a network,
wherein the circuitry is further configured to generate access information for access to the memory, and
wherein the circuitry is further configured to give a notification of the access information to notify the outside of the visible image or the invisible image.

30. The authenticity determination system according to claim 29, wherein the circuitry is further configured to output the authenticity determination result, the access information, and individual identification information in an integrated form.

31. The authenticity determination system according to claim 29, wherein the circuitry is further configured to notify the outside of the authenticity determination result, the access information, and the invisible image or a part of the invisible image in an integrated form.

32. The authenticity determination system according to claim 29,
wherein the circuitry is further configured to store the authenticity determination result and the access information in an integrated form.

33. The authenticity determination system according to claim 29, wherein the circuitry is further configured to store both the visible image and the invisible image in the memory.

34. The authenticity determination system according to claim 29, wherein the access information is encrypted by the circuitry.

35. The authenticity determination system according to c 34,
wherein the access information encrypted by the circuitry is a code symbol.

36. A reading method for a reading device configured to receive and read, by an imaging element, light from an object irradiated with light by a light source, the reading method comprising:
controlling a reading operation of reading an invisible image included in the object;
performing correction of the read invisible image; and
outputting, in visible form, an image including only the corrected invisible image.

37. A reading method for a reading device configured to receive and read, by an imaging element, light from an object irradiated with light by a light source, the reading method comprising:
controlling a first reading operation of reading a visible image included in the object and a second reading operation of reading an invisible image included in the object;
performing correction of at least one of the visible image and the invisible image; and
outputting the invisible image separate from the visible image.

38. A non-transitory recording medium storing computer-readable program code that causes a reading device to perform a reading method, the reading device configured to receive and read, by an imaging element, light from an object irradiated with light by a light source, the reading method comprising:
controlling a reading operation of reading an invisible image included in the object;
performing correction of the read invisible image; and
outputting, in visible form, an image including only the corrected invisible image.

39. A non-transitory recording medium storing computer-readable program code that causes a reading device to perform a reading method, the reading device configured to receive and read, by an imaging element, light from an object irradiated with light by a light source, the reading method comprising:
controlling a first reading operation of reading a visible image included in the object and a second reading operation of reading an invisible image included in the object;
performing correction of at least one of the visible image and the invisible image; and
outputting the invisible image separate from the visible image.

* * * * *